United States Patent
Karunamuni et al.

(10) Patent No.: US 10,304,163 B2
(45) Date of Patent: May 28, 2019

(54) LANDSCAPE SPRINGBOARD

(71) Applicant: Apple Inc., Cupertino, CA (US)

(72) Inventors: Chanaka G. Karunamuni, San Jose, CA (US); Elizabeth Caroline Cranfill, San Francisco, CA (US); Freddy A. Anzures, San Francisco, CA (US); Marcos Alonso Ruiz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 839 days.

(21) Appl. No.: 14/501,858

(22) Filed: Sep. 30, 2014

(65) Prior Publication Data

US 2016/0071241 A1 Mar. 10, 2016

Related U.S. Application Data

(60) Provisional application No. 62/047,586, filed on Sep. 8, 2014.

(51) Int. Cl.

| *G06F 3/048* | (2013.01) |
|---|---|
| *G06F 3/0346* | (2013.01) |
| *G06T 3/60* | (2006.01) |
| *G06F 3/0484* | (2013.01) |
| *G06F 3/0488* | (2013.01) |

(52) U.S. Cl.
CPC .............. *G06T 3/60* (2013.01); *G06F 3/0346* (2013.01); *G06F 3/04845* (2013.01); *G06F 3/04886* (2013.01); *G06F 2200/1614* (2013.01); *G06F 2200/1637* (2013.01)

(58) Field of Classification Search
CPC .... G06F 3/0346; G06F 3/0481; G06F 3/0484; G06F 3/04845; G06F 2200/1614; G06F 2200/1638
See application file for complete search history.

(56) References Cited

U.S. PATENT DOCUMENTS

| 8,266,550 B1* | 9/2012 | Cleron .................. G06F 1/1633 345/173 |
|---|---|---|
| 9,436,217 B2* | 9/2016 | Sirpal .................... G06F 1/1616 |
| 2004/0201595 A1 | 10/2004 | Manchester |

(Continued)

OTHER PUBLICATIONS

Windows Phone, "Introducing Windows Phone 8.1," YouTube, Apr. 2, 2014, 1 page, [online][retrieved on Sep. 22, 2015] Retrieved from the Internet <URL:https://www.youtube.com/watch?v=cAuOYgPnuXM>.

(Continued)

*Primary Examiner* — Ryan Barrett
*Assistant Examiner* — Linda Huynh
(74) *Attorney, Agent, or Firm* — Dentons US LLP

(57) ABSTRACT

An electronic device with a display showing a user interface (UI) in different orientations relative to the display. In landscape orientation the user interface includes a dock region displayed along the right or left edge of the user interface. Application icons or other UI objects that are arranged in a row on the dock region in portrait orientation are arranged in a column on the dock region in the landscape orientation. UI objects and folders from other pages move from underneath the dock region onto the user interface. Furthermore, notification and control windows are overlay on top of portions of the dock region in landscape orientation of the user interface.

60 Claims, 55 Drawing Sheets

(56) References Cited

U.S. PATENT DOCUMENTS

| | | | |
|---|---|---|---|
| 2007/0004451 A1* | 1/2007 | C. Anderson | G06F 1/1626 455/556.1 |
| 2008/0165148 A1* | 7/2008 | Williamson | G06F 3/04883 345/173 |
| 2009/0178008 A1* | 7/2009 | Herz | G06F 3/04817 715/840 |
| 2010/0007603 A1* | 1/2010 | Kirkup | G06F 1/1616 345/158 |
| 2010/0066763 A1* | 3/2010 | MacDougall | G06F 1/1626 345/656 |
| 2010/0088639 A1* | 4/2010 | Yach | G06F 1/1626 715/825 |
| 2010/0302278 A1* | 12/2010 | Shaffer | G06F 3/0481 345/659 |
| 2011/0084913 A1* | 4/2011 | Wirtanen | G06F 3/0346 345/173 |
| 2011/0164056 A1* | 7/2011 | Ording | G06F 1/1694 345/649 |
| 2011/0185040 A1* | 7/2011 | Schmidt | G06F 17/30905 709/217 |
| 2011/0252369 A1* | 10/2011 | Chaudhri | G06F 3/04883 715/830 |
| 2013/0050265 A1* | 2/2013 | de Paz | G06F 1/1616 345/649 |
| 2013/0076782 A1* | 3/2013 | Sirpal | G06F 3/1438 345/619 |
| 2013/0239031 A1* | 9/2013 | Ubillos | H04L 51/24 715/765 |
| 2014/0282051 A1* | 9/2014 | Cruz-Hernandez | G06F 3/0414 715/744 |
| 2015/0116363 A1* | 4/2015 | Monte | G06T 3/60 345/659 |
| 2015/0199110 A1* | 7/2015 | Nakazato | G06F 3/0487 715/763 |
| 2015/0339047 A1* | 11/2015 | Lee | G06F 3/0485 715/765 |
| 2016/0048305 A1* | 2/2016 | Singal | G06F 3/04845 715/765 |

OTHER PUBLICATIONS

Apple, "iPad User Guide Contents for iOS 7.1 Software," Mar. 10, 2014, 84 Pages, [online] [retrieved on Dec. 8, 2015] Retrieved from the internet <URL:https://manuals.info.apple.com/MANUALS/1000/MA1683/en_US/ipad_ios7_user_guide.pdf>.

The Macintosh Review, "iOS 7 for iPad Review: Hands on and First Look!", Jun. 24, 2013, 1 page, [online][retrieved on Dec. 8, 2015] Retrieved from the Internet <Url:https://www.youtube.com/watch?v=niehbNxIMYE>.

GeneralTechHQ, "i0S7 Folders on iPad", YouTube, Jun. 29, 2013, 1 page, [online] [retrieved on Dec. 8, 2015] Retrieved from the Internet <URL:https://www.youtube.com/watch?v=aPWMEXQIDyg>.

PCT International Search Report and Written Opinion for PCT/US2015/041637, dated Dec. 23, 2015, 26 Pages.

International Preliminary Report on Patentability received for PCT Patent Application No. PCT/US2015/041637, dated Mar. 23, 2017, 20 pages.

* cited by examiner

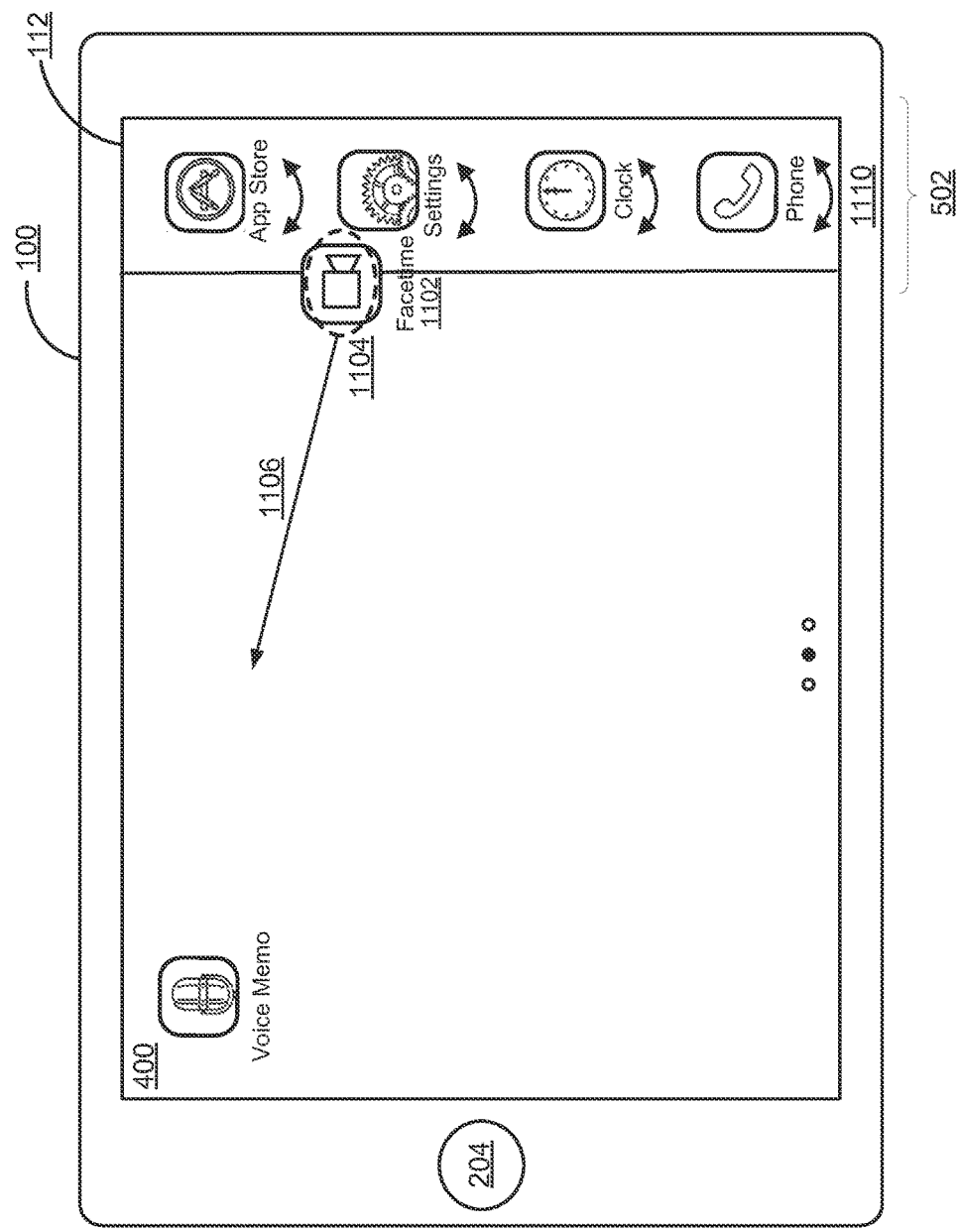

LANDSCAPE SPRINGBOARD

CROSS-REFERENCE TO RELATED APPLICATIONS

This application claims the benefit of U.S. Provisional Application No. 62/047,586 filed on Sep. 8, 2014, which is incorporated by reference in its entirety.

BACKGROUND

1. Field of Technology

The embodiments herein generally relate to electronic devices with touch screen displays and displays in general. More particularly, the embodiments relate to user interfaces in different orientations on the display.

2. Background

As portable electronic devices become more compact and the functions of the devices increase, it is increasingly difficult to design a user interface that allows users to easily interact with the multifunctional devices while optimally organizing the real estate on the user interface. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. In particular, a user interface has to accommodate different orientation of a device, e.g. portrait and landscape orientation.

SUMMARY

An electronic device with a touch-sensitive surface and display can display a user interface for executing application on the device and interacting with applications. A method for changing a user interface displayed in a first to a second orientation relative to the display. The user interface is displayed in a first user interface orientation (UI-orientation) relative to the display. The user interface comprises a first set of user interface objects and a dock region. The dock region in the first UI-orientation comprises a second set of user interface objects arranged in a row. While displaying the user interface in the first UI-orientation, a UI-orientation change condition is detected. In response to detecting the UI-orientation change condition, the user interface is displayed in a second UI-orientation relative to the display with one or more of the user interface objects in the first set of user interface objects rotated relative to the display. The dock region in the second UI-orientation comprises the second set of user interface objects being arranged in a column.

BRIEF DESCRIPTION OF THE SEVERAL VIEWS OF THE DRAWINGS

For a better understanding of the various described embodiments, reference should be made to the Description of Embodiments below, in conjunction with the following drawings in which like reference numerals refer to corresponding parts throughout the figures.

FIG. 11D illustrates moving a UI object 1102 from a first page to a second page of a multi-page user interface in landscape orientation, according to some embodiments.

Figure 1A:
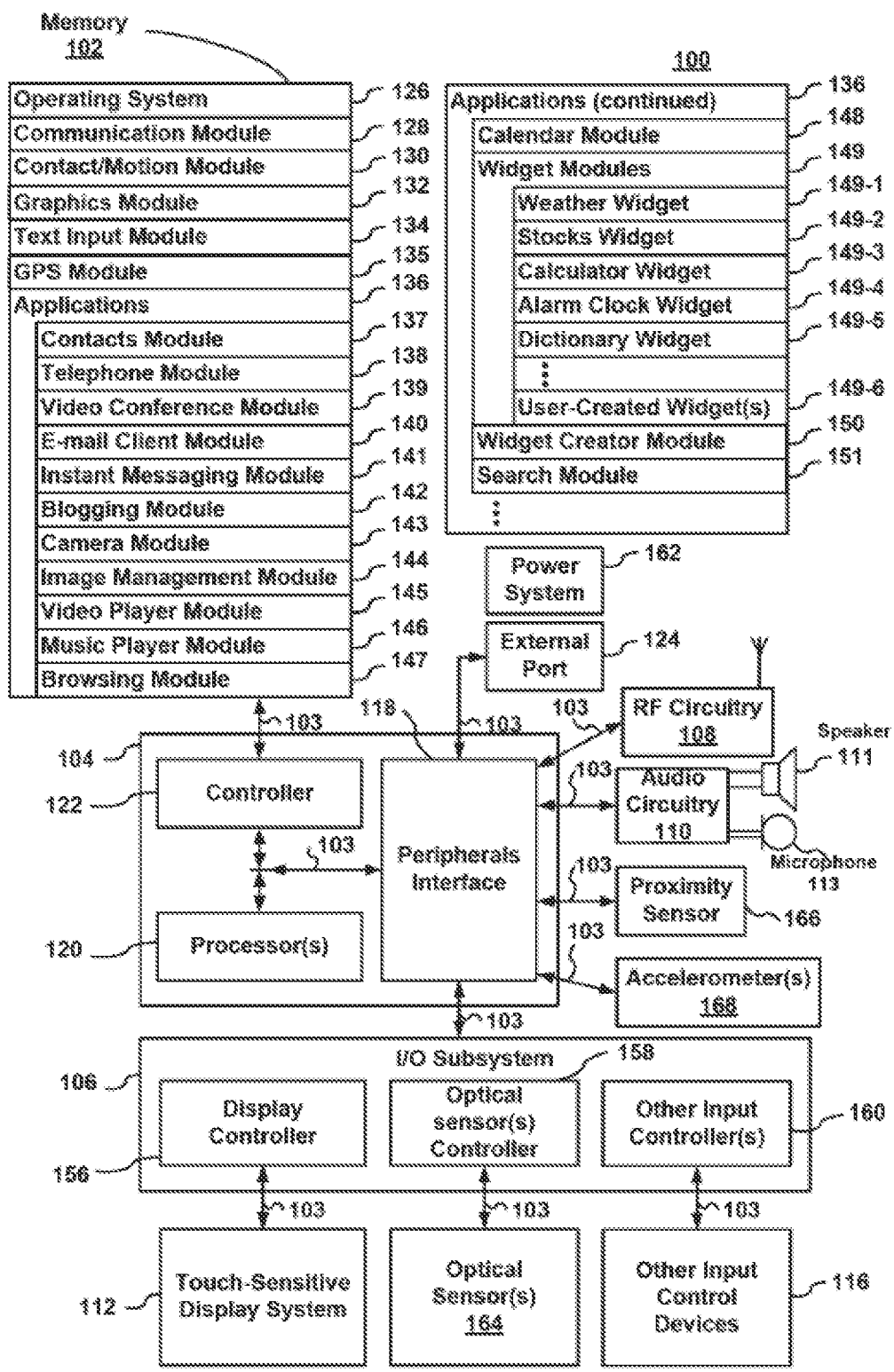
FIG. 1A is a block diagram illustrating a portable multifunction device with a touch-sensitive display in accordance with some embodiments.

The figures depict, and the detail description describes, various non-limiting embodiments for purposes of illustration only. One skilled in the art will readily recognize from the following discussion that alternative embodiments of the structures and methods illustrated herein optionally are employed without departing from the principles described herein.

DESCRIPTION OF EMBODIMENTS

Many electronic devices have graphical user interfaces that include a large number of content units such as electronic messages, photos, audio files, video files, text, hyperlinks, icons, control elements, and/or visual representations thereof. Many of these content units have associated metadata (e.g., time and/or date stamps, file sizes, author identification, status identification, and security settings), which optionally is informative to the user. To simplify a user's interaction with user interfaces containing large numbers of content units, electronic devices optionally display only a subset of all content units and/or associated metadata on a display at any one time. A user optionally needs to access content units and/or associated metadata contained within a given user interface, but which are not displayed at that time.

Changes in the user interfaces described below are typically performed by the device in response to detection by the device of user inputs such as rotation of the device and gestures performed on a touch-sensitive surface or touch screen of the device.

Some methods for accessing additional content units and/or metadata associated with displayed content units require a sequence of user inputs that navigate in a menu system. For example, with these methods, a user optionally needs to select a user interface object to display a menu. The displayed menu optionally includes a menu option for accessing additional content units and/or metadata associated with displayed content units. When the displayed menu does not include the desired menu option, the user needs to search through multiple menus and/or sub-menus to find a menu that has the correct menu option. After displaying the menu that has the desired menu option, the user needs to select the menu option to initiate gaining access to the desired content. Alternatively, an electronic device may, by default, continuously display larger numbers of content units and/or metadata associated with displayed content units. This clutters a display and can be distracting for users, which reduces the efficiency of the user when using the device.

In some embodiments described below, improved methods for accessing additional content units present, but not displayed, in a graphical user interface are achieved by providing user interfaces that allow unlocking of a pre-defined navigation direction using simple user contacts on a touch-sensitive surface (e.g., where there is a favored navigation axis, but some additional, infrequently accessed, information such as metadata is available in response to navigation in a direction different from the favored navigation axis). In some embodiments described below, improved methods for accessing metadata associated with displayed content units are achieved by providing user interfaces that reveal hidden metadata upon detection of simple user inputs, related to traditional navigation inputs, on a touch-sensitive surface. The methods described herein streamline the process of accessing additional user interface content units and/or metadata associated with displayed content units without overly cluttering the user interface display.

DETAILED DESCRIPTION

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments optionally are practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In some embodiments, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in some embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In some embodiments, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
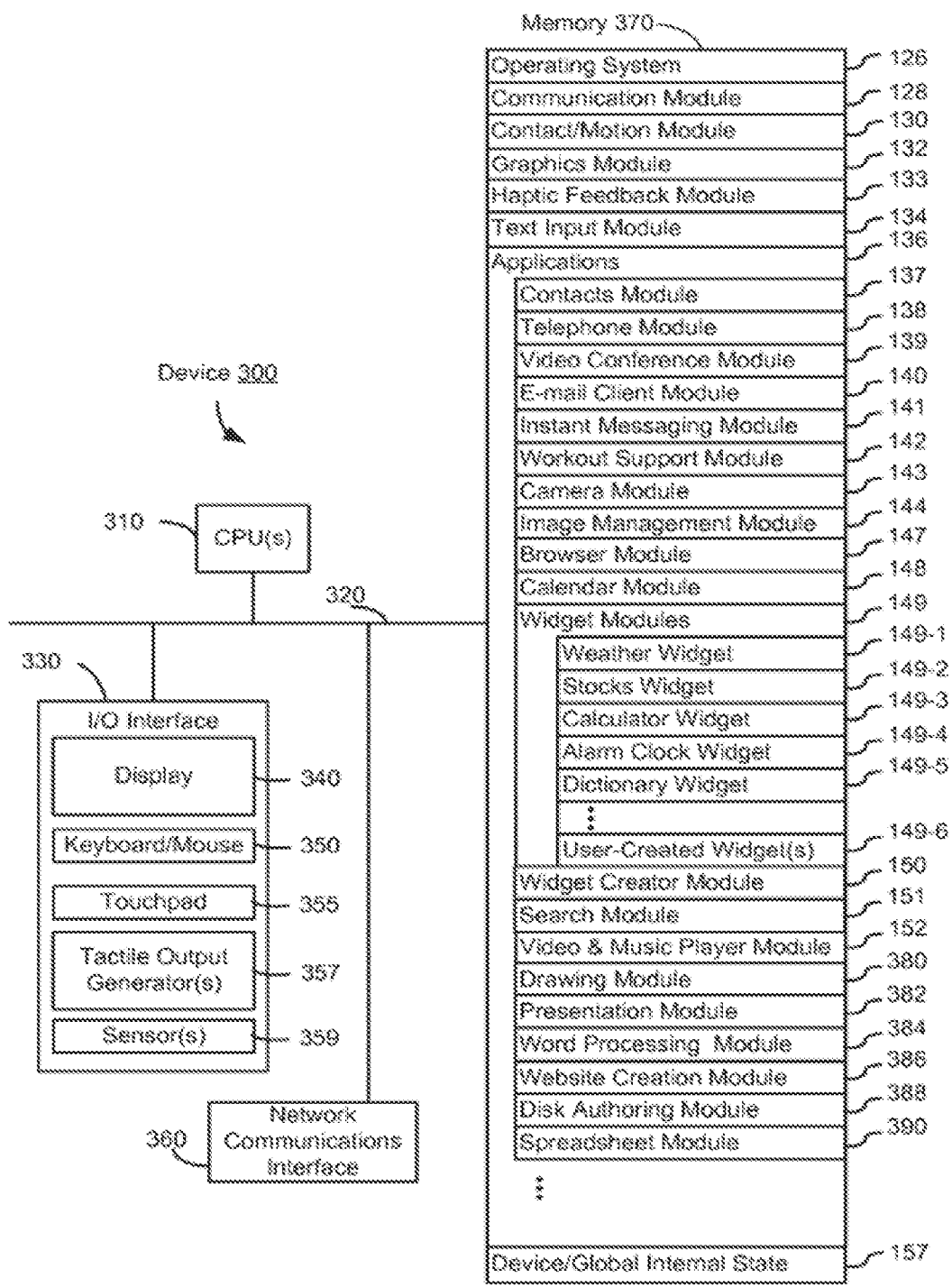
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail or email client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), email address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in some embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, a "menu button" is implemented using a touchpad. In some embodiments, the menu button is a physical push button or other physical input control device instead of a touchpad.

Figure 1B:
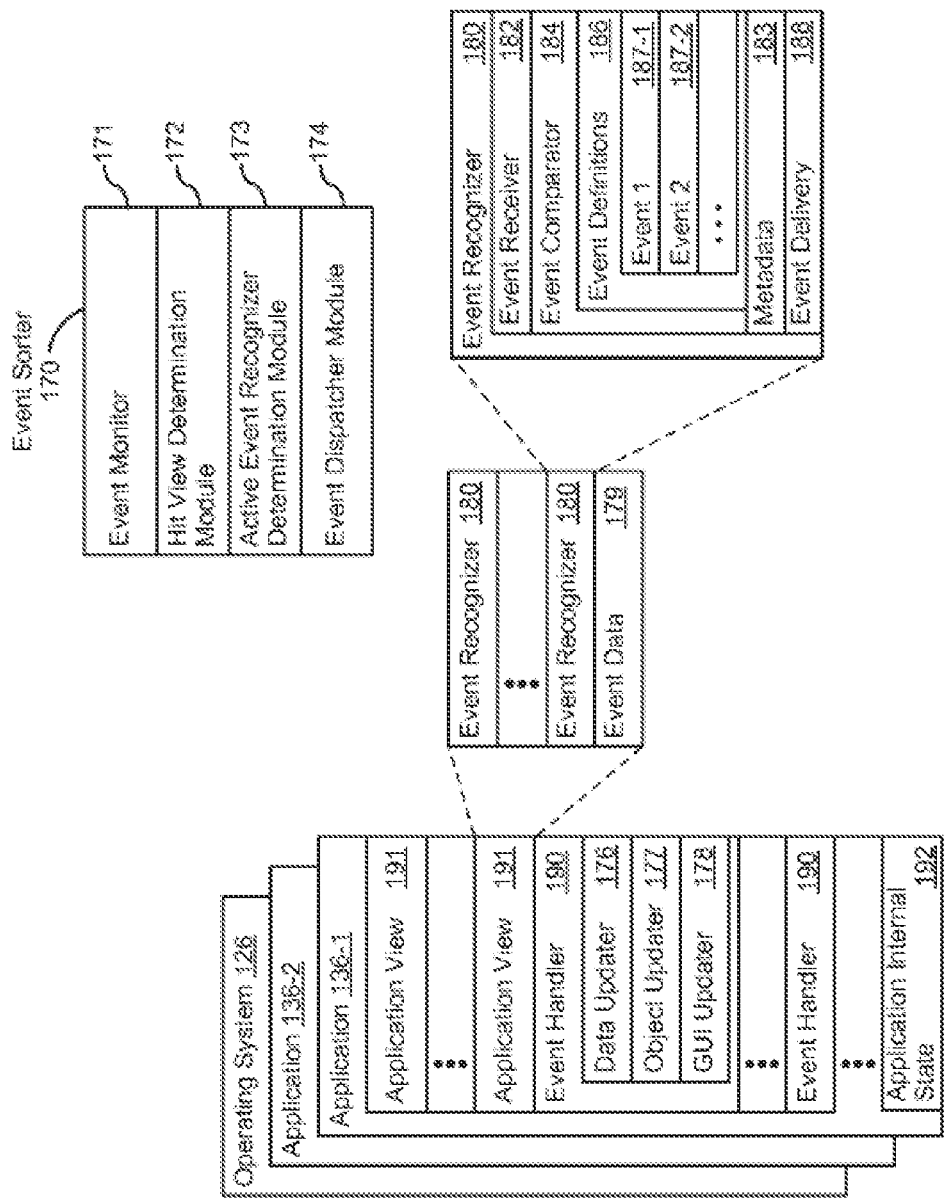
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
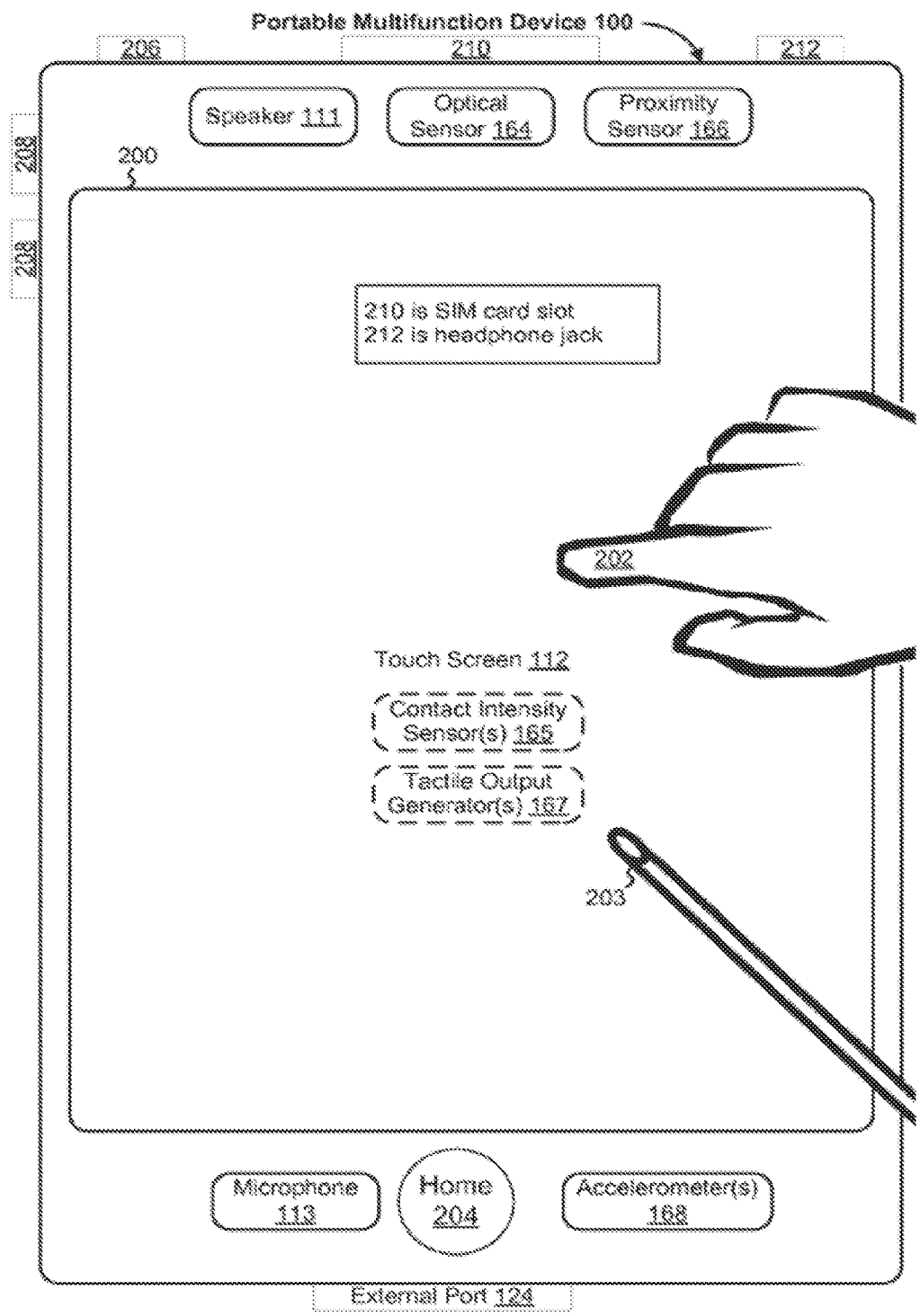
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In some embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. In some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in some embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
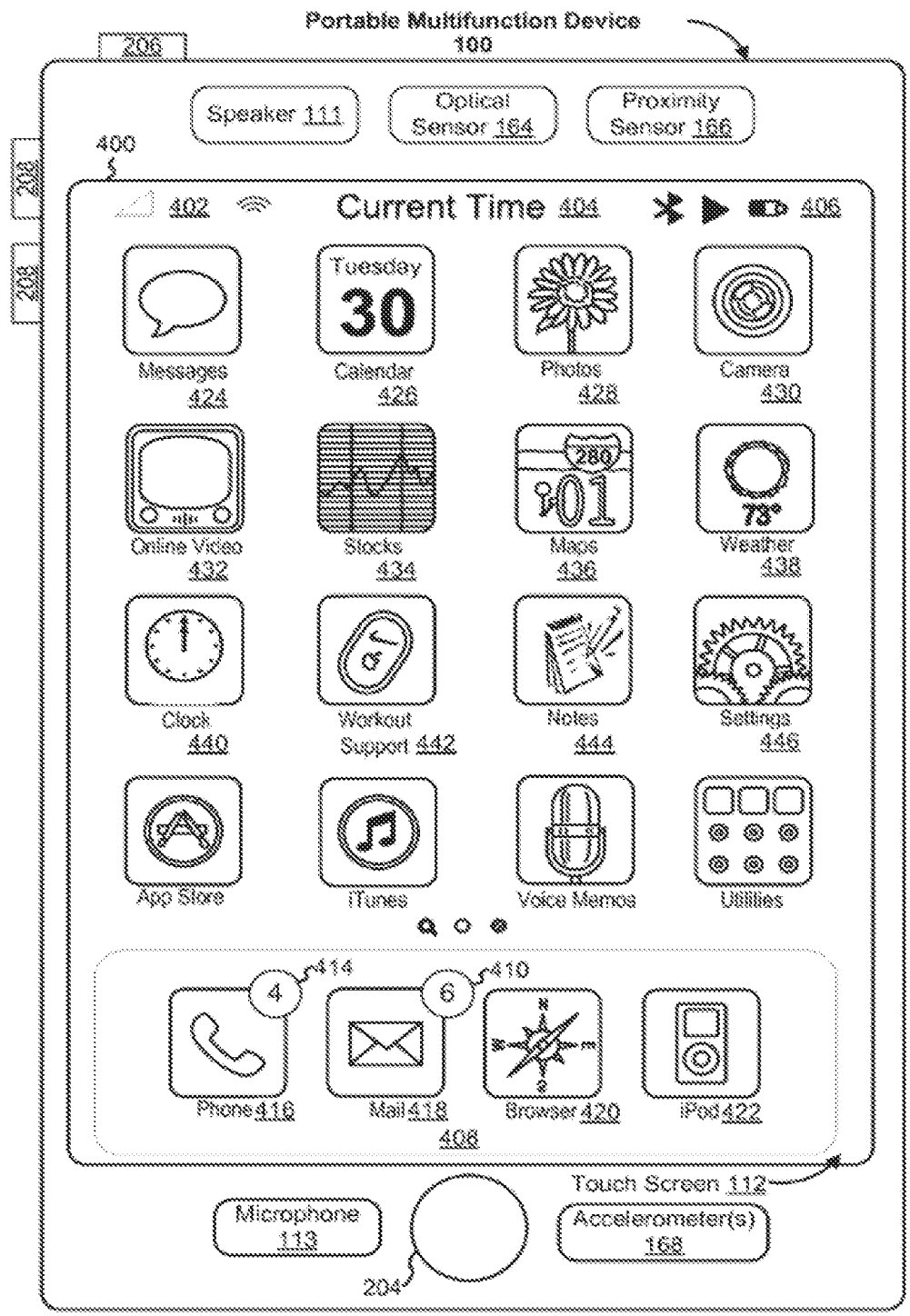
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for email client module 140, labeled "Mail," which optionally includes an indicator 410 of the number of unread e-mails;
  - Icon 420 for browser module 147, labeled "Browser"; and
  - Icon 422 for video and music player module 152, also referred to as iPod (trademark of Apple Inc.) module 152, labeled "iPod"; and
- Icons for other applications, such as:
  - Icon 424 for IM module 141, labeled "Text";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Map";
  - Icon 438 for weather widget 149-1, labeled "Weather";
  - Icon 440 for alarm clock widget 149-4, labeled "Clock";
  - Icon 442 for workout support module 142, labeled "Workout Support";
  - Icon 444 for notes module 153, labeled "Notes"; and
  - Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
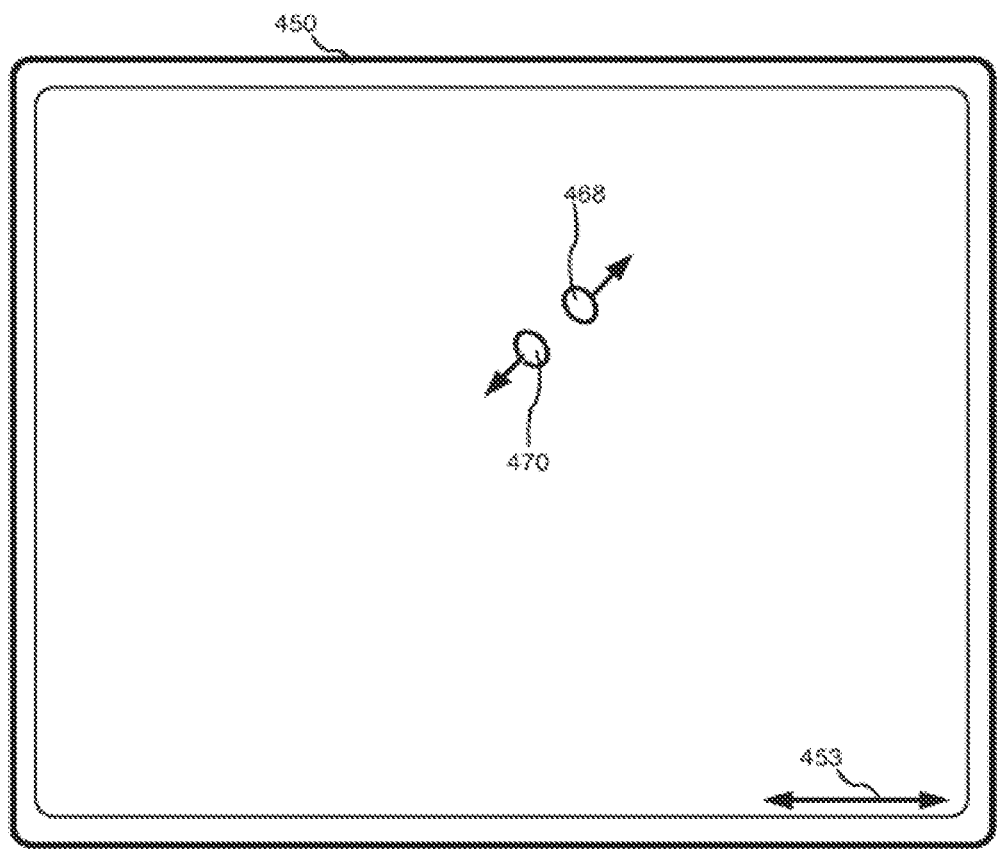
FIG. 4B illustrates an exemplary user interface for a multifunction device with a touch-sensitive surface that is separate from the display in accordance with some embodiments.
Figure 4B:
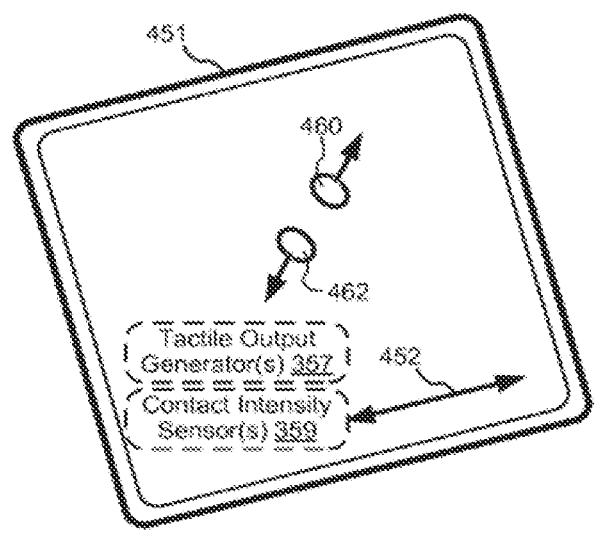

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357 for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with some embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Attention is now directed towards embodiments of user interfaces ("UI") and associated processes that optionally are implemented on an electronic device with a display and a touch-sensitive surface, such as device 300 or portable multifunction device 100.

As mentioned previously, the device 100 includes multiple applications 136 configured to execute on the device 100. One of the multiple applications 136 is the email client module 140 and a user can interact with the application on the computing device 100. As will be further described below, the email client module 140 has various user interfaces to enhance the user experience with the computing device 100 when using the application.

User Interface of a Portrait and Landscape Springboard

Figure 5:
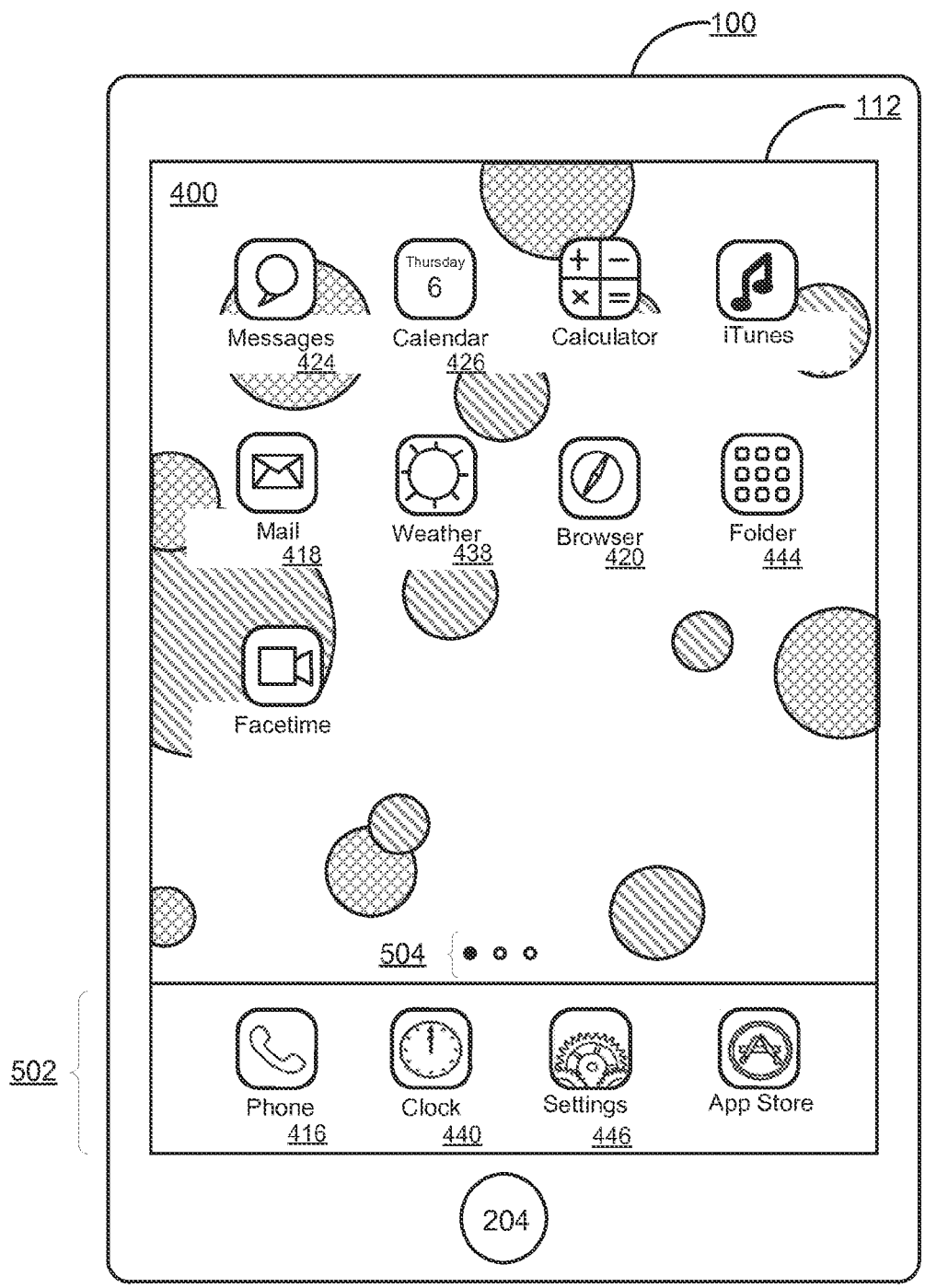
FIG. 5 illustrates a particular user interface orientation (UI-orientation) of the user interface 400 relative to the display 112, according to some embodiments.

FIG. 5 illustrates a particular user interface orientation (UI-orientation) of the user interface 400 relative to the display 112, according to some embodiments. The particular UI-orientation shown is a portrait orientation or portrait view of the user interface 400, also known as a "portrait springboard" layout, for applications of the device 100. As shown in FIG. 5, in some embodiments, the user interface 400 is a rectangular region that has a short dimension and a long dimension. The sides of user interface 400 are also referred to as edges with the bottom (lower), top (upper), left and right edge determined by both the viewing perspective and orientation of the device 100 or as defined by industry standards. In the portrait orientation the short dimension of the user interface is parallel to the bottom and top edge, while the long dimension is parallel to the right and left edge. In comparison, in the landscape orientation the bottom and top edge are parallel to the long dimension of the user interface with the right and left edge being parallel to the short dimension.

The portrait orientation in FIG. 5 shows a dock region 502, e.g., the tray 408, at the bottom edge along the short dimension of the user interfaces 400. In portrait orientation the short dimension forms the user interface's horizon, and the dock region 502 is displayed in a horizontal orientation with respect to the user interface. The bottom edge is closest to the side of the device 100 that includes a physical button, e.g., the "home" or menu button 204. In some embodiments, the portrait orientation of the user interface 400 is reversed (upside down) with the menu button 204 closest to the top edge of the user interface 400, while the dock region is displayed at the user interface's bottom edge.

In some embodiments, the physical button is a home button that is a sole button on the side of the device that includes the display. In some embodiments, the home button serves as a multi-function user interface navigation button which when activated while a folder or application is displayed, causes a home screen or application launch screen to be displayed. In some embodiments, the home button has additional function such as switching to a multitasking user interface (e.g., in response to detecting a double press input) or switching to a digital assistant user interface (e.g., in response to detecting a long press input that is longer than a predetermined time threshold such as 0.1, 0.2, 0.3, 0.4, or 0.5 seconds)

User interface objects (UI objects) for applications or modules optionally are displayed on the user interface 400 in the dock region 502 or a region of the user interface outside the dock region. For example, a first set of UI objects, e.g., icons, for the following applications or modules are displayed on the region outside the dock region 502:

Icon 424 for IM module 141, labeled "Messages";
Icon 426 for calendar module 148, labeled "Calendar";
Icon for calculator widget 149-3, labeled "Calculator";
Icon for video and music player module 152, labeled "iTunes";
Icon 418 for email client module 140, labeled "Mail," which optionally includes an indicator 410 of the number of unread emails;
Icon 438 for weather widget 149-1, labeled "Weather";
Icon 420 for browser module 147, labeled "Browser";
Icon for folder module, which provides access to a folder window, labeled "Folder"; and
Icon for video conferencing module 139, labeled "Facetime."

A second set of UI objects, for the following applications or modules are shown in ("placed on") the dock region 502:

Icon 416 for telephone module 138, labeled "Phone," which optionally includes an indicator 414 of the number of missed calls or voicemail messages;
Icon 440 for alarm clock widget 149-4, labeled "Clock";
Icon 446 for a settings application or module, which provides access to settings for device 100 and its various applications 136; and
Icon for an application store module, which provides access to a store for online downloading and purchasing applications and modules for device 100.

In some embodiments, different and/or additional icons can be presented on the user interface 400. In some embodiments, the user interface objects includes, but are not limited to one or more icons, widgets, application windows, folder windows, pages, and other display objects.

As shown in FIG. 5, in some embodiments, the portrait orientation, also include a page indicator 504 and a wallpaper 506 displayed on the user interface 400 with the wallpaper's pattern shown in portrait orientation. In some embodiments, the page indicator and wallpaper are displayed in the region of the user interface 400 above dock region 502 with the dock region having a different background. The wallpaper is displayed in the background of the user interface while other UI objects including the dock region are displayed in front of the wallpaper, thereby covering the wallpaper. In some embodiments, the dock region and/or UI objects are transparent with the wallpaper showing through the transparent dock region and/or UI objects. The page indicator 504 indicates the number of pages of the user interface 400, e.g., each dot representing a page, and which of the pages is being displayed on the display 112, e.g., the visibly distinguishable (filled) dot representing the displayed page in the sequence of pages. As shown in FIG. 5, the page indicator 504 is displayed close to the dock region 502 in a horizontal orientation with respect to the user interface.

Figure 6:
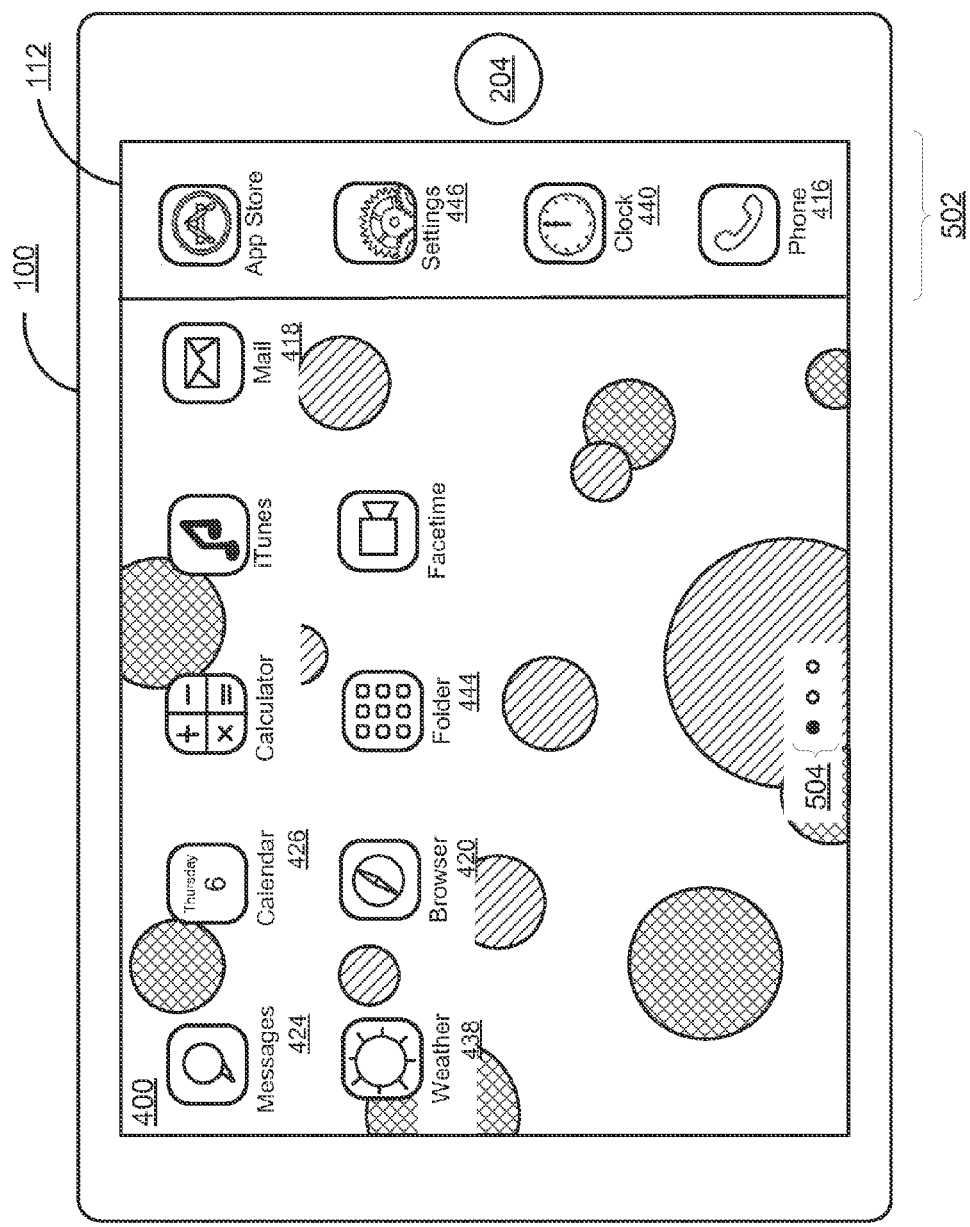
FIG. 6 illustrates a landscape orientation or landscape view of the user interface 400, also known as a "landscape springboard" layout, for applications of the device 100, according to some embodiments.

FIG. 6 illustrates a landscape orientation or landscape view of the user interface 400, also known as a "landscape springboard" layout, for applications of the device 100, according to some embodiments. The landscape orientation in FIG. 6 shows the dock region 502 at the right edge along the short dimension of the user interface 400 (e.g., so that the dock region is near a thumb of a right handed user). The examples below will be described primarily with respect to the dock region being displayed on the right side of the display when the user interface is in a landscape orientation. However, for some users (e.g., left handed users) it would be more convenient to have the dock displayed on the left side of the user interface in landscape orientation. Thus, in some embodiments, the dock region is preferentially displayed on the left side of the user interface when the user interface is in landscape orientation (e.g., and the animations described below are reversed so that the dock is displayed on a left side of the user interface while in landscape orientation). In some embodiments, there is a user selectable preference that determines whether the dock region is displayed on the left side or the right side of the user interface. In some embodiments, the handedness of the user is determined automatically (e.g., based on usage patterns of the device and or based on whether there is a leftward bias (for left handed users) or rightward bias (for right handed users) when typing with one hand), and the dock region is set to be displayed preferentially on the right side of the user interface in landscape orientation when the user is detected to be a right handed user, and the dock region is set to be displayed preferentially on the left side of the user interface in landscape orientation when the user is detected to be a left handed user.

In the landscape orientation shown in FIG. 6, the long dimensions forms the horizon of the user interface, and the dock region 502 is displayed in a vertical orientation with respect to the user interface. As shown in FIG. 6, in some embodiments, the dock region 502 is also closest to the side of device 100 that includes the menu button 204. In some embodiment, the landscape orientation of the user interface is reversed (upside down) with the menu button 204 closest to left edge of the user interface 400, while the dock region is displayed at the opposite, right edge. In some embodiments, the dock region 502 is displayed along the left edge of the user interface independent of where the menu button 204 is located on the device 100. In some embodiments, the dock region 502 is "pinned" to the menu button, meaning that the dock region is displayed along the edge closest to the menu button if that edge is also along the short dimension. In some circumstances, reversing the landscape orientation has the effect that the dock region 502 also moves from left to right or right to left while being displayed along the edge of the user interface closest to the menu button.

In some embodiments, as illustrated in FIG. 6, the page indicator 504 and the wallpaper 506 are also displayed in landscape orientation. In landscape orientation as in portrait orientation the page indicator and wallpaper are displayed in the region of the user interface 400 outside dock region 502 with the dock region having a different background. The wallpaper is displayed in the background with other UI objects in the front, thereby covering the wallpaper. In some embodiments, the dock region and/or UI objects are transparent with the wallpaper showing through the transparent dock region and/or UI objects. The orientation of the wallpaper background is identical between landscape and portrait view of the user interface 400. For example in FIGS. 5 and 6, the wallpaper pattern (circles with line patterns) maintains the identical orientation relative to the display 112, including the menu button 204 on the side of the display, regardless of the UI-orientation. Changing the UI-orientation from portrait (FIG. 5) to landscape view (FIG. 6) does not change the orientation of the wallpaper back. As shown in FIG. 6, in some embodiments, the page indicator 504 is displayed in a horizontal orientation with respect to the user interface close to the bottom edge of user interface 400.

Figure 7A:
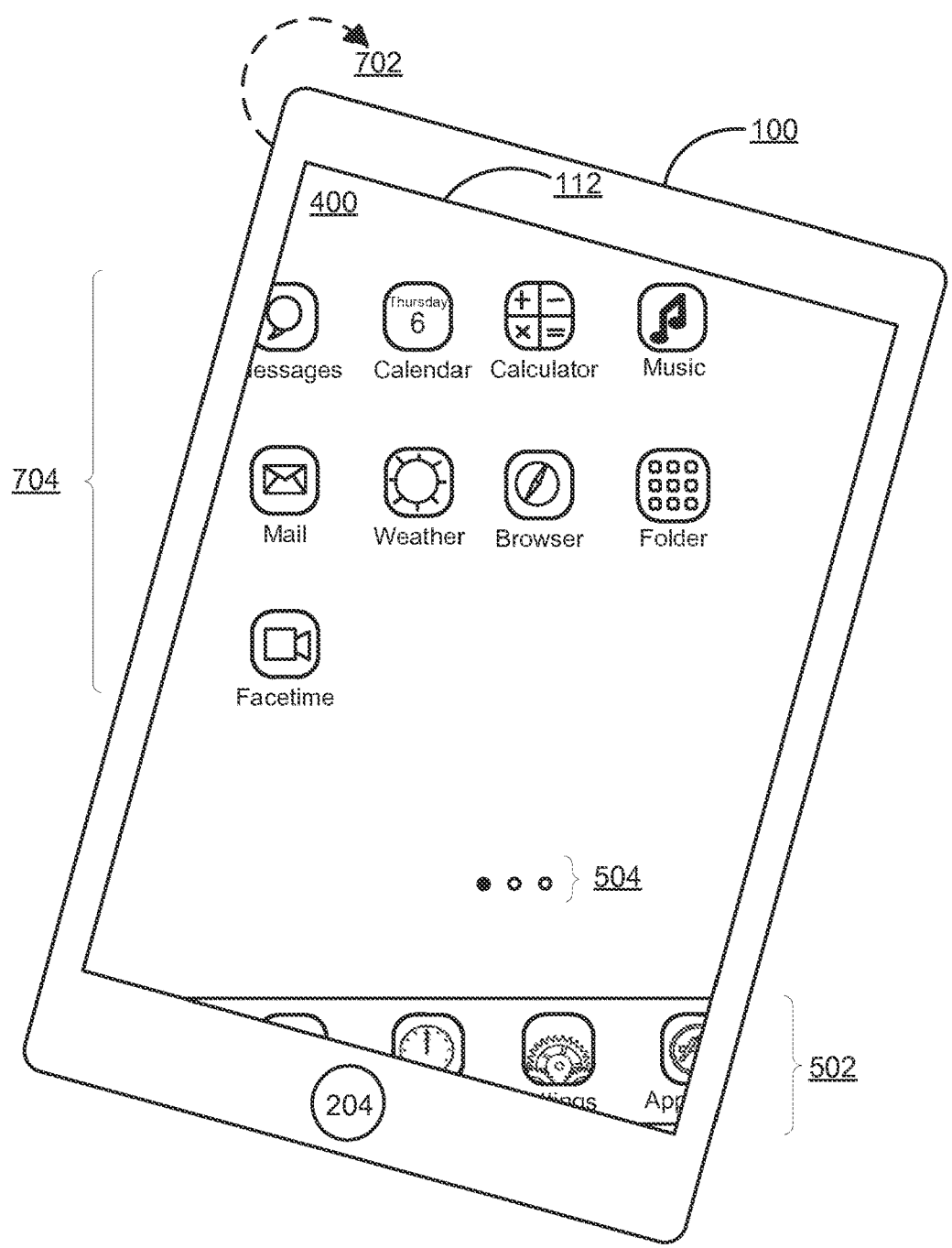
FIG. 7A illustrates the transition of the user interface 400 from portrait orientation to landscape orientation by clockwise rotating the device 100, according to some embodiments.

FIGS. 7A-E illustrate the transition of the user interface 400 from portrait orientation to landscape orientation by clockwise rotating the device 100, according to some embodiments. Initially, the device displays the user interface in the portrait orientation. By rotating 702 as shown in FIG. 7A the device 100 detects a UI-orientation change condition while displaying the user interface in the portrait orientation. The UI-orientation change condition is an event that indicates to the device 100 to change the UI-orientation. This event is triggered for example by rotating the device 100 from one orientation to another (e.g., from a portrait to a landscape orientation, or vice versa). The device 100 generates information optionally associated with each event. For a UI-orientation change condition the event information includes information about the orientation (also called device attitude) of the device and the time that the event occurred. The event comparator 184 compares the event information to earlier event information and, based on the comparison, determines whether a change in condition, e.g. the orientation of the device, has been met. In some embodiments, an orientation sensor such as a magnetometer or an accelerometer indicates that the device and/or the display has changed orientation relative to a respective frame of reference such as the earth's magnetic field or the earth's gravitational field.

In some embodiments, by changing the device orientation from portrait to landscape orientation, or vice versa, the transition of the user interface 400 between the two orientations is delayed until the device is fully oriented in the latter orientation (or until the device rotates by more than a threshold amount such as 10, 15, 20, 30, or 45 degrees). For example, when rotating the device from portrait into landscape orientation, the landscape orientation of the user interface is not shown on the display 112 until the device 100 is fully rotated into landscape orientation. In some embodiments, the display of the landscape orientation of the user interface is even further delayed once the device is oriented into landscape view. For example, the landscape view of the user interface is not displayed on the device for a few frames of the refreshed display after the event comparator determines that the device is oriented in landscape view. In some embodiments, the delay ranges from less than 1 millisecond to 10-20 milliseconds, depending on the refresh rate of the display.

In some embodiments, the transition of user interface from portrait to landscape view, or vice versa, is displayed on the display 112 while the device 100 changes its orientation. For example, the device 100 changes the display of the user interface 400 while the user rotates the device from portrait to landscape orientation, or vice versa (e.g., so that the orientation of the icons is maintained relative to the user while the device is rotating).

Referring to FIG. 7A, by clockwise rotating 702 around an axis approximately perpendicular to the display 112 the device 100 detects a UI-orientation change condition. Prior to the rotation the device 100 displays the user interface 400 in a portrait view as shown in FIG. 5. The orientation of the user interface in FIG. 5 forms a fixed frame of reference for the transition of the user interface between portrait and landscape view. In this frame of reference the device 100 and its display 112 are rotating clockwise. In this frame of reference, the UI-objects 704 outside the dock region maintain their position and do not move as the device 100 is rotated slightly to the right. Without moving any displayed UI objects 704 outside the dock region relative to the frame of reference, their positions, and thus their distances, relative to each other remain the same during a slight rotation of the device 100. Relative to the display 112, the UI objects 704 are slightly rotated counterclockwise while maintaining their relative positions to each other. Similarly, the page indicator 504 remains fixed in the frame of reference, while slightly rotated counterclockwise relative to the display 112, and maintaining its relative position to the UI objects 704 and its horizontal orientation relative to the frame of reference.

As shown in FIG. 7A, in some embodiments, the dock region 502, including the UI objects (icons) displayed within the dock region, moves (slides) away from the UI objects 704 in a lateral downward direction relative to the frame of reference while continuously being displayed at the bottom edge of the display. Through this lateral movement and the rotation of the device, a portion of the dock region 502 and some of its icons move off the display 112, and are displayed only partially or not at all. Furthermore, the distance between the dock region 502 and the page indicator 504 increases due to the dock region's lateral movement. Similarly, the distance between the dock region 502 and the UI objects 704 displayed outside the dock regions increases. Relative to the display 112, the dock region rotates slightly counterclockwise while moving away from the display's center. As shown in FIG. 7A, in some embodiments, the menu button 204 is located at the bottom edge. In some embodiments, the dock region remains at the bottom edge during rotation despite the menu button being located at the top edge of the display.

Figure 7B:
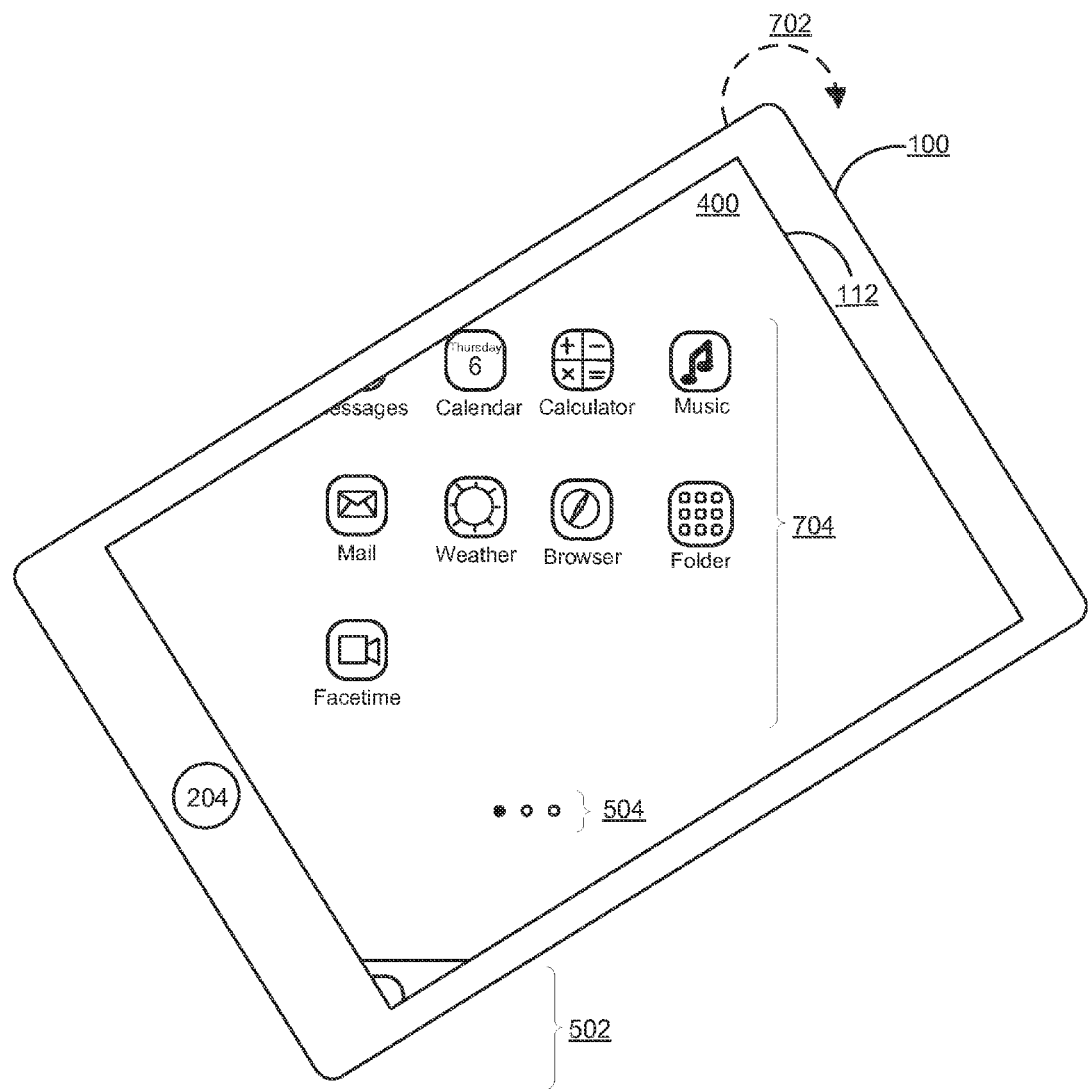
FIG. 7B illustrates the transition of the user interface 400 from portrait orientation to landscape orientation by clockwise rotating the device 100, according to some embodiments.

As illustrated in FIG. 7B, upon further clockwise rotation 702 of the device 100, the dock region 504 continues its lateral downward movement relative to the frame of reference. An even larger portion of the dock region 502 and its icons are moved off the display 112, thus being displayed only partially or not at all. The distance between the dock region 502 and the page indicator 504 or the UI objects 704 is further increased. In addition, some of the UI objects 704 are moved off the display 112, while the UI object 704 and the page indicator 504 maintain their positions relative to the frame of reference and relative to each other. In relation to the display 112, the UI objects 704, the page indicator 504, and the dock region 502 are further rotated counterclockwise with the dock region further moving away from the display's center.

Figure 7C:
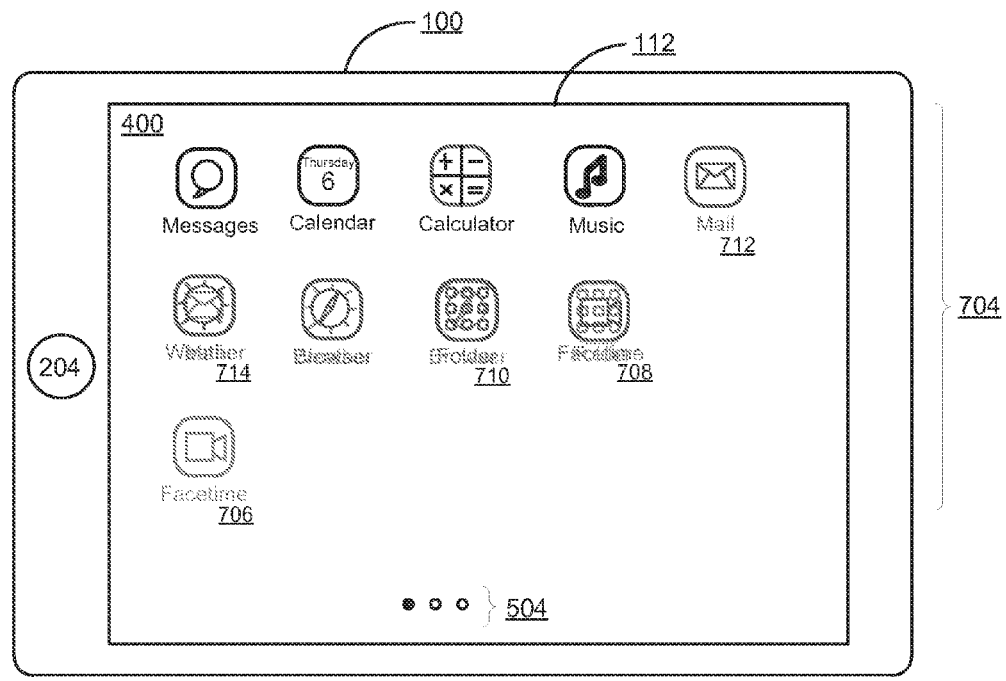
FIG. 7C illustrates the transition of the user interface 400 from portrait orientation to landscape orientation by clockwise rotating the device 100, according to some embodiments.

As shown in FIG. 7C, in some embodiments, upon the display 112 reaching the landscape orientation some of UI objects 704 from the portrait UI view are crossfading into new positions in the landscape view with the dock region and the dock icons fully moved off and not being displayed on the user interface. While crossfading the UI objects maintain their relative orientation to the frame of reference. For example, the "Facetime" icon 706 is crossfading to the position that the "Folder" icon 708 occupies in the portrait view. Similarly, the "Folder" icon 708 in portrait view is crossfading into the position of the "Browser" icon 710 in portrait view. In some embodiments, the crossfading icons are translucent and overlaid on top of the portrait view icons. As indicated in FIG. 7C showing crossfading icons in different greys, at times both overlaid icons are visible on the display 112, while the portrait view icons are fading out from underneath the overlaid icons. Furthermore, the landscape orientation's left-to-right, top-to-bottom order of the UI objects 704 is identical to the UI objects' left-to-right, top-to-bottom order in portrait orientation of the user interface. For example as shown in FIGS. 7A-E, the order of the icons is "Messages," "Calendar," "Calculator," "Music," "Mail," "Weather," "Browser," "Folder," and "Facetime" regardless of the UI-orientation.

In some embodiments, some UI objects 704 from the portrait UI view are displayed at new positions of the user interface in the landscape view, but maintaining their relative orientation to the frame of reference. No UI objects 704 from the portrait view are located at these positions due to UI objects maintaining their relative positions to each other (originally distributed along the UI's short dimension) and UI's long dimension now being horizontally aligned. For example, the "Mail" icon 712 is moved to a position to the right of the "Music" icon with no icon having been displayed at that position on the user interface 400. In addition, as shown in FIG. 7C, the "Mail" icon at its position in portrait view is crossfading into "Weather" Icon 714 in the landscape view of the user interface. In some embodiments, the horizontal distance between the UI objects 704 relative to each other is increased by a pre-defined length to fill out the entire region of user interface along its horizontal direction. In some embodiments, the vertical distance between UI objects 704 is also increased to maintain the same proportional spacing of UI objects to each other between the portrait and landscape view. In some embodiments, the horizontal and vertical distances between UI objects 704 are decreased in order to display a larger number of UI objects on the user interface in the landscape orientation.

Furthermore, the page indicator 504 and the non-crossfading UI objects 704 maintain their orientation relative to the frame of reference. Relative to the display 112 the page indicator 504 and the non-crossfading UI objects 704 rotate further counterclockwise until horizontally aligned with the UI's long dimension. In some embodiments, the page indicator and non-crossfading UI objects maintain their positions relative to each other. In some embodiments, the page indicator 504 is moved in a vertical direction relative to the frame of reference so that the page indicator is displayed close to the UI's bottom edge in the landscape orientation. In some embodiments, the spacing of the non-crossfading UI objects is adjusted to coincide with any increased or decreased spacing of crossfading UI objects as described above.

Figure 7D:
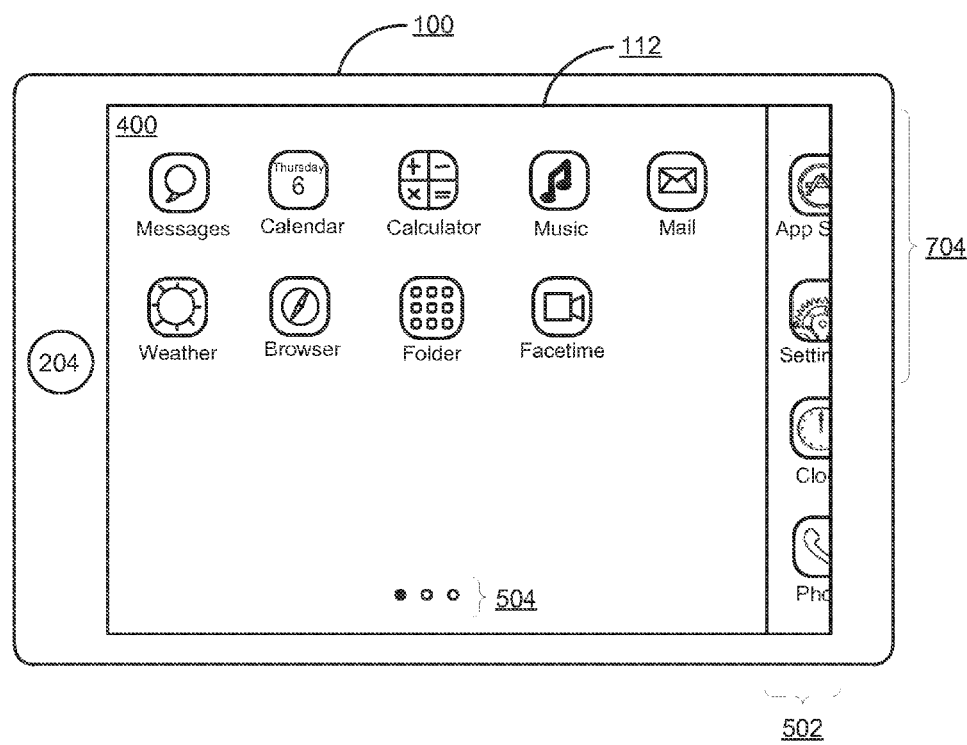
FIG. 7D illustrates the transition of the user interface 400 from portrait orientation to landscape orientation by clockwise rotating the device 100, according to some embodiments.

As shown in FIG. 7D, in some embodiments, the dock region 502 slides back onto the user interface from the right edge of the user interface 400 in landscape orientation. In some embodiments, the dock region slides back from the UI's left edge in landscape orientation. In the landscape orientation, both edges, left or right, coincide with the UI's short dimension. Thus, the dock region 502 in the UI's landscape orientation is displayed in a vertical orientation relative to the display 112 with the dock icons arranged in a linear column. The sliding back of the dock region includes a subsequent display of increasing portions of the dock region including its dock icons. The displayed portions of dock region 504 optionally do not overlap with any UI objects 704. In some embodiments, the UI objects 704 and/or page indicator 504 are moving horizontally to the left without sliding off the UI while the dock region 502 is sliding back onto the user interface. In some embodiments, the horizontal spacing between UI objects 704 is decreased to accommodate the dock region being displayed on the UI. In some embodiments, the UI objects 704 and page indicator 504 maintains their positions relative to each other and the frame of reference without the displayed portion of the dock region overlapping with any UI objects 704.

In FIG. 7D with the dock region sliding back from the UI's right edge, UI objects on the dock region (dock icons) are displayed in a top-bottom order that is identical to the right-left order of the same UI objects in the portrait orientation shown in FIG. 5. For example, the top-bottom order of the dock icons is "App Store," "Settings," "Clock," and "Phone," which is the same order of these icons on the dock region in the UI's portrait view (FIG. 5) when going right to left. In some embodiments, the top-bottom order of the dock icons in landscape orientation is reversed to the right-left order in portrait orientation of the user interface. In particular, the order of the dock icons is reversed in case of the dock region sliding back onto the user interface from the UI's left edge.

Figure 7E:
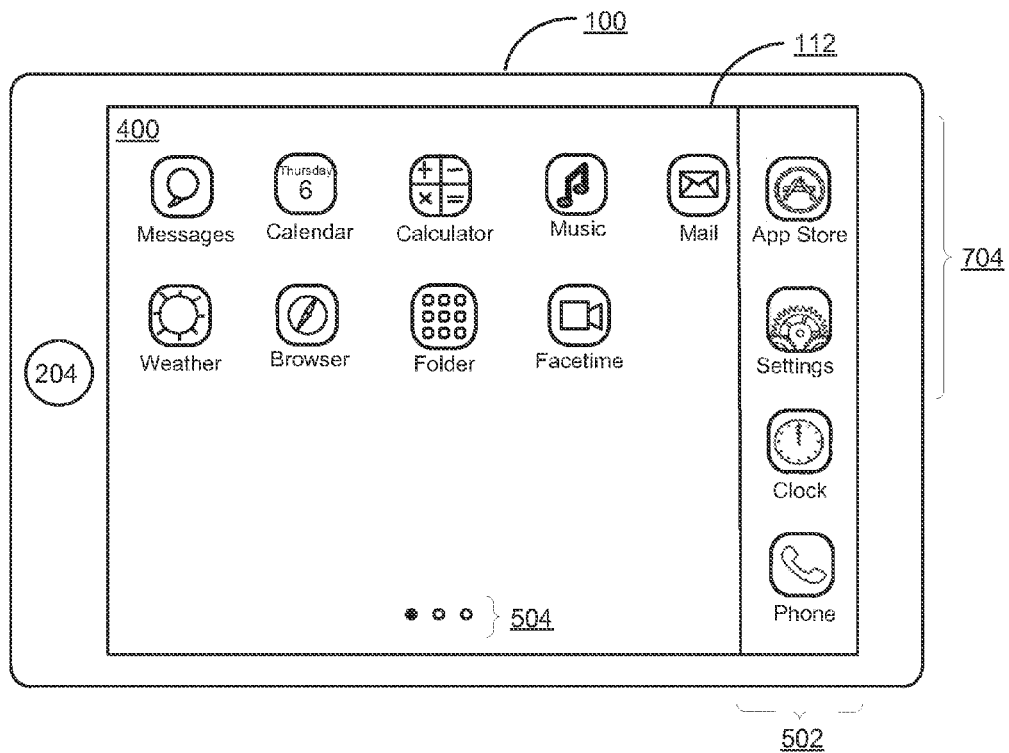
FIG. 7E illustrates the transition of the user interface 400 from portrait orientation to landscape orientation by clockwise rotating the device 100, according to some embodiments.

FIG. 7E, similar to FIG. 6, shows the landscape orientation of the user interface 400 with the dock region 502 fully displayed along the UI's right edge of the user, according to some embodiments. As shown in FIG. 7E and FIG. 6, in some embodiments, the menu button 204 in FIG. 7E differs in being located closest to the left edge and in FIG. 6 being closest to the right edge and the dock region 502. FIG. 7E and FIG. 6 illustrate the end of the transition of the user interface 400 from portrait orientation to landscape orientation by clockwise rotating the device 100.

Figure 8A:
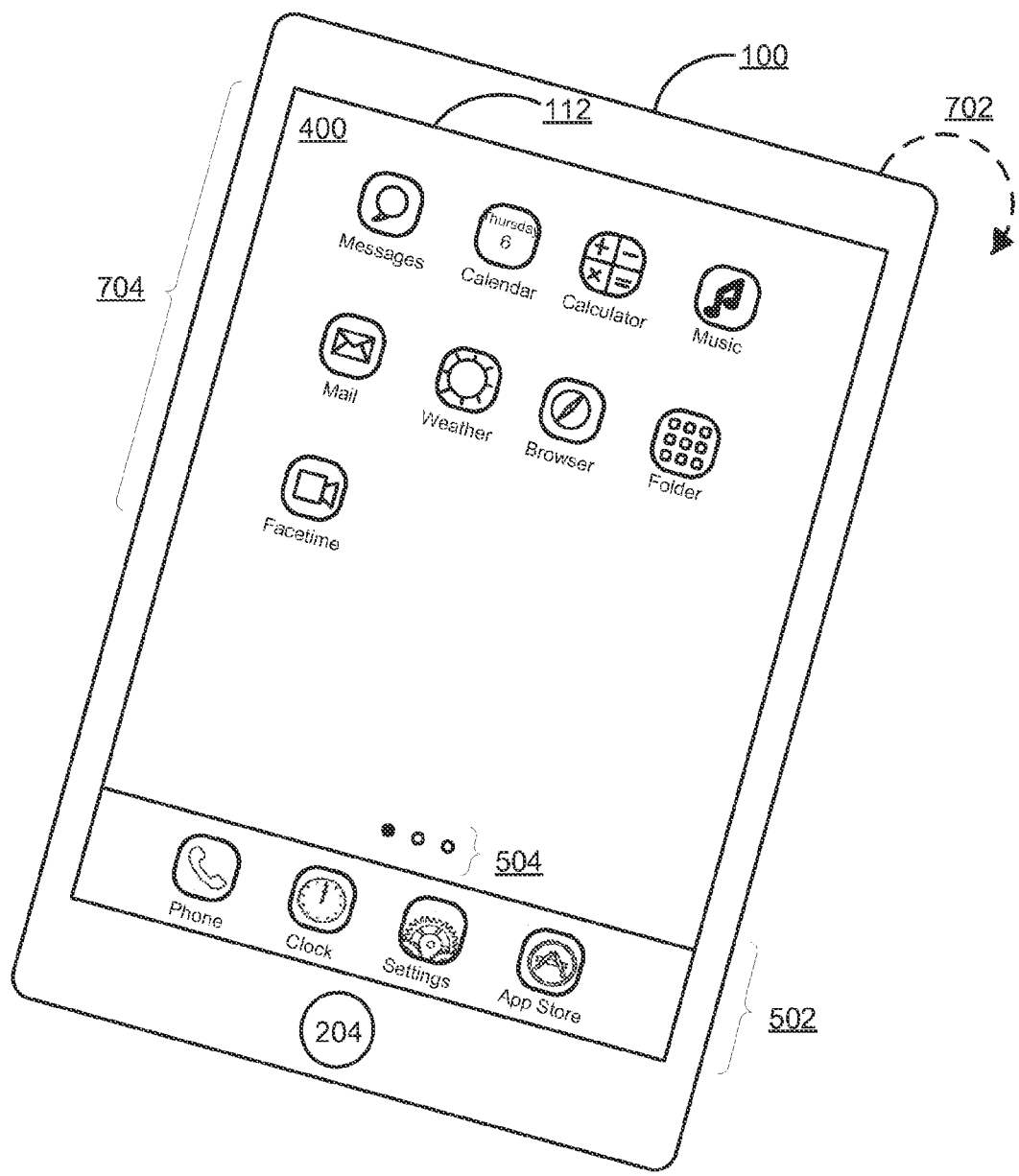
FIG. 8A illustrates another transition of the user interface 400 from portrait orientation to landscape orientation by clockwise rotating the device 100, according to some embodiments.
Figure 8B:
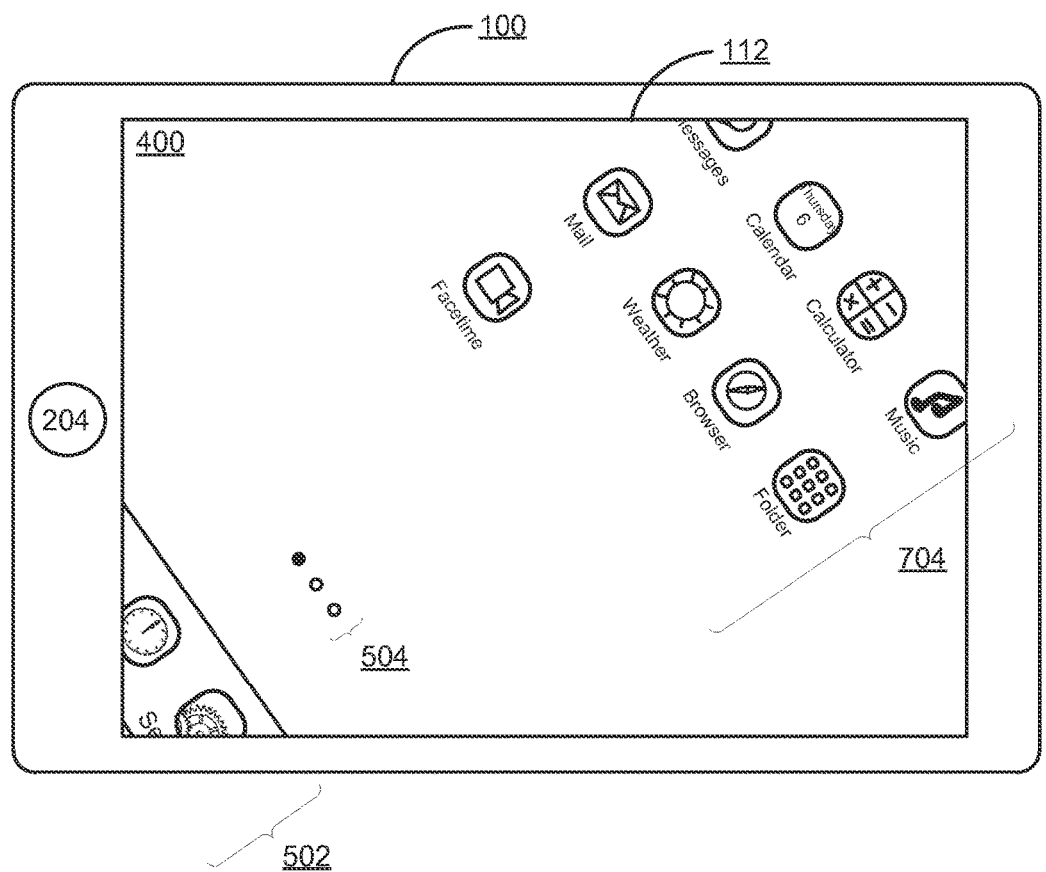
FIG. 8B illustrates another transition of the user interface 400 from portrait orientation to landscape orientation by clockwise rotating the device 100, according to some embodiments.

FIGS. 8A-E illustrates another transition of the user interface 400 from portrait orientation to landscape orientation by clockwise rotating the device 100, according to some embodiments. Initially, the device displays the user interface in the portrait orientation. By rotating 702 as shown in FIG. 8A the device 100 detects a UI-orientation change condition while displaying the user interface in the portrait orientation. In some embodiments, the transition of the user interface 400 between the two UI-orientations is delayed until the display 112 is fully oriented in the landscape orientation. For example, the landscape view of the user interface is not displayed on the device for a few frames of the refreshed display after the event comparator 184 determines that the device is oriented in landscape view. In another example, landscape view of the user interface is delayed by less than 1 millisecond. In yet another example, the delay of displaying the landscape view within the range of 10-20 milliseconds, and optionally also depends on the refresh rate of the display. The final orientation of the display 112 as shown in FIG. 8B with the UI's long dimension aligned horizontally forms a frame of reference for the transition of the user interface between portrait and landscape view.

As shown in FIG. 8A, when slightly rotating the display from portrait into landscape orientation as illustrated in FIG. 8A, the user interface 400 stays in the portrait orientation relative to the display 112. In relation to the frame of reference the user interface in portrait view rotates clockwise with the display. This optionally includes the UI objects 704, the dock region 502, including any dock icons, and the page indicator 504 maintain their positions relative to each other and relative to the display 112. Thus, the distances among the UI objects 704, the dock region 502, and the page indicator 504 do not change during the rotation of the display 112.

As illustrated in FIG. 8B, the transition of user interface 400 between portrait and landscape view begins after the display 112 is fully oriented in the landscape orientation. In some embodiments, the user interface initially zooms out of the portrait view during the transition, before zooming back in at the end of the transition. In zooming out, the relative distances between the UI objects 704, the page indicator 504, and the dock region 502 are decreased, resulting in their respective locations on the user interface being closer together. In zooming in, the relative distances between the UI objects 704 and the page indicator 504 are increased.

From the portrait view with the dock region 502 aligned vertically, the UI objects 704 and page indicator 502 are rotating counterclockwise relative to the display while maintaining their relative positions to each other. The dock region 502, including the UI objects (icons) displayed within the dock region, rotates counterclockwise along with the UI objects and page indicator and relative to the display 112. In addition to rotating, the dock region moves (slides) away from the UI objects 704 in a downward linear direction and off lower edge of the UI's frame of reference that also rotates counterclockwise in step with the rotating UI objects 704 and page indicator 502. Through this linear movement and the rotation of the device, a portion of the dock region 502 and some of its icons move off the display 112, and are displayed only partially or not at all. Furthermore, the distance between the dock region 502 and the page indicator 504 increases due to the dock region's lateral movement. Similarly, the distance between the dock region 502 and the UI objects 704 displayed outside the dock regions increases. During the rotation and linear movement, the dock region maintains its orientation relative to the rotating frame of reference. As shown in FIG. 8B, in some embodiments, the menu button 204 is located at the left edge of the UI close to the dock region 502. In some embodiments, the dock region undergoes the identical rotation and linear movement to the left edge of the UI despite the menu button being located at near the UI's right edge.

Figure 8C:
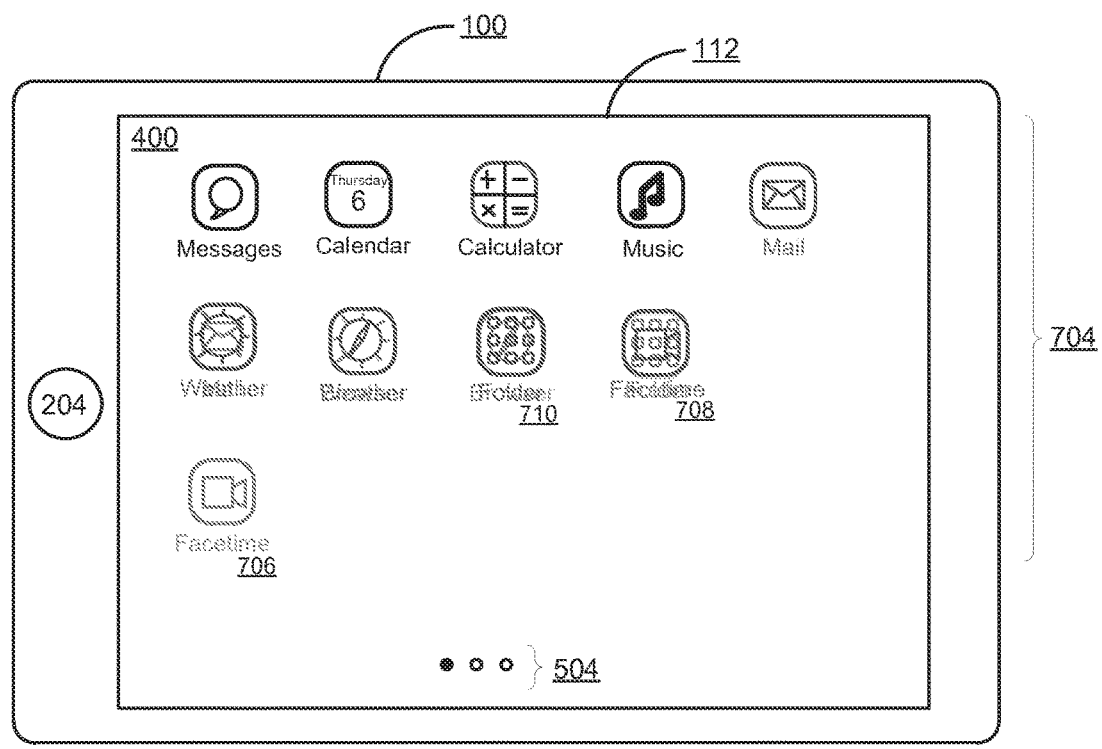
FIG. 8C illustrates another transition of the user interface 400 from portrait orientation to landscape orientation by clockwise rotating the device 100, according to some embodiments.

In FIG. 8C, similar to FIG. 7C, with UI objects fully rotated and orientated horizontally relative to the display, the dock region and its icons are moved off the UI and some of UI objects 704 from the portrait view are crossfading into new positions in the landscape view. While crossfading the UI objects maintain their relative orientation to the display 112. For example, the "Facetime" icon 706 is crossfading to the position that the "Folder" icon 708 occupies in the portrait view. Similarly, the "Folder" icon 708 in portrait view is crossfading into the position of the "Browser" icon 710 in portrait view. As described with reference to FIG. 7C, the crossfading icons are translucent and overlaid on top of the portrait view icons. Furthermore, in the landscape orientation, left-to-right, top-to-bottom order of the UI objects 704 is identical to the UI objects' left-to-right, top-to-bottom order in portrait orientation of the user interface. In some embodiments, some UI objects 704 from the portrait UI view are displayed at new positions of the user interface in the landscape view, but maintaining their relative orientation to the frame of reference as described with reference to FIG. 7C. In some embodiments, the horizontal distance between the UI objects 704 relative to each other is increased by a pre-defined length to fill out the entire region of user interface along its horizontal direction. In some embodiments, the vertical distance between UI objects 704 is also increased to maintain the same proportional spacing of UI objects to each other between the portrait and landscape view. In some embodiments, the horizontal and vertical distances between UI objects 704 are decreased in order to display a larger number of UI objects on the user interface in the landscape orientation.

Furthermore, the page indicator 504 and the non-crossfading UI objects 704 maintain their orientation relative to the frame of reference as described with reference to FIG. 7C. Relative to the display 112 the page indicator 504 and the non-crossfading UI objects 704 are horizontally aligned with the UI's long dimension. In some embodiments, the page indicator and non-crossfading UI objects maintain their positions relative to each other. In some embodiments, the page indicator 504 is moved in a vertical direction relative to the display so that the page indicator is displayed close to the UI's bottom edge in the landscape orientation. In some embodiments, the spacing of the non-crossfading UI objects is adjusted to coincide with an increased or decreased spacing of crossfading UI objects as described above.

Figure 8D:
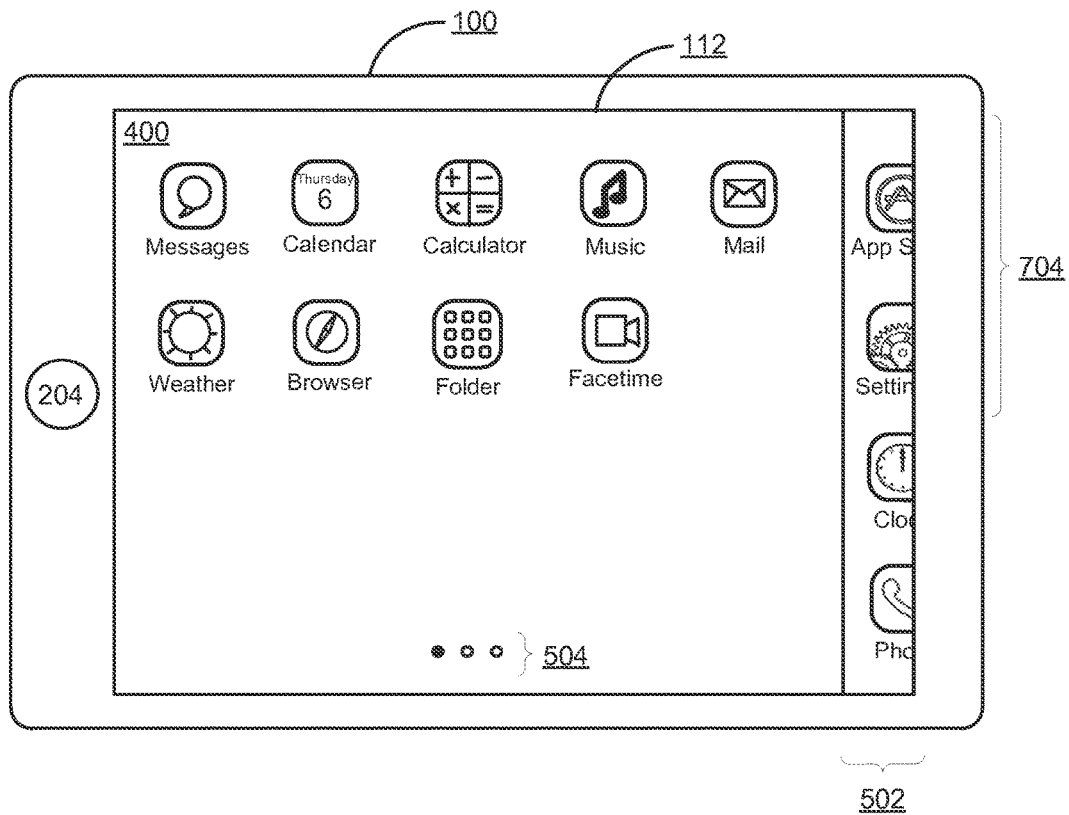
FIG. 8D illustrates another transition of the user interface 400 from portrait orientation to landscape orientation by clockwise rotating the device 100, according to some embodiments.

As shown in FIG. 8D and similar to FIG. 7D, the dock region 502 slides back onto the user interface from the right edge of the user interface 400 in landscape orientation, according to some embodiments. In some embodiments, the dock region slides back from the UI's left edge in landscape orientation. In the landscape orientation, both edges, left or right, coincide with the UI's short dimension. Thus, the dock region 502 in the UI's landscape orientation is displayed in a vertical orientation relative to the display 112 with the dock icons arranged in a linear column. The sliding back of the dock region includes a subsequent display of increasing portions of the dock region including its dock icons. The displayed portions of dock region 504 optionally do not overlap with any UI objects 704. In some embodiments, the UI objects 704 and/or page indicator 504 are moving horizontally to the left without sliding off the UI while the dock region 502 is sliding back onto the user interface. In some embodiments, the horizontal spacing between UI objects 704 is decreased to accommodate the dock region being displayed on the UI. In some embodiments, the UI objects 704 and page indicator 504 maintains their positions relative to each other and the frame of reference without the displayed portion of the dock region optionally overlapping with any UI objects 704.

In FIG. 8D with the dock region sliding back from the UI's right edge, UI objects on the dock region (dock icons) are displayed in a top-bottom order that is identical to the right-left order of the same UI objects in the portrait orientation shown in FIG. 5, and further described in reference to FIG. 7D.

Figure 8E:
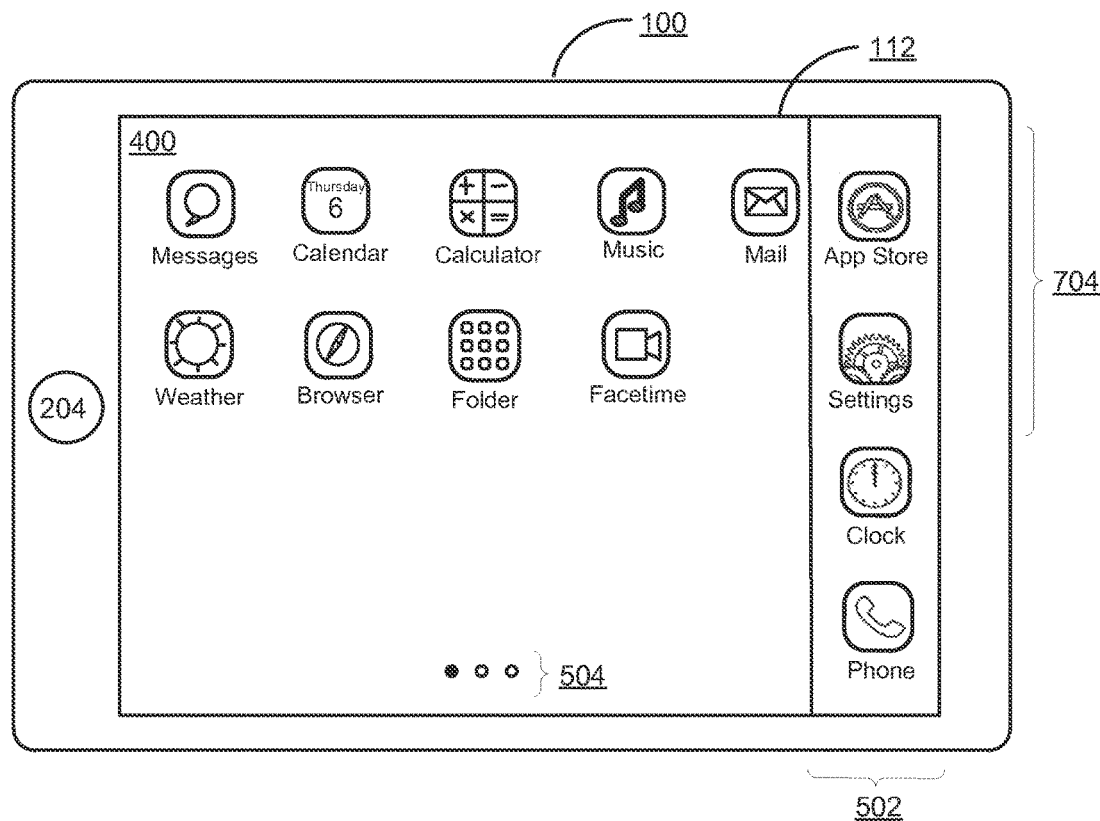
FIG. 8E illustrates another transition of the user interface 400 from portrait orientation to landscape orientation by clockwise rotating the device 100, according to some embodiments.

FIG. 8E, similar to FIG. 6 and FIG. 7E, shows the landscape orientation of the user interface 400 at the end of the UI transition with the dock region 502 fully displayed along the UI's right edge of the user, according to some embodiments.

Figure 9A:
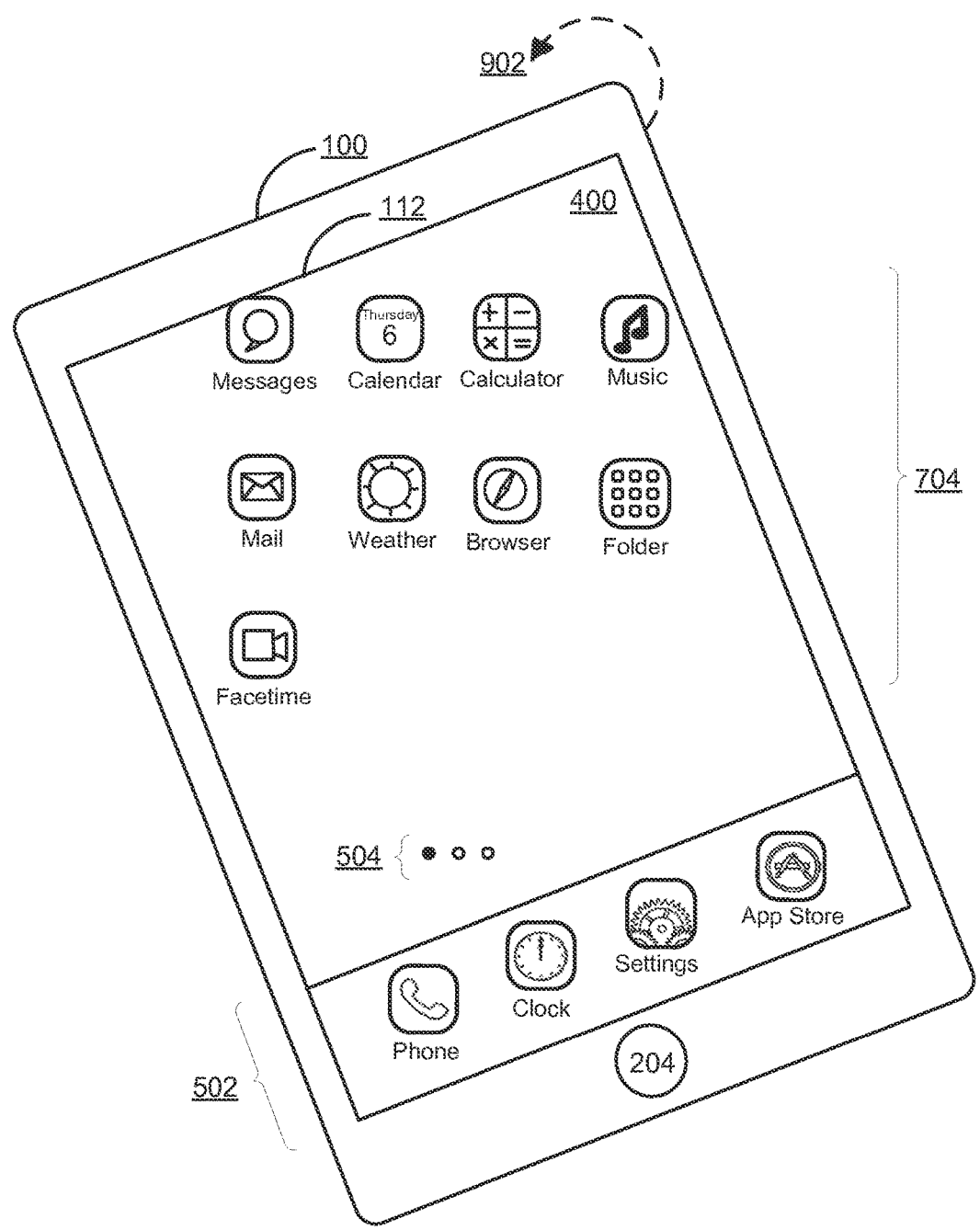
FIG. 9A illustrates another transition of the user interface 400 from portrait orientation to landscape orientation by counterclockwise rotating the device 100, according to some embodiments.
Figure 9B:
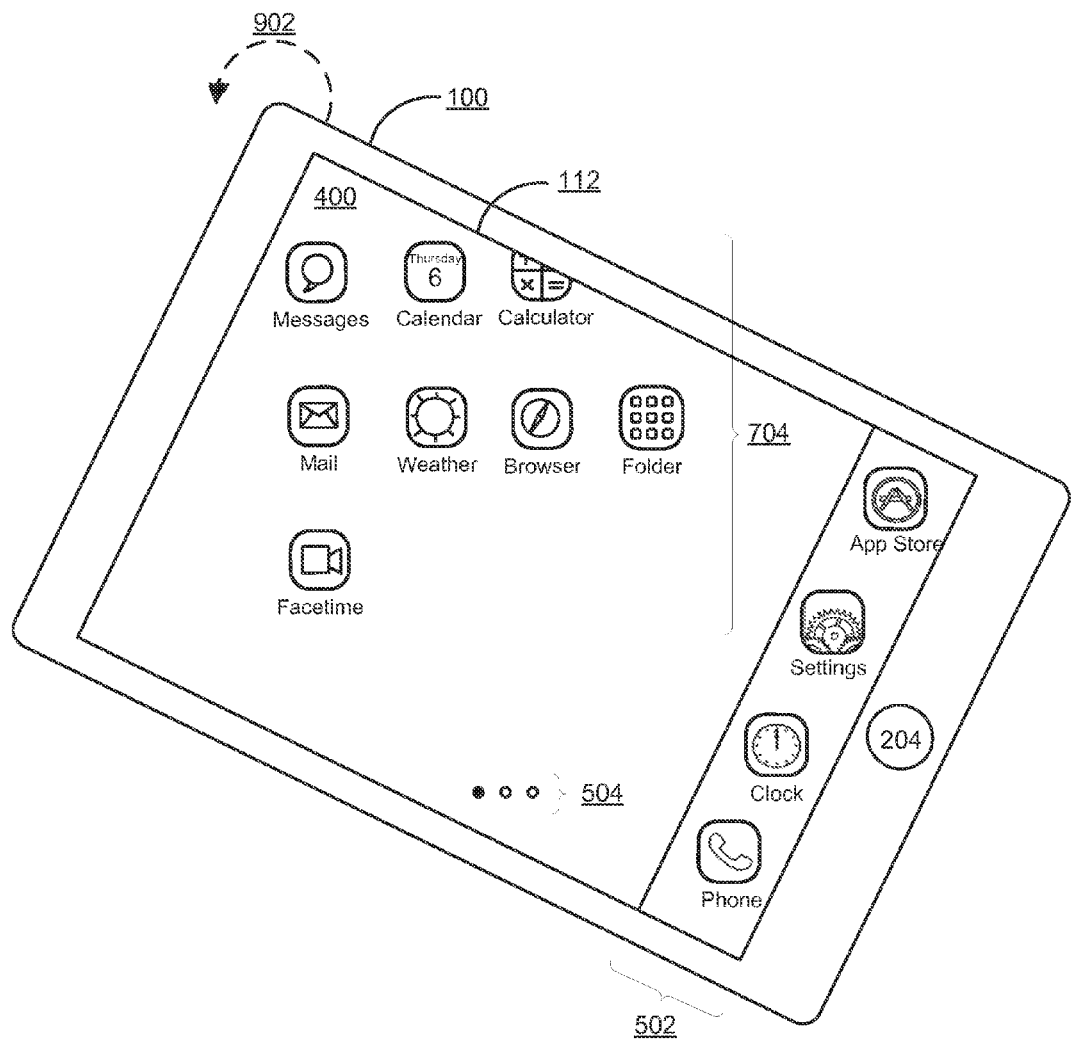
FIG. 9B illustrates another transition of the user interface 400 from portrait orientation to landscape orientation by counterclockwise rotating the device 100, according to some embodiments.

FIGS. 9A-D illustrates another transition of the user interface 400 from portrait orientation to landscape orientation by counterclockwise rotating the device 100, according to some embodiments. Initially, the device displays the user interface in the portrait orientation. By counterclockwise rotating 702 as shown in FIG. 9A the device 100 detects a UI-orientation change condition while displaying the user interface in the portrait orientation.

As shown in FIG. 9A, in some embodiments, the transition of the user interface 400 between the two UI-orientations begins with a slight rotation 702 of the display 112 and is not delayed until the display 112 is fully oriented in the landscape orientation. The initial orientation of the user interface as shown in FIG. 5 forms a fixed frame of reference for the transition of the user interface between portrait and landscape view. In this frame of reference the device 100 and its display 112 are rotating counterclockwise. In this frame of reference, the UI-objects 704 outside the dock region maintain their position and do not move as the device 100 is rotated slightly to the left. Without optionally moving any displayed UI objects 704 outside the dock region relative to the frame of reference, their positions, and thus their distances, relative to each other remain the same during a slight rotation 702 of the device 100. Relative to the display 112, the UI objects 704 are rotated clockwise while maintaining their relative positions to each other. Similarly, the page indicator 504 remains fixed in the frame of reference, while being rotating clockwise relative to the display 112, and maintaining its relative position to the UI objects 704 and its horizontal orientation relative to the frame of reference.

As shown in FIG. 9A, the dock region 502 rotates counterclockwise relative to the frame of reference while maintaining its relative orientation and position relative to the display 112. The UI objects displayed within the dock regions (dock icons) also rotate counterclockwise relative to the frame of reference with their centers' positions kept fixed relative to rotating display 112 and dock region 502. In some embodiments, each UI objects of the dock region also rotates around its center to maintain a horizontal orientation relative to the frame of reference. In contrast to the device rotating clockwise, in some embodiments the dock region does not slide off an UI edge, but is continuously fully displayed during the UI transition (e.g., as shown in FIGS. 9A-9D). In FIG. 9A, the relative distance between dock region 502 and the UI objects 704 or page indicator 504 still changes, since the UI objects and page indicator are stationary relative to the frame of reference, whereas the dock region rotates counterclockwise within the frame of reference.

Figure 9C:
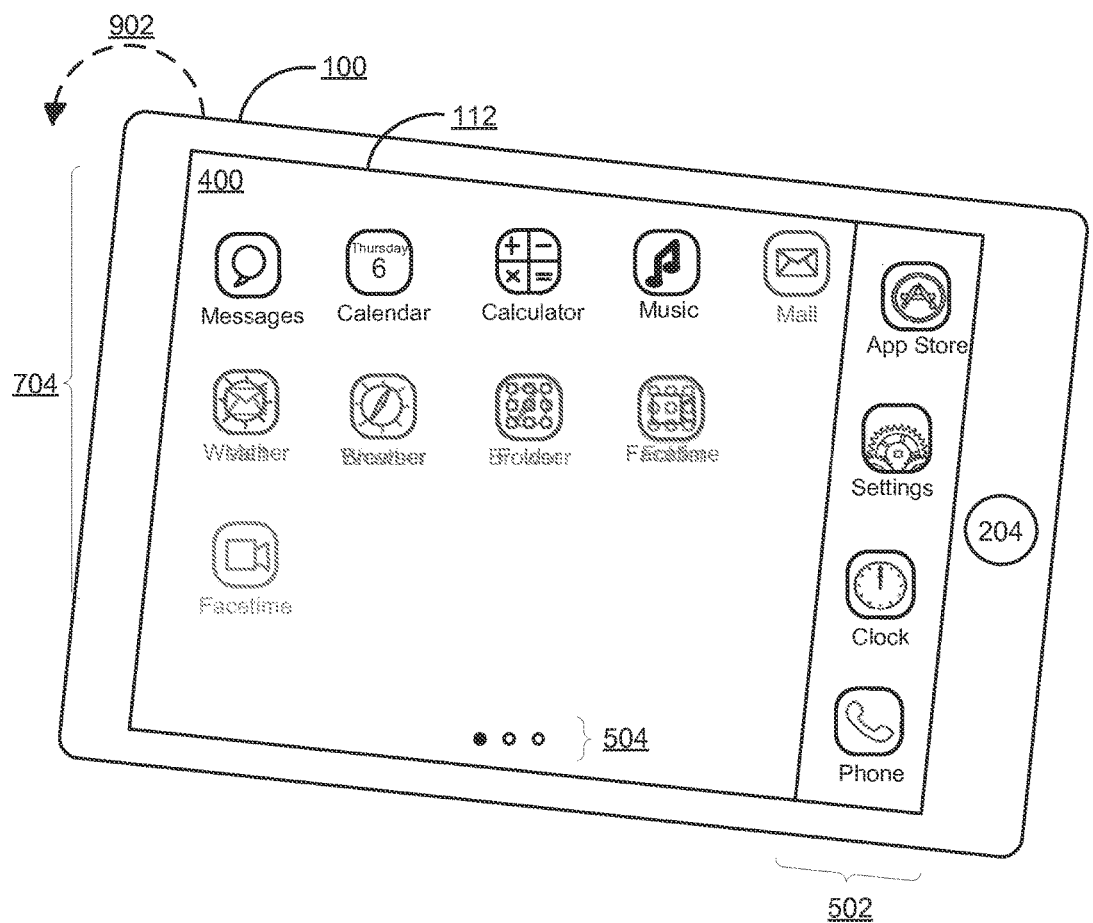
FIG. 9C illustrates another transition of the user interface 400 from portrait orientation to landscape orientation by counterclockwise rotating the device 100, according to some embodiments.

As illustrated in FIG. 9C, upon further counterclockwise rotation 702 of the device 100, the dock region 504 continues its counterclockwise rotation within the frame of reference, while some of UI objects 704 from the portrait UI view are crossfading into new positions in the landscape view. While crossfading the UI objects maintain their relative orientation to the frame of reference that is the initial portrait view of the user interface. As described with reference to FIG. 7C, the crossfading icons are translucent and overlaid on top of the portrait view icons. Furthermore, the landscape orientation's left-to-right, top-to-bottom order of the UI objects 704 is identical to the UI objects' left-to-right, top-to-bottom order in portrait orientation of the user interface. In some embodiments, some UI objects 704 from the portrait UI view are displayed at new positions of the user interface in the landscape view, but maintaining their relative orientation to the frame of reference as described with reference to FIG. 7C. In some embodiments, the horizontal distance between the UI objects 704 relative to each other is increased by a pre-defined length to fill out the entire region of user interface along its horizontal direction. In some embodiments, the vertical distance between UI objects 704 is also increased to maintain the same proportional spacing of UI objects to each other between the portrait and landscape view. In some embodiments, the horizontal and vertical distances between UI objects 704 are decreased in order to display a larger number of UI objects on the user interface in the landscape orientation.

Furthermore, the page indicator 504 and UI objects 704 (crossfading and non-crossfading) maintain their horizontal orientation relative to the frame of reference. In some embodiments, the page indicator and non-crossfading UI objects maintain their positions relative to each other. In some embodiments, the page indicator 504 is moved in a vertical direction relative to the display so that the page indicator is displayed close to the UI's bottom edge in the landscape orientation. In some embodiments, the spacing of the non-crossfading UI objects is adjusted to coincide with an increased or decreased spacing of crossfading UI objects as described above.

Figure 9D:
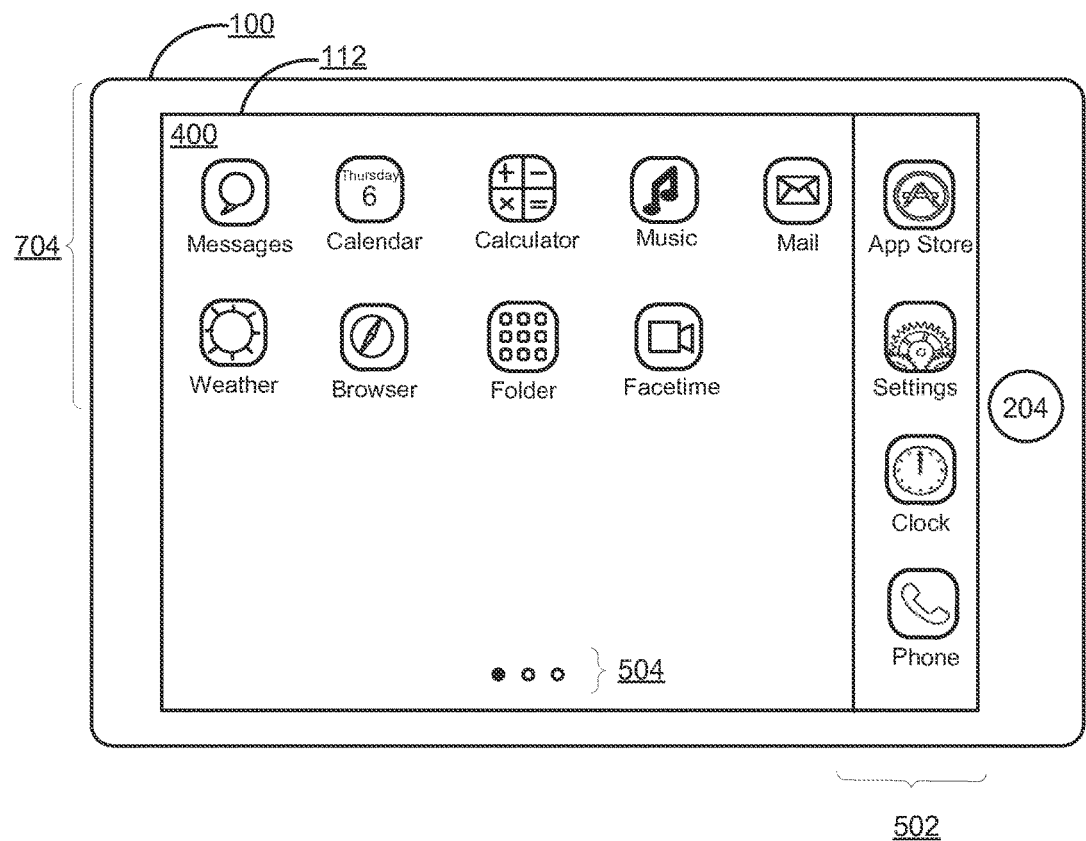
FIG. 9D illustrates another transition of the user interface 400 from portrait orientation to landscape orientation by counterclockwise rotating the device 100, according to some embodiments.

FIG. 9D, similar to FIGS. 6, 7E, and 8E, shows the landscape orientation of the user interface 400 at the end of the UI transition with the dock region 502 displayed along the UI's right edge of the user, according to some embodiments. FIG. 9D shows the display 112 fully rotated counterclockwise. The dock region 502 is vertically oriented along a right edge of the short dimension of the user interface 400 in landscape view. The crossfading of UI objects 704 is complete only displaying the crossfaded UI objects at their new positions in landscape orientation. In addition, the UI objects of the dock region 502 are fully rotated around their centers relative to dock regions, forming a vertical linear column in the landscape orientation. Since the centers of the dock icons remained fixed relative to the dock region, the top-to-bottom order of the dock icons in landscape orientation is identical to their respective right-to-left order in portrait orientation.

Figure 10A:
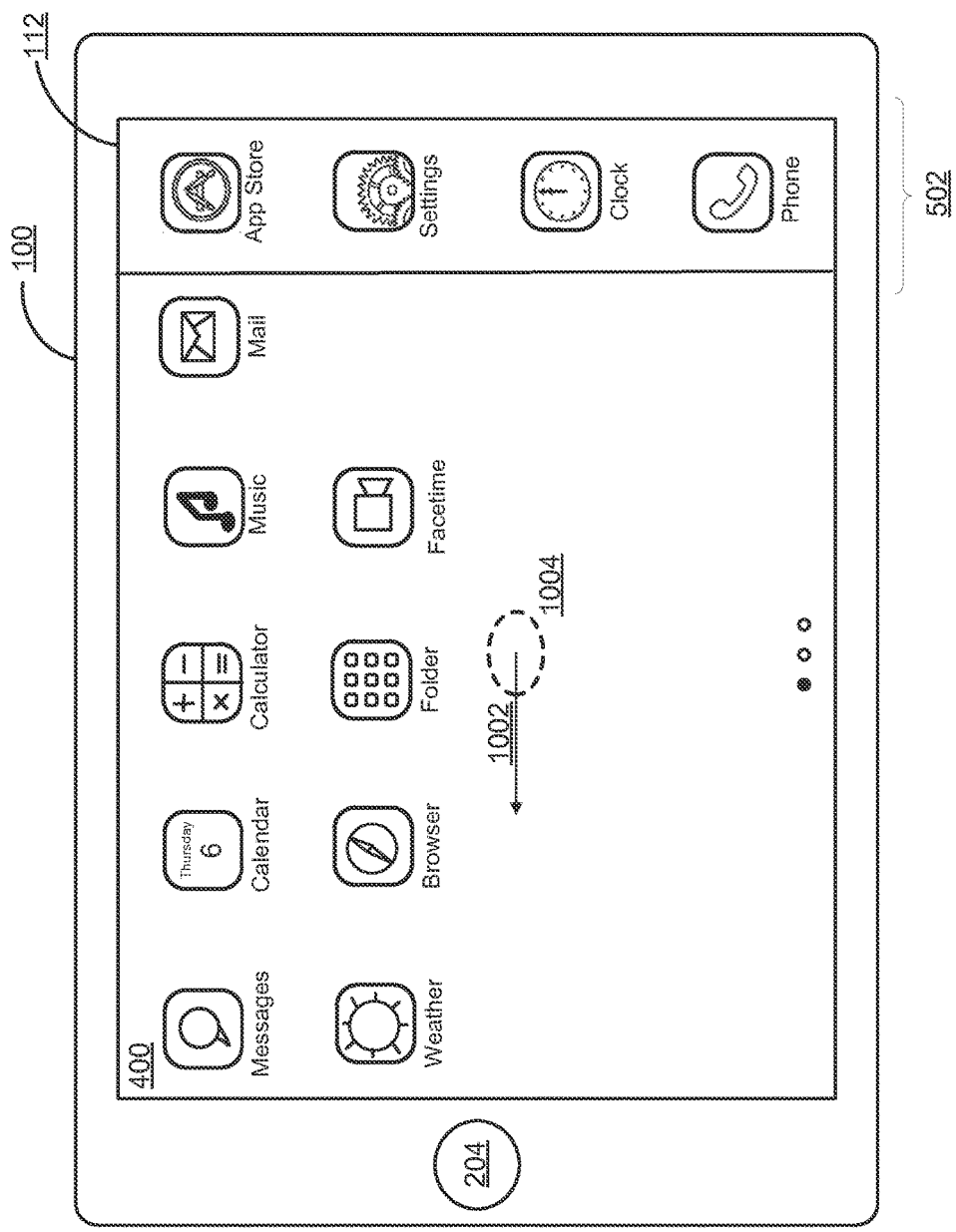
FIG. 10A illustrates scrolling between two pages, a first and a second page, of a multi-page user interface in landscape orientation, according to some embodiments.
Figure 10B:
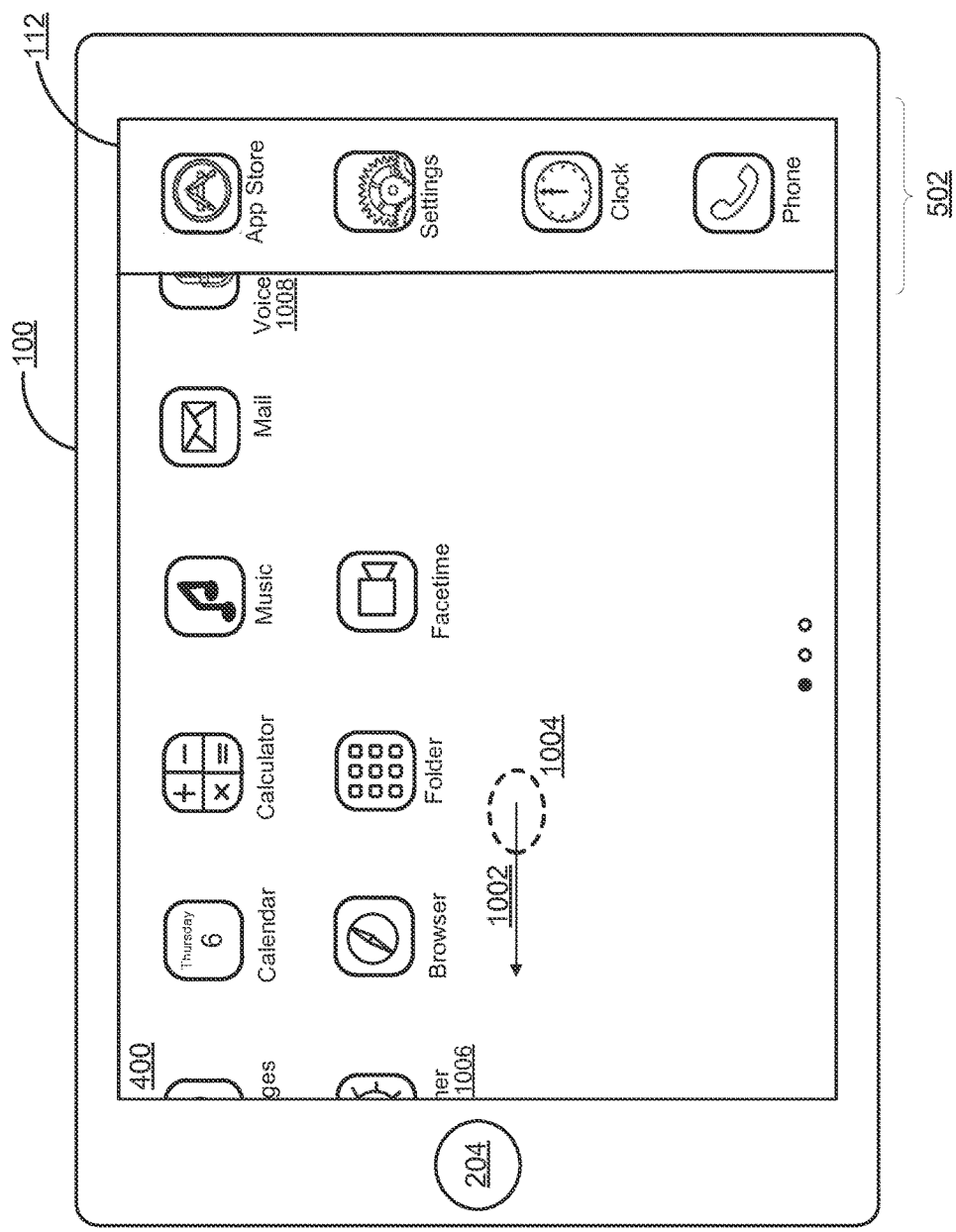
FIG. 10B illustrates scrolling between two pages, a first and a second page, of a multi-page user interface in landscape orientation, according to some embodiments.
Figure 10C:
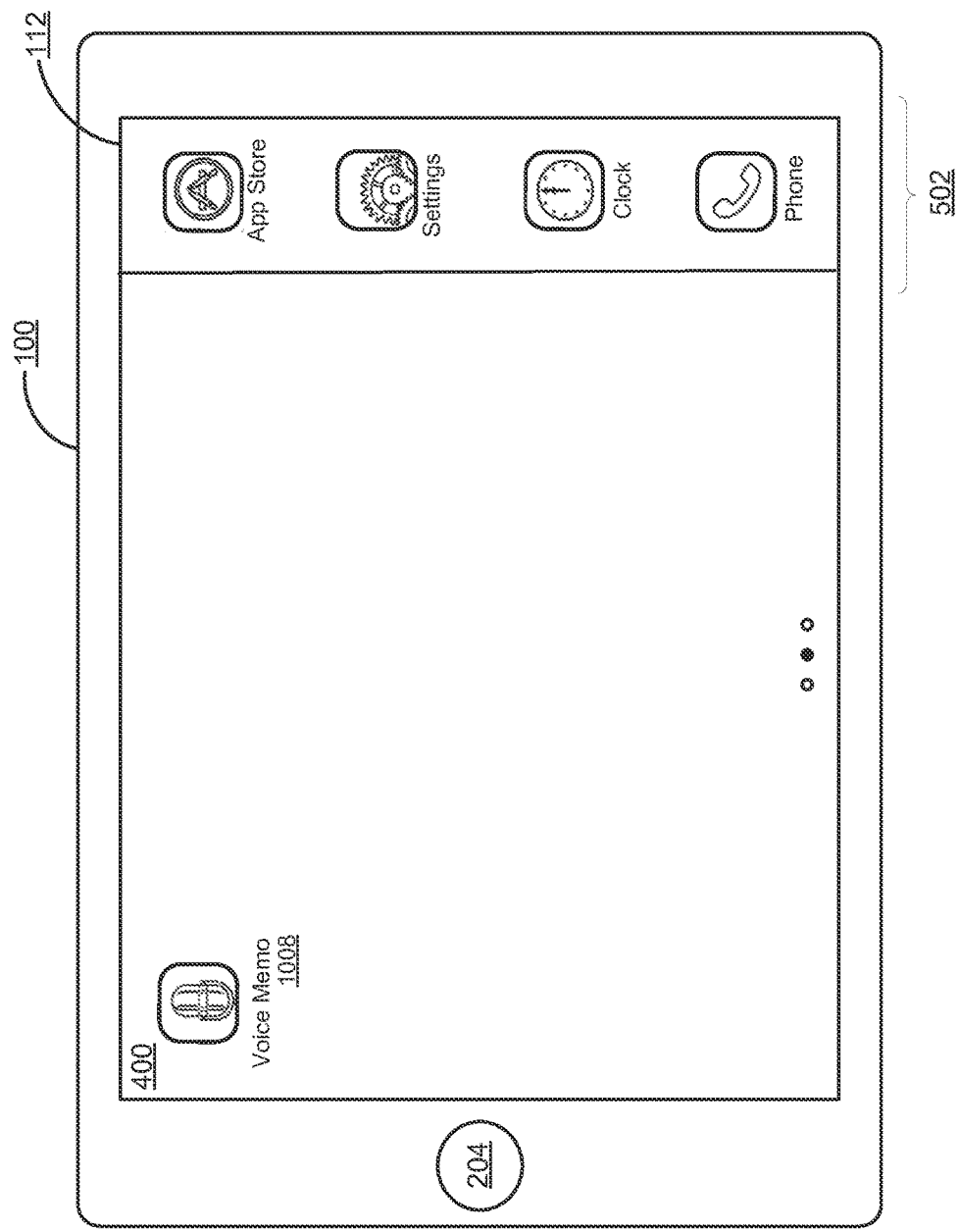
FIG. 10C illustrates scrolling between two pages, a first and a second page, of a multi-page user interface in landscape orientation, according to some embodiments.

FIGS. 10A-C illustrate scrolling between two pages, a first and a second page, of a multi-page user interface in landscape orientation, according to some embodiments. While displaying the first page of the UI as shown in FIG. 10A, the device receives a next-page gesture or input for displaying the second page of the multi-page interface. The next-page gesture is indicative of a user request to display the second page in the user interface in landscape orientation on the display 112. The next-page gesture optionally includes a swipe or flick in a direction 1002 substantially parallel to the long-dimension of the user interface 400 through a contact of the user's finger with the touch-sensitive display 112. In FIG. 10A, the next-page gesture is represented by the contact 1004 of the user's finger on user interface, shown as a dotted ellipse and moving in the left direction 1002 relative to the UI-orientation.

As shown in FIG. 10B, responsive to a next-page gesture, for example, through contact 1004, the device 100 optionally displays all UI objects 704 of the first page moving to the left by an equal distance. In addition, UI objects 1006 close to the UI's left edge are moving to the left and off the user interface 400, while the second page with its UI objects 1008 are horizontally moving onto the user interface from underneath the dock region 502 along the UI's right edge. The second page UI objects 1008 positioned closest to the second page's left side are appearing first from underneath the dock region 502. The dock region 502 and its UI objects (dock icons) do not move and maintain their position and orientation along the right edge of the user interface 400. In addition, the page indicator 504 does not move and maintains its horizontal orientation. In some embodiments with the dock region 502 on the left edge of the landscape orientation, the UI objects 1006 move underneath the dock region, while the dock region and its dock icons do not move. In some embodiments, the second page slides onto the user interface from the UI's right edge. FIG. 10C shows second page on the user interface in landscape orientation after completion of the first and second page's horizontal movement, optionally displaying all UI objects 1008 of the second page.

Figure 11A:
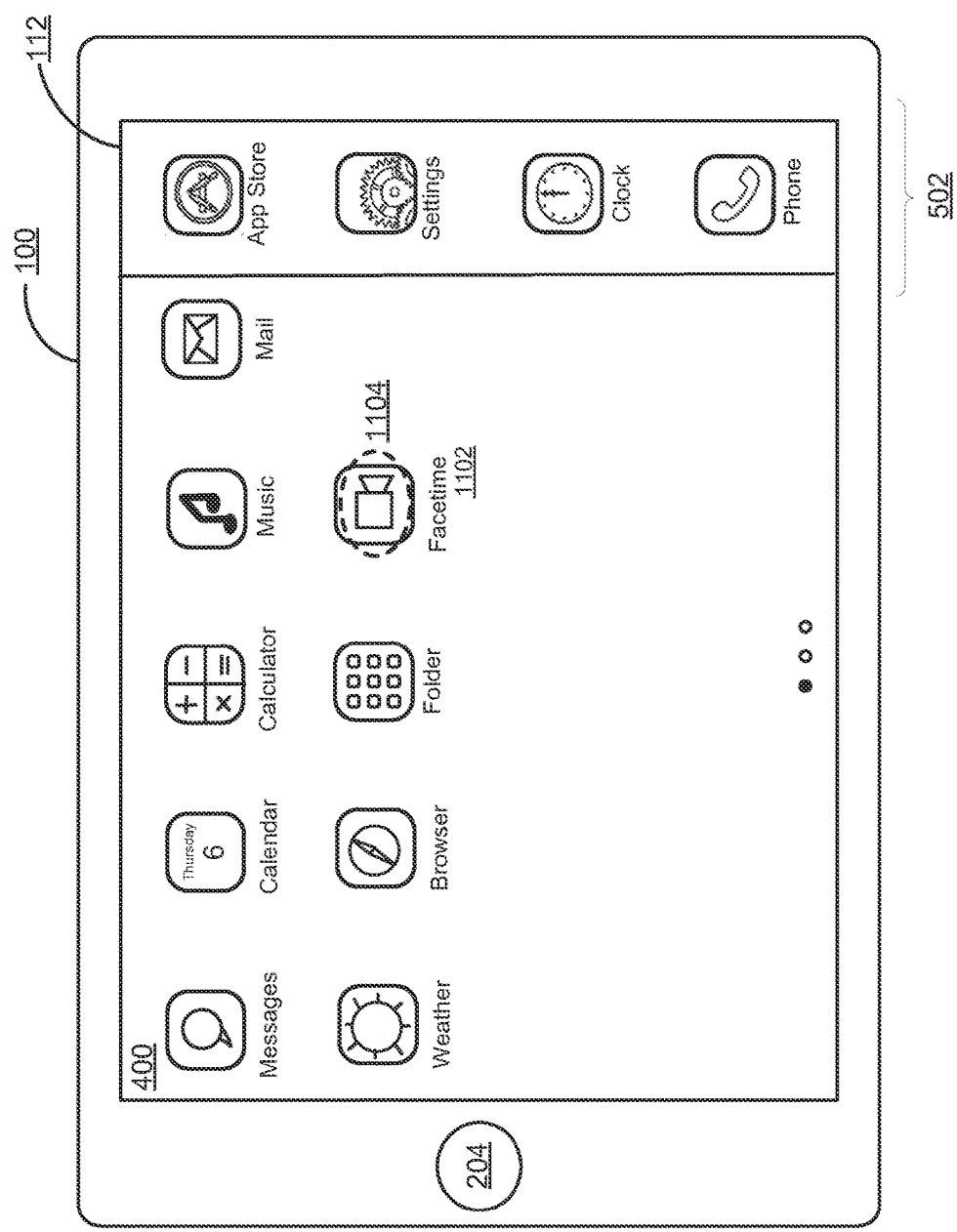
FIG. 11A illustrates moving a UI object 1102 from a first page to a second page of a multi-page user interface in landscape orientation, according to some embodiments.

FIGS. 11A-E illustrate moving a UI object 1102 from a first page to a second page of a multi-page user interface in landscape orientation, according to some embodiments. While displaying the first page of the UI as shown in FIG. 11A, the device receives a selection gesture or input for displaying the second page and moving a selected UI object to the second page of the multi-page interface. This gesture is indicative of a user request to display the second page in the user interface in landscape orientation on the display 112 and move a selected UI object to the second page. As shown in FIG. 11A, the selection gesture optionally includes a contact 1104 of the user's fingers with the touch-sensitive display 112 at the location of the UI object that is to be moved. In some embodiments, the contact 1104 of the selection gesture is initially detected at a location on the UI different from the UI object that is to be moved. In some embodiments, in response to detecting the initial contact, the device optionally displays all UI objects being displayed in a wiggling motion around their centers (illustrated in FIG. 11B-D by the curved lines with arrows at both ends), indicating that the wiggling UI objects are available for selection. A contact at the location of a wiggling UI object selects this UI object for being moved to the second page.

Figure 11B:
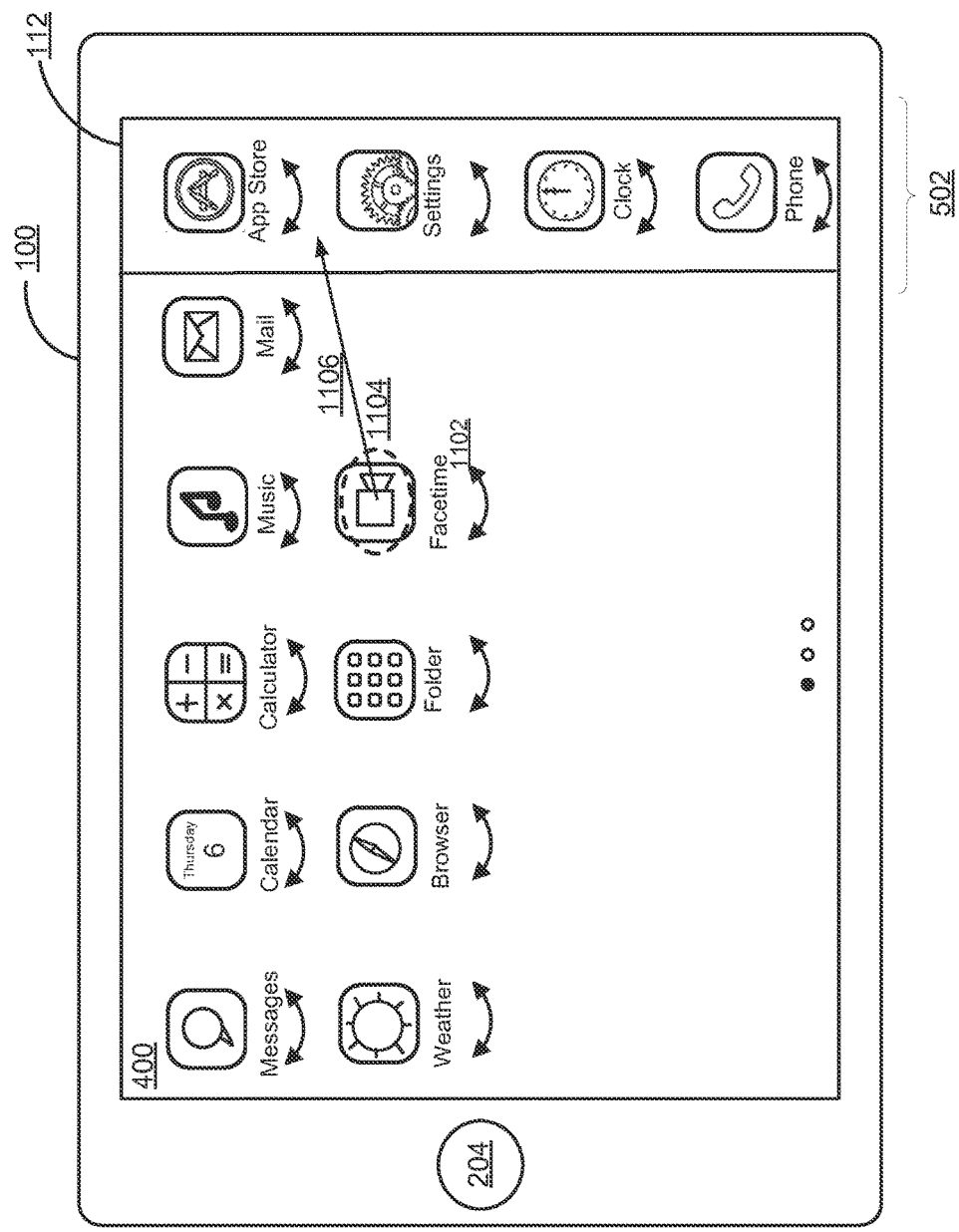
FIG. 11B illustrates moving a UI object 1102 from a first page to a second page of a multi-page user interface in landscape orientation, according to some embodiments.
Figure 11C:
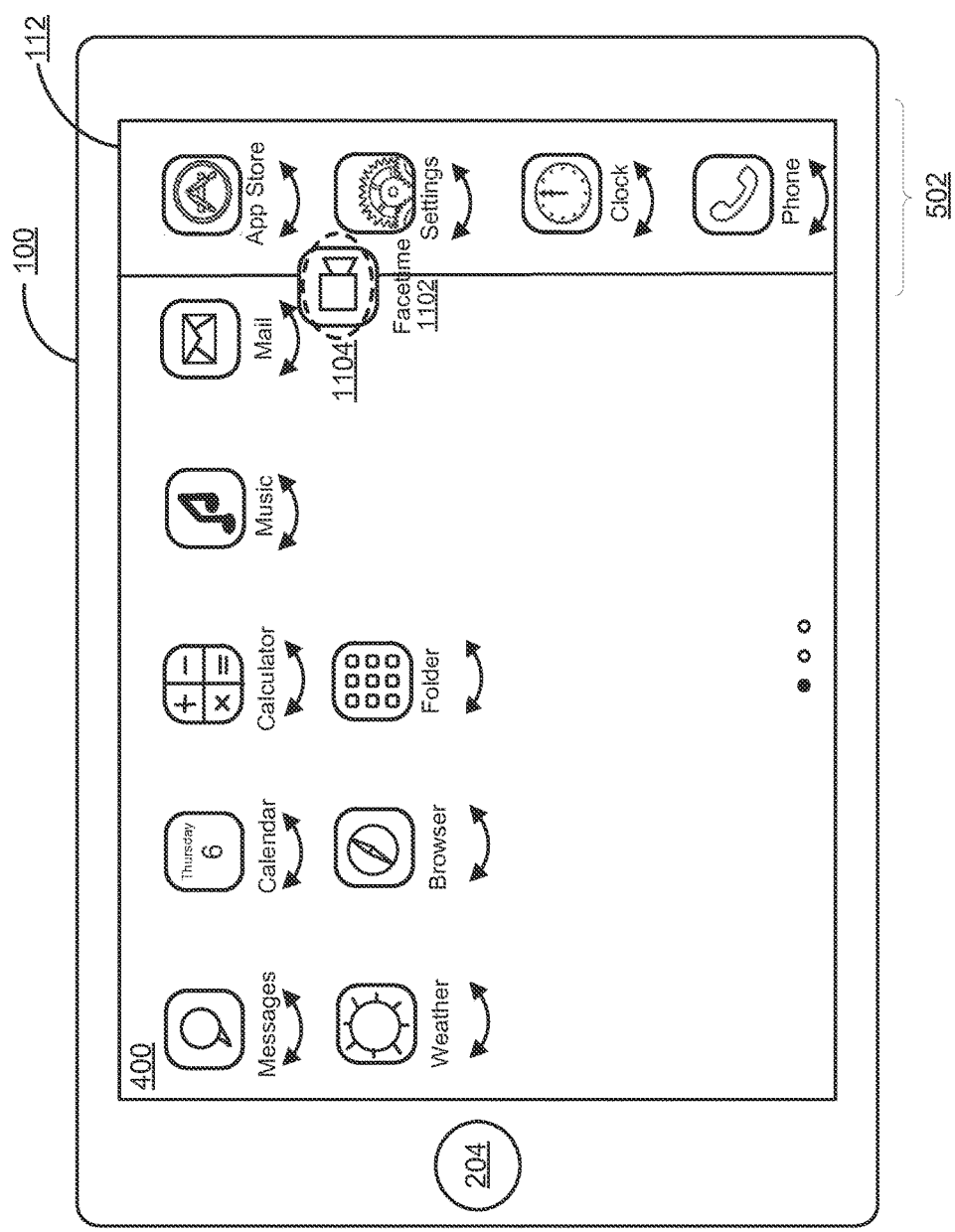
FIG. 11C illustrates moving a UI object 1102 from a first page to a second page of a multi-page user interface in landscape orientation, according to some embodiments.
Figure 11E:
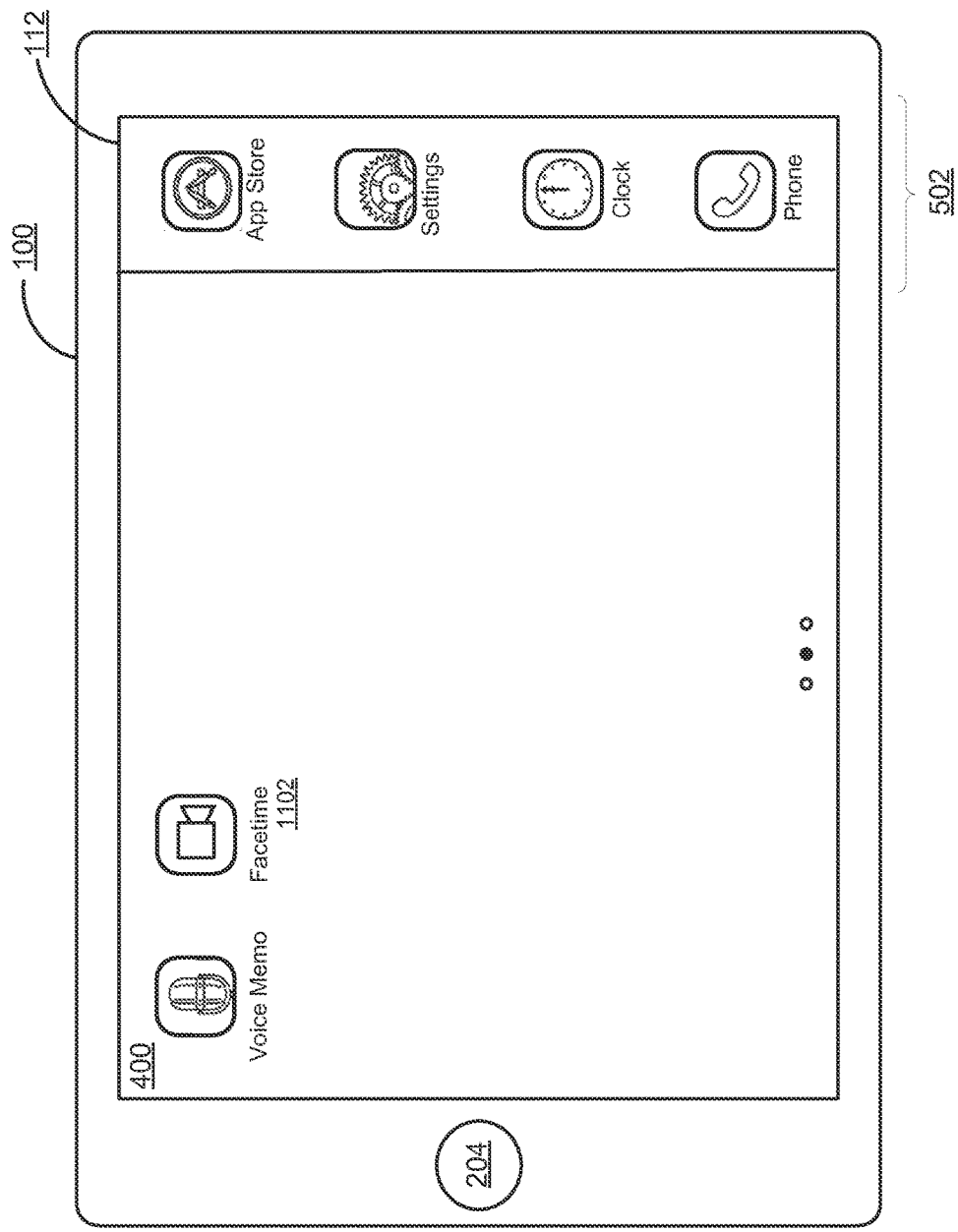
FIG. 11E illustrates moving a UI object 1102 from a first page to a second page of a multi-page user interface in landscape orientation, according to some embodiments.

FIGS. 11B and 11C illustrate the contact 1104 continuously moving along direction 1106 to the dock region 502. In response to the contact 1104 moving to the dock region 502, the selected UI object 1102 is displayed moving to the dock region 502 as shown in FIG. 11C. In response to detecting the contact 1104 overlap with the dock region 502 below pre-defined percentage threshold of the entire contact area and for a pre-defined time, the device displays the second page, which is the next page to the right of the first page in the multi-page linear order. In some embodiments the device determines whether to scroll to a next page or place the icon in the dock based on whether the detected contact that is associated with movement of the icon overlaps an edge of the dock (e.g., if the detected contact overlaps the edge of the dock then the device scrolls to a next page and if the detected contact is entirely on the dock, then the device enables placement of the icon on the dock without scrolling to the next page). When displaying the second page, analogous to the scrolling between two pages as described with reference to FIGS. 10A-C, the second page and its UI objects are moving from underneath the dock region 502 onto the user interface 400. Moving the contact 1104 along the direction 1106 onto the fully displayed second page stops further scrolling to a third page to the right (FIG. 11D), and the device places the selected UI object 1102 on the second page in the landscape orientation (FIG. 11E). In some embodiments, placement of the selected UI object 1102 on the second page is in response to detecting liftoff of the contact.

Figure 12A:
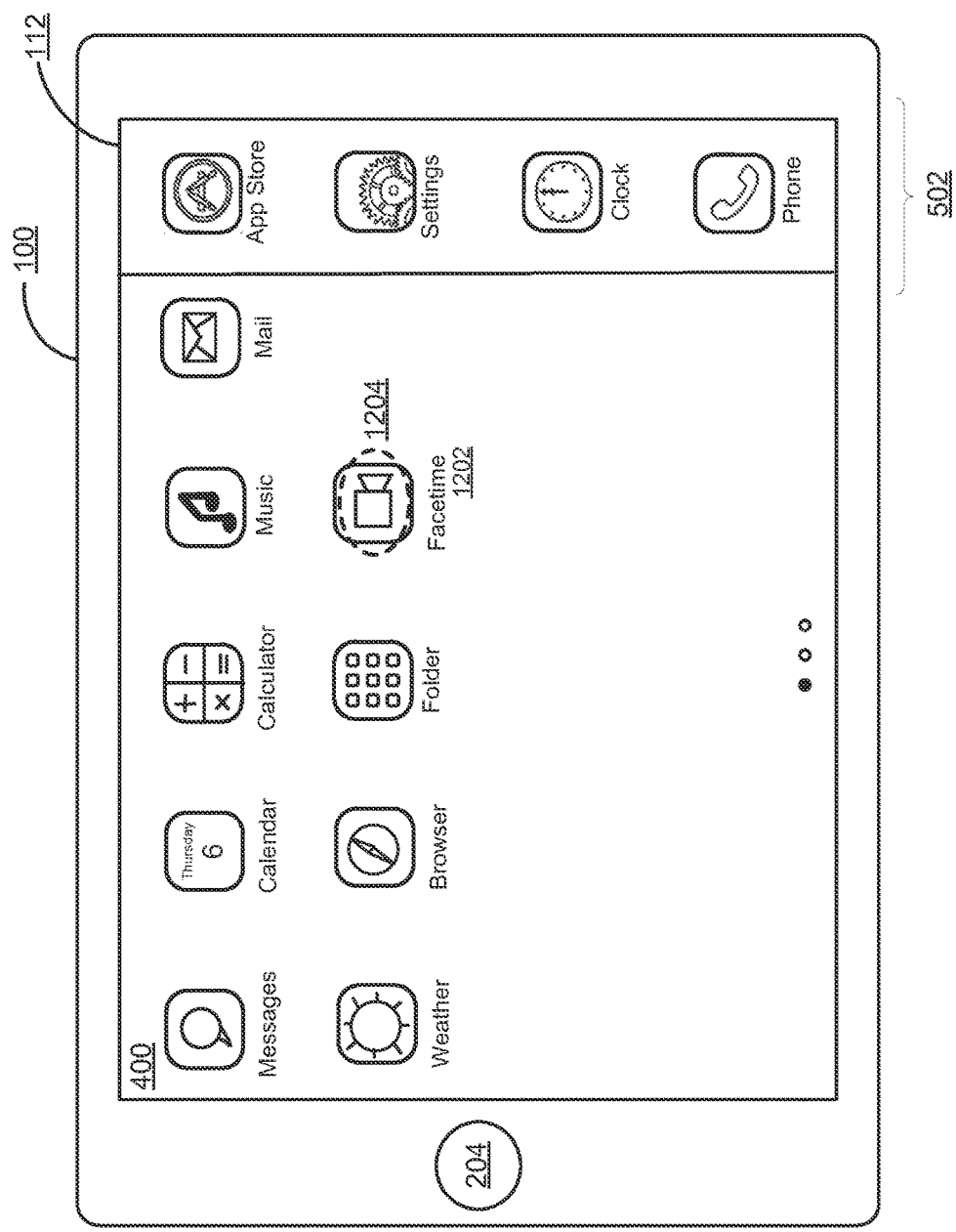
FIG. 12A illustrates moving a UI object 1102 from a region outside the dock region 502 to the dock region in landscape orientation, according to some embodiments.

FIGS. 12A-D illustrate moving a UI object 1202 from a region outside the dock region 502 to the dock region in landscape orientation, according to some embodiments. While displaying the user interface in landscape orientation as shown in FIG. 12A, the device receives a selection gesture or input for moving a selected UI object to dock region in landscape view. This gesture is indicative of a user request to move the selected UI object 1202 to the dock region 502. As shown in FIG. 12A, the selection gesture optionally includes a contact 1204 of the user's fingers with the touch-sensitive display 112 at the location of the UI object that is to be moved. In some embodiments, initially the contact 1204 of the selection gesture optionally is at a location on the UI different from the UI object that is to be moved. The initial contact optionally results in all UI objects being displayed in a wiggling motion around their centers, indicating that the wiggling UI objects are available for selection. A contact at the location of a wiggling UI object selects this UI object for being moved to the dock region.

Figure 12B:
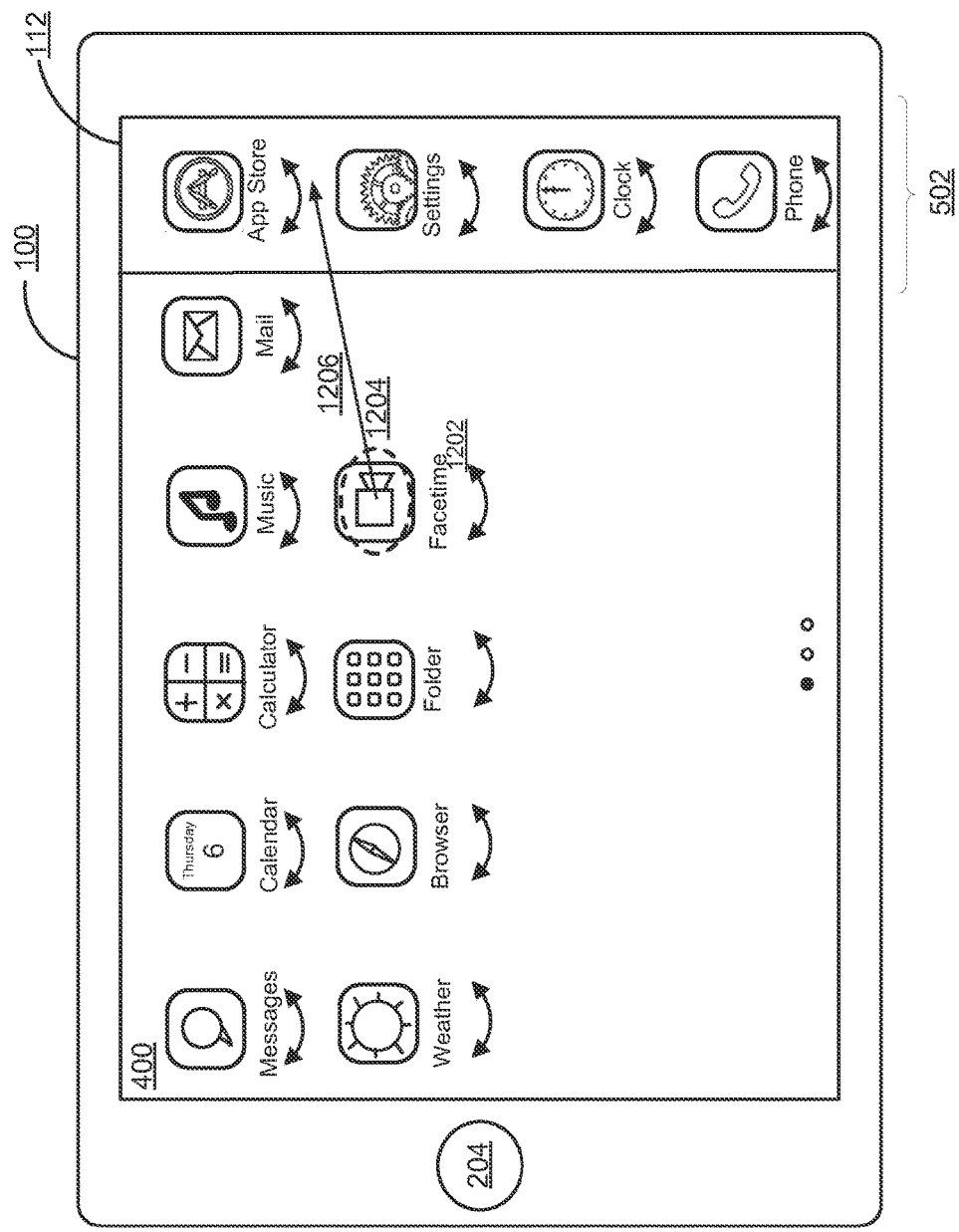
FIG. 12B illustrates moving a UI object 1102 from a region outside the dock region 502 to the dock region in landscape orientation, according to some embodiments.
Figure 12C:
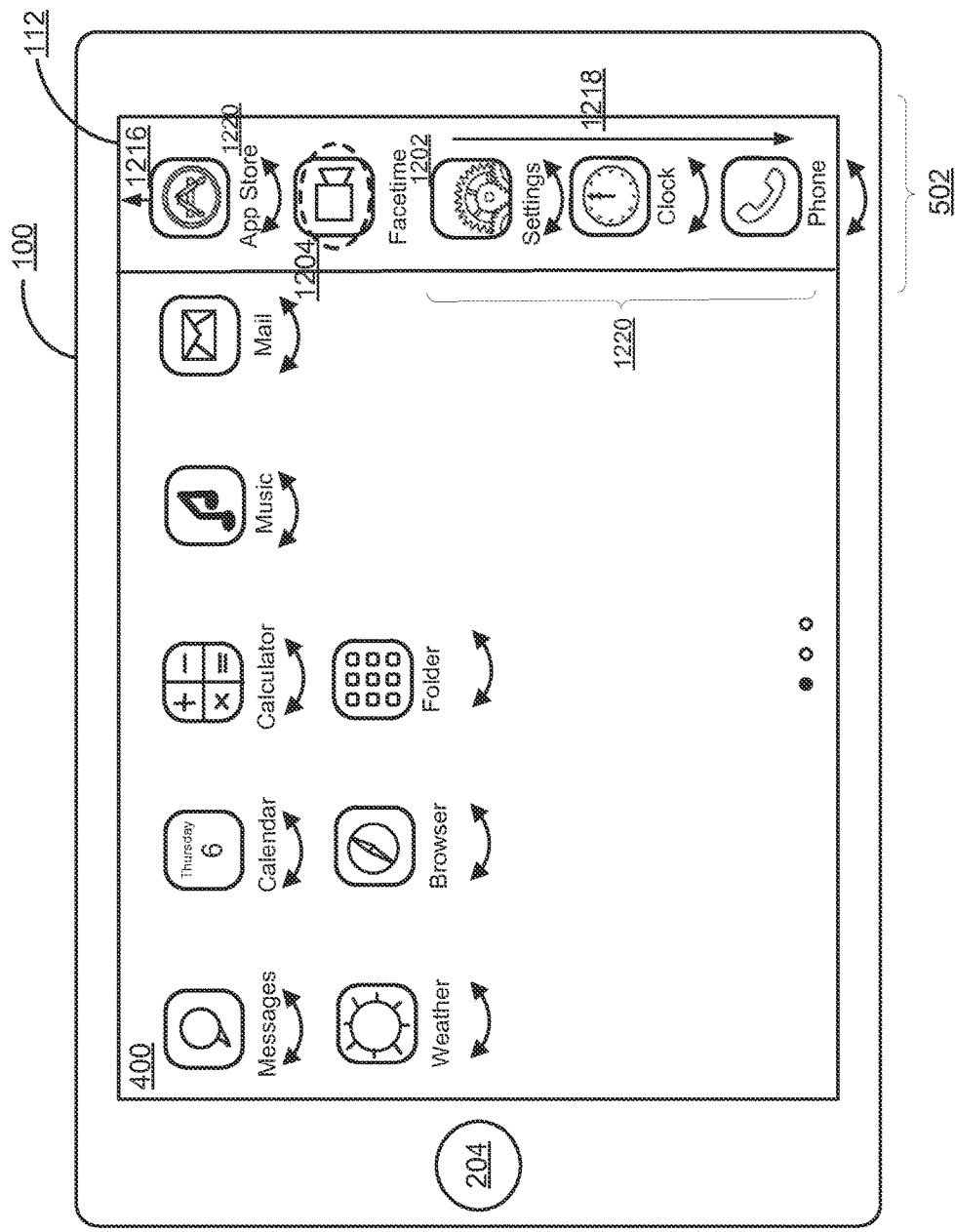
FIG. 12C illustrates moving a UI object 1102 from a region outside the dock region 502 to the dock region in landscape orientation, according to some embodiments.
Figure 12D:
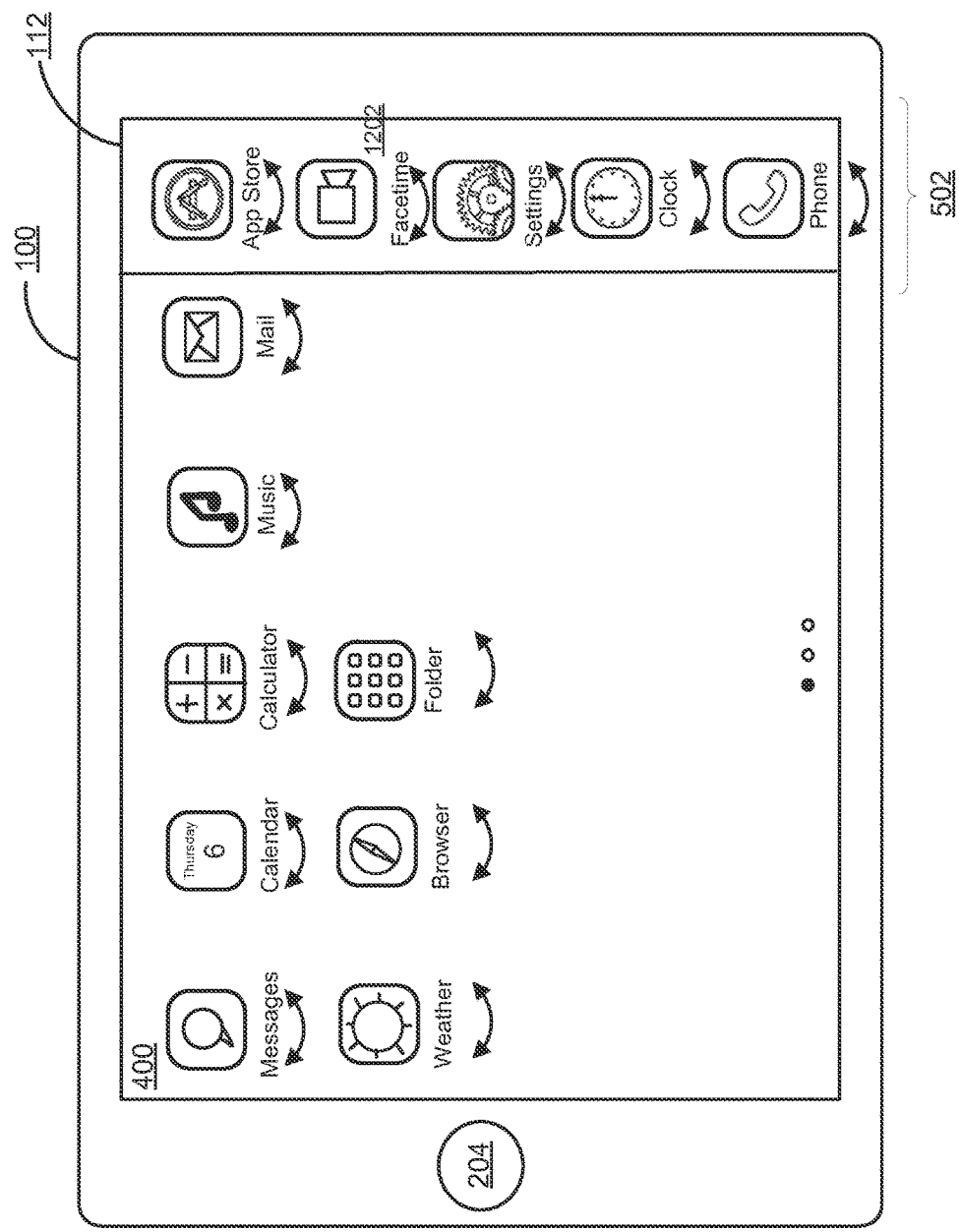
FIG. 12D illustrates moving a UI object 1102 from a region outside the dock region 502 to the dock region in landscape orientation, according to some embodiments.

FIGS. 12B and 12C illustrate the contact 1204 continuously moving along direction 1206 to the dock region 502. In response to the contact 1204 moving to the dock region 502, the selected UI object 1202 is displayed moving to the dock region 502 as shown in FIG. 12C. Having the contact 1204 overlap with the dock region 502 above a pre-defined percentage threshold of the entire contact area and for a pre-defined time, the device enables placement of the selected UI object in the dock region and displays vertically movement 1216, 1218 of the UI objects 1220 on the dock regions 502 to create space for the selected UI object 1202 on the dock region at the location of the contact 1204 as shown in FIG. 12D. After (or in response to) detecting liftoff of the contact 1204 from the display 112, the selected UI object 1202 remains at the same location with the dock's UI objects arranged in a vertical column (FIG. 12D).

Figure 13A:
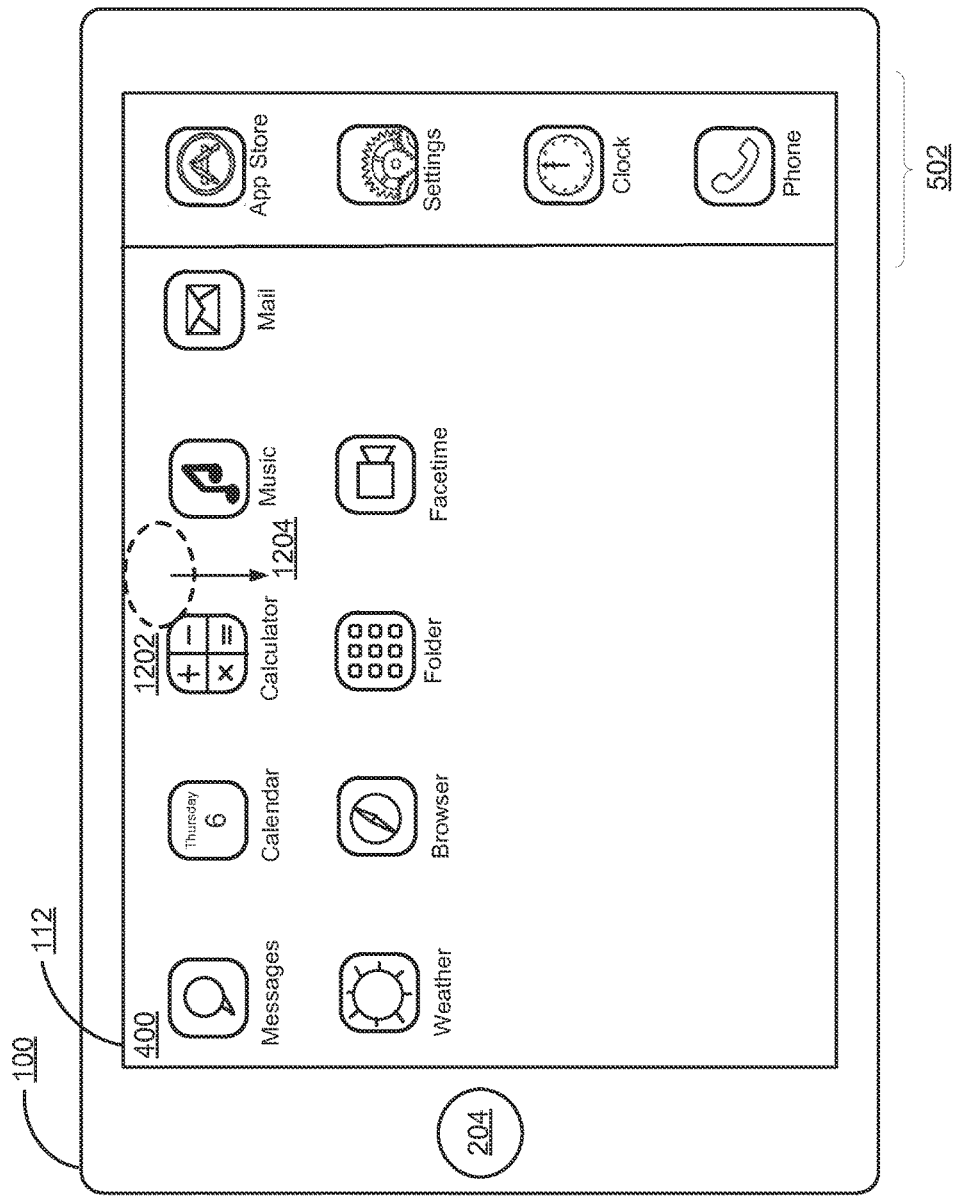
FIG. 13A illustrates displaying a search window on a user interface in landscape orientation, according to some embodiments.
Figure 13B:
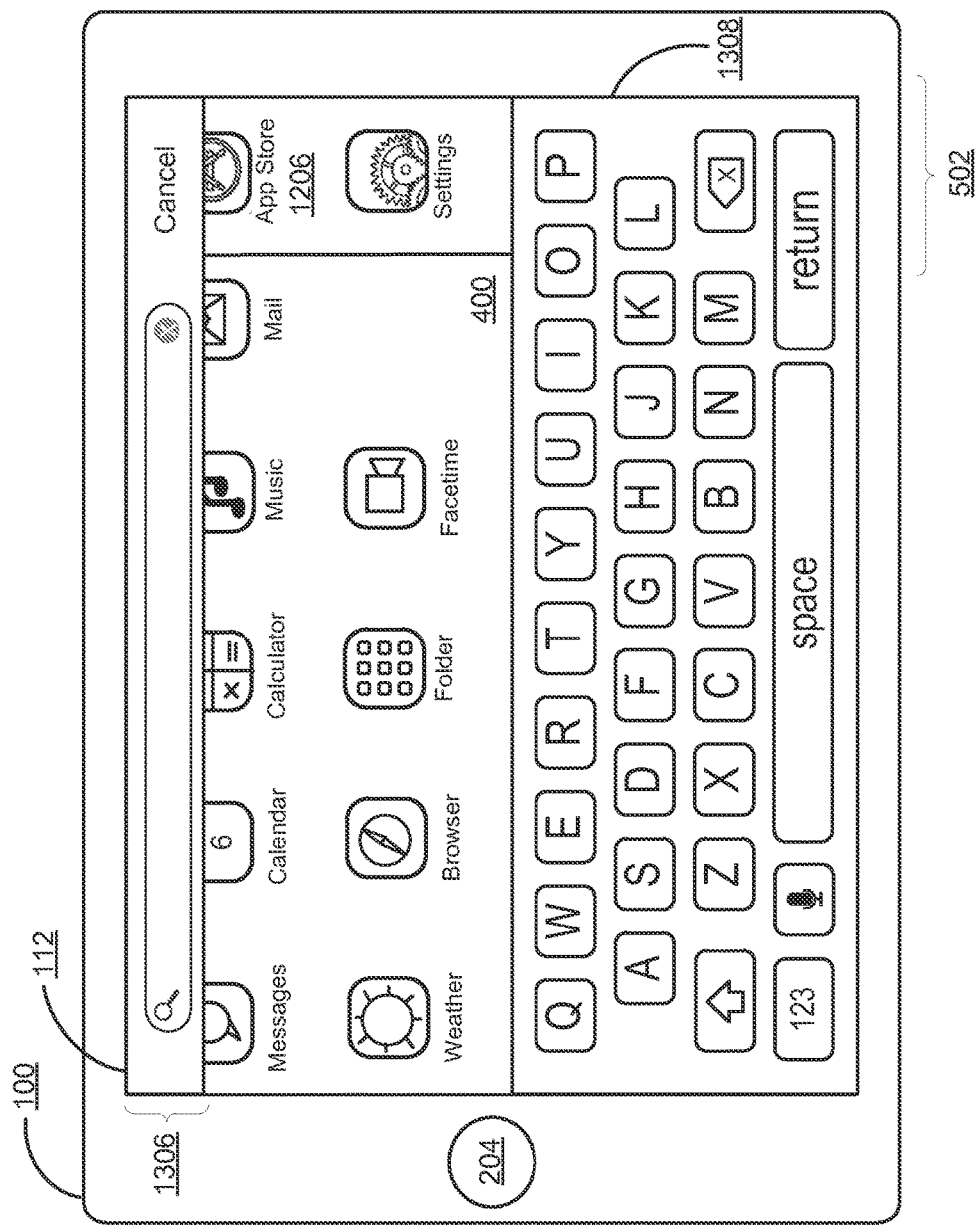
FIG. 13B illustrates displaying a search window on a user interface in landscape orientation, according to some embodiments.

FIGS. 13A and 13B illustrate displaying a search window on a user interface in landscape orientation, according to some embodiments. While displaying the UI in landscape orientation as shown in FIG. 13A, the device receives a search gesture or input for displaying a search window. The search gesture optionally includes a swipe or flick in a direction substantially vertically downwards relative to the user interface 400 through a contact of the user's finger with the touch-sensitive display 112. In FIG. 13A, the search gesture is represented by the contact 1302 of the user's finger on user interface, shown as a dotted ellipse, moving in the downwards vertical direction 1304 relative to the UI-orientation.

As shown in FIG. 13B, responsive to a search gesture, for example, through contact 1304, the device 100 displays a search window 1306 and keyboard window 1308 for inputting a search term in the user interface. Both windows are displayed in front of dock region and UI objects in the UI region occupied by the search 1306 and keyboard window 1308. In FIG. 13B, the search window 1306 is displayed along the top edge of user interface, whereas the keyboard window is displayed along the bottom edge.

Figure 14A:
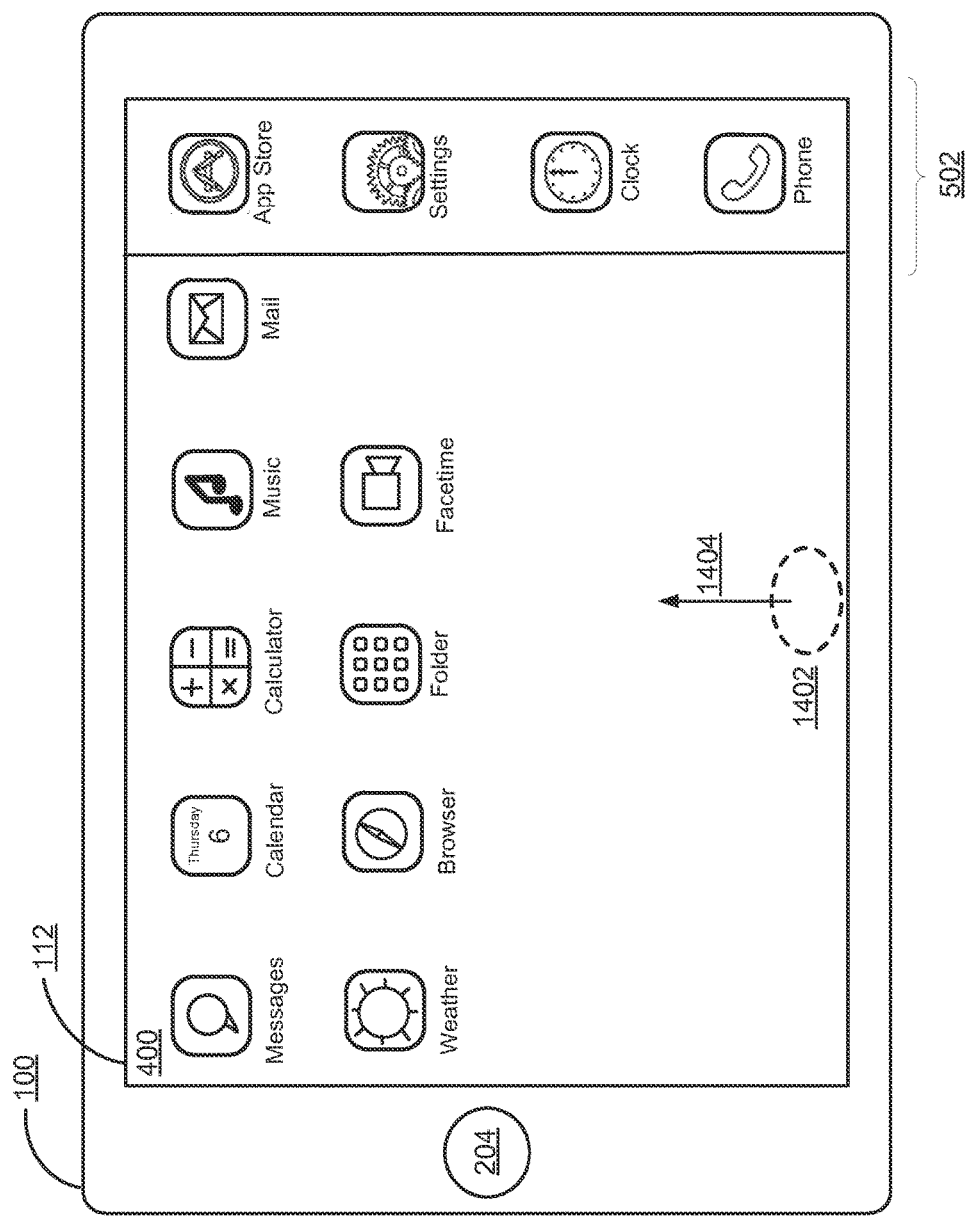
FIG. 14A illustrates displaying a control window on a user interface in landscape orientation, according to some embodiments.
Figure 14B:
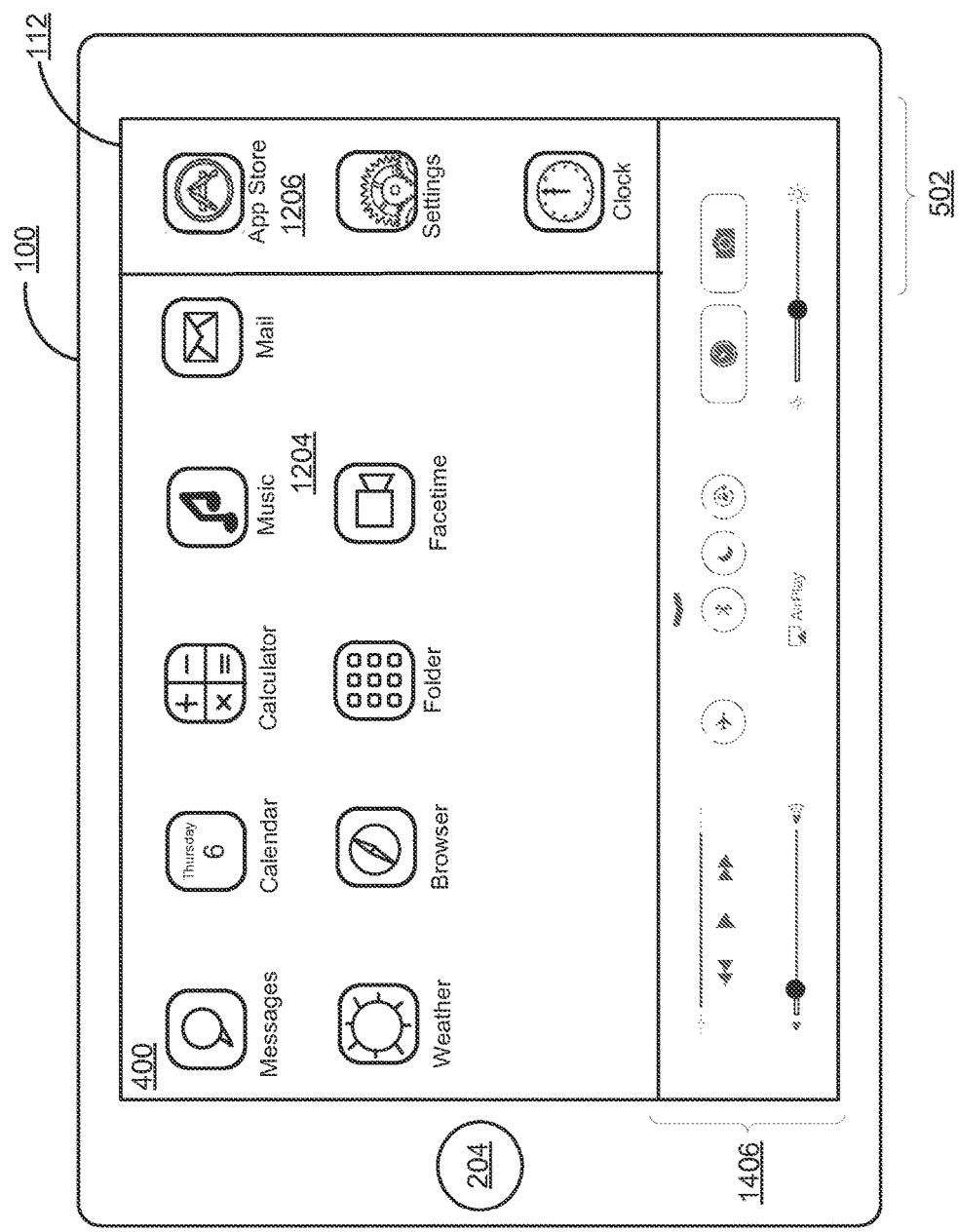
FIG. 14B illustrates displaying a control window on a user interface in landscape orientation, according to some embodiments.

FIGS. 14A and 14B illustrate displaying a control window on a user interface in landscape orientation, according to some embodiments. While displaying the UI in landscape orientation as shown in FIG. 14A, the device receives a control gesture or input for displaying a control window. The control gesture optionally includes a swipe or flick in a direction substantially vertically upwards relative to the user interface 400 through a contact of the user's finger with the touch-sensitive display 112. In FIG. 14A, the control gesture is represented by the contact 1402 of the user's finger on user interface, shown as a dotted ellipse, moving in the upwards vertical direction 1404 relative to the UI-orientation.

As shown in FIG. 14B, responsive to a control gesture, for example, through contact 1402, the device 100 displays a control window 1406 along the bottom edge of the user interface. The control window 1406 is displayed in front of dock region and UI objects in the UI region occupied by the control window 1406.

Figure 15A:
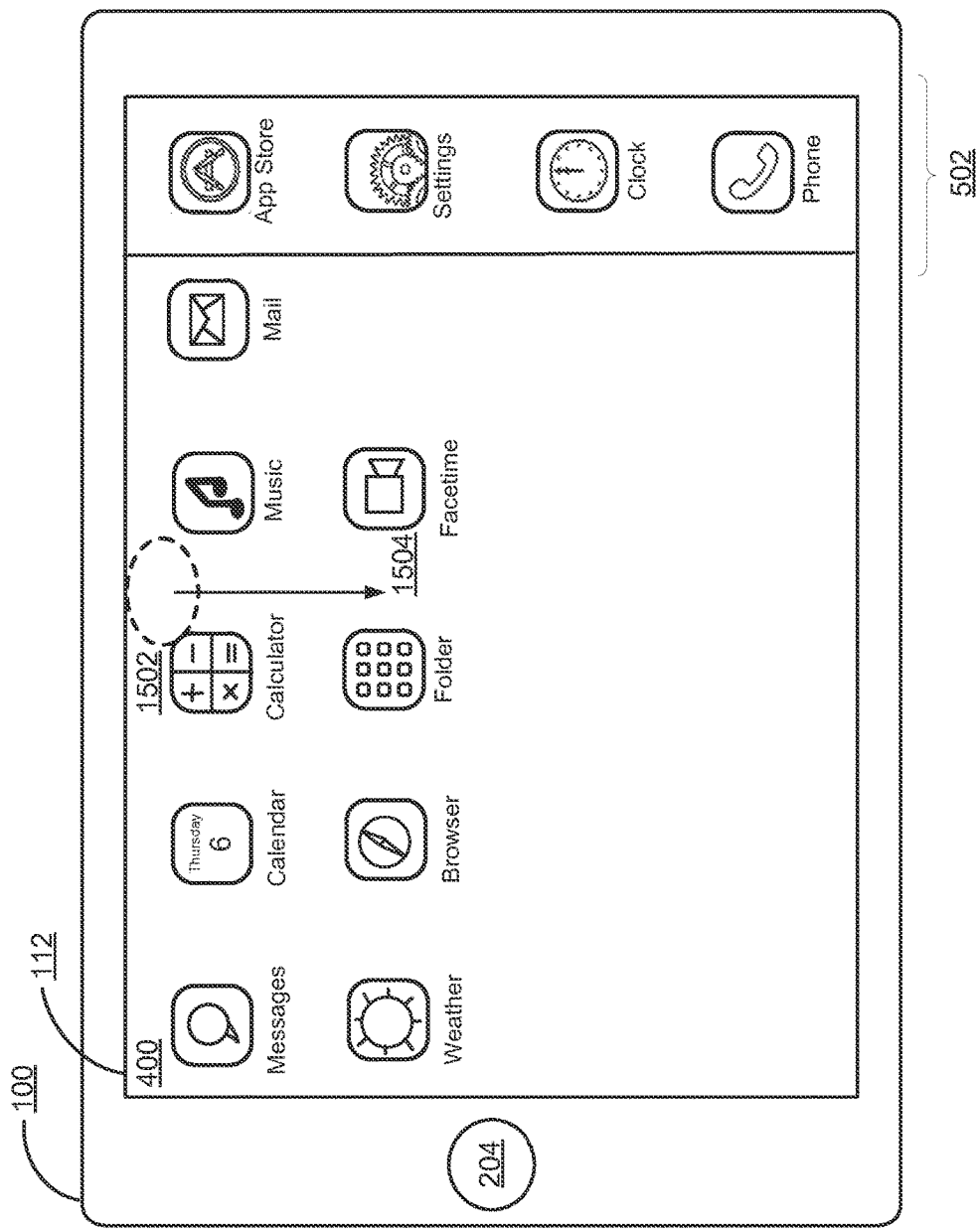
FIG. 15A illustrates displaying a notification window on a user interface in landscape orientation, according to some embodiments.
Figure 15B:
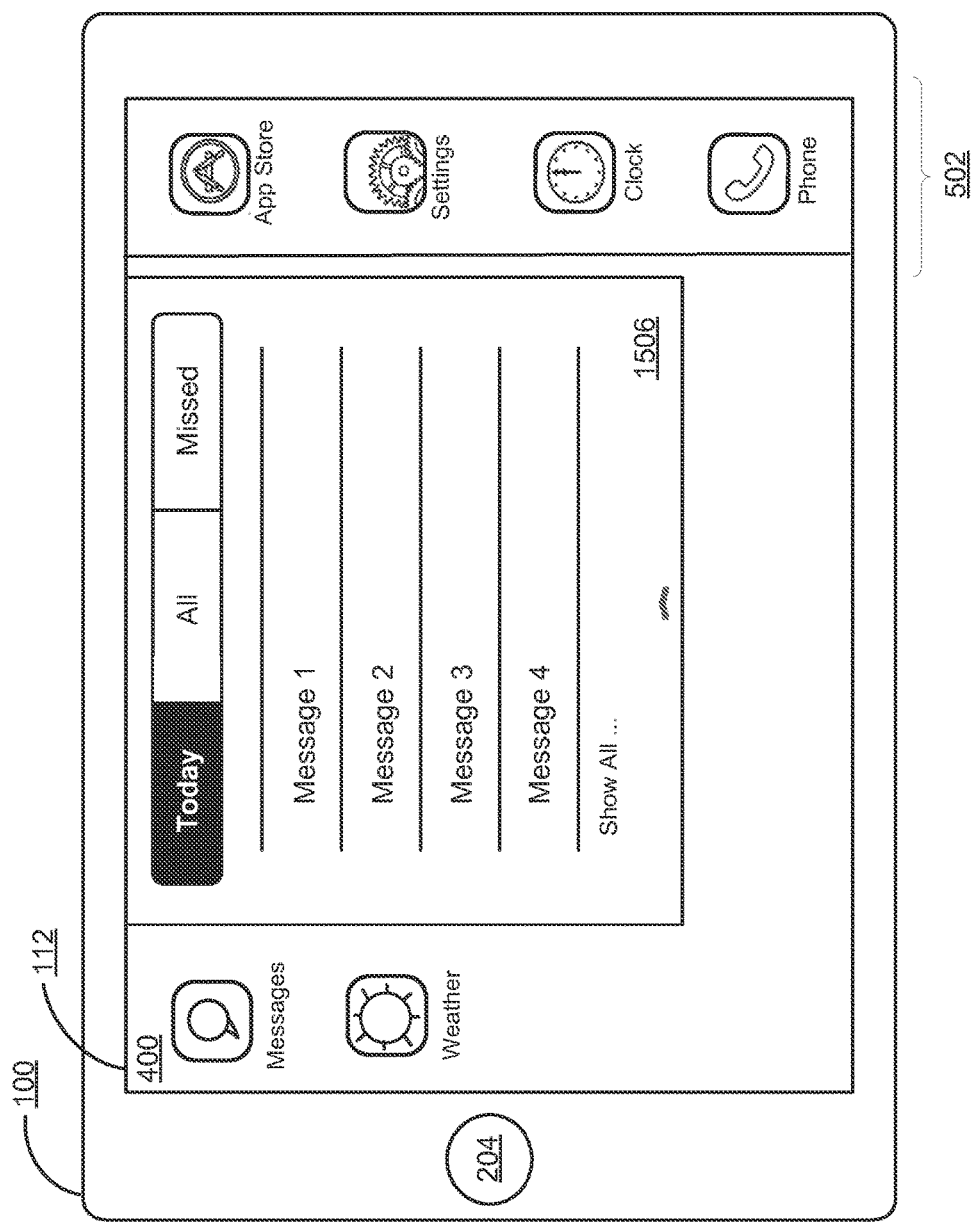
FIG. 15B illustrates displaying a notification window on a user interface in landscape orientation, according to some embodiments.

FIGS. 15A and 15B illustrate displaying a notification window on a user interface in landscape orientation, according to some embodiments. While displaying the UI in landscape orientation as shown in FIG. 15A, the device receives a notification gesture or input for displaying a notification window. The notification gesture optionally includes a swipe or flick in a direction substantially vertically downwards relative to the user interface 400 through a contact of the user's finger with the touch-sensitive display 112. In FIG. 15A, the notification gesture is represented by the contact 1502 of the user's finger on user interface, shown as a dotted ellipse, moving in the downwards vertical direction 1504 relative to the UI-orientation.

As shown in FIG. 15B, responsive to a notification gesture, for example, through contact 1502, the device 100 displays a notification window 1506 along the top edge of the user interface. The notification window 1506 is displayed centered along the top edge and in front of UI objects in the UI region occupied by the notification window 1506. Since the displayed notification window does not overlap with the dock region 502, the notification window 1506 and dock region 502 are both displayed in their entirety on the user interface.

Figure 16A:
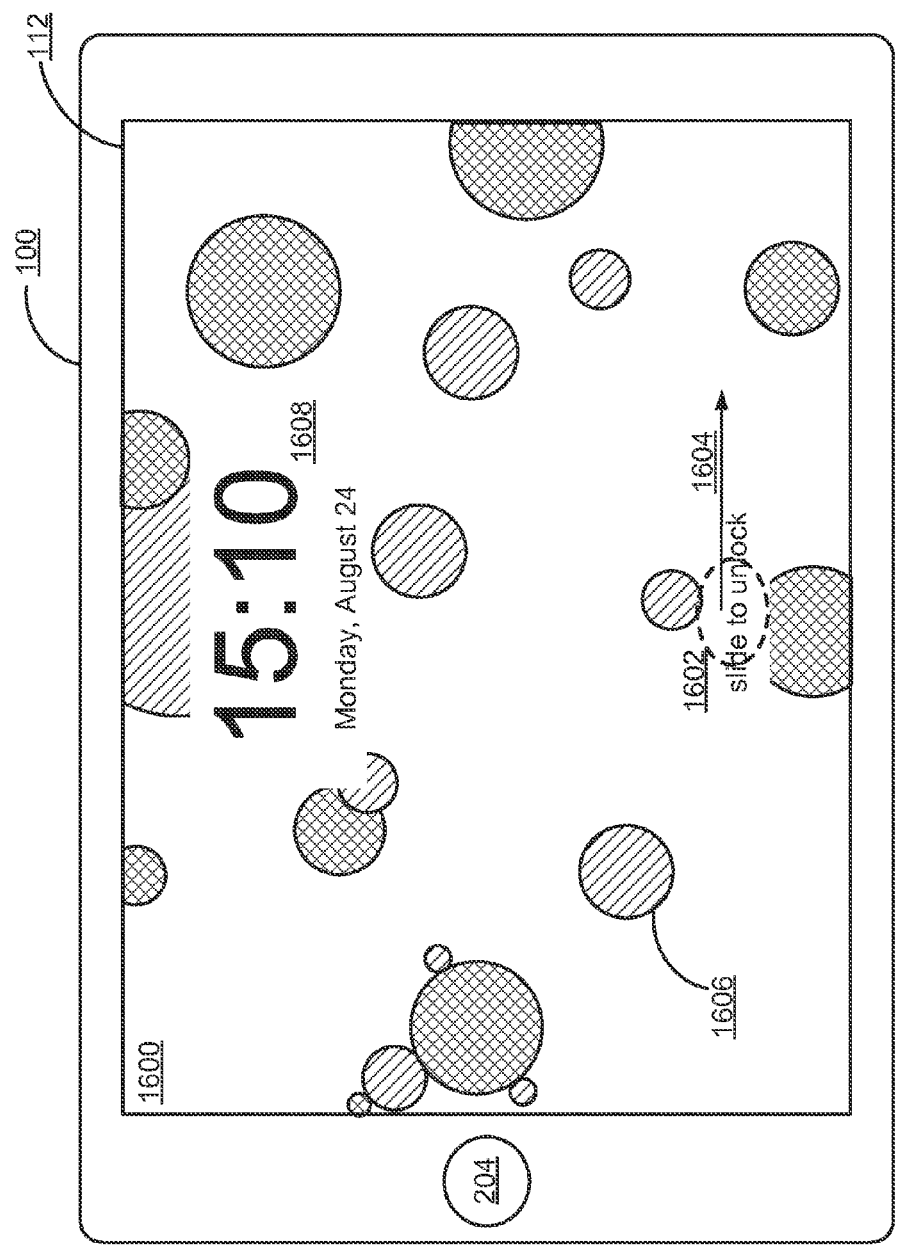
FIG. 16A illustrates unlocking a user interface in landscape orientation, according to some embodiments.
Figure 16B:
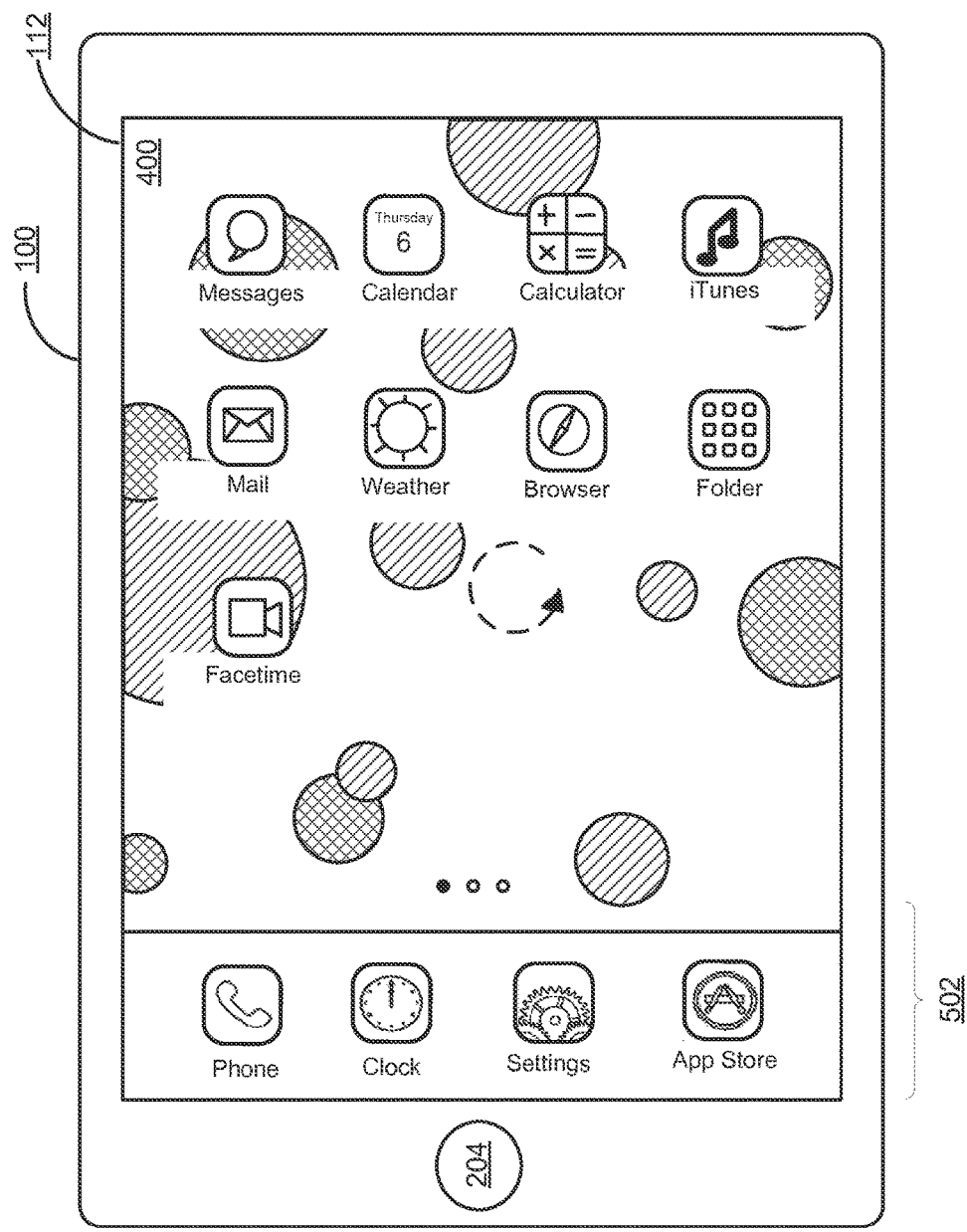
FIG. 16B illustrates unlocking a user interface in landscape orientation, according to some embodiments.
Figure 16C:
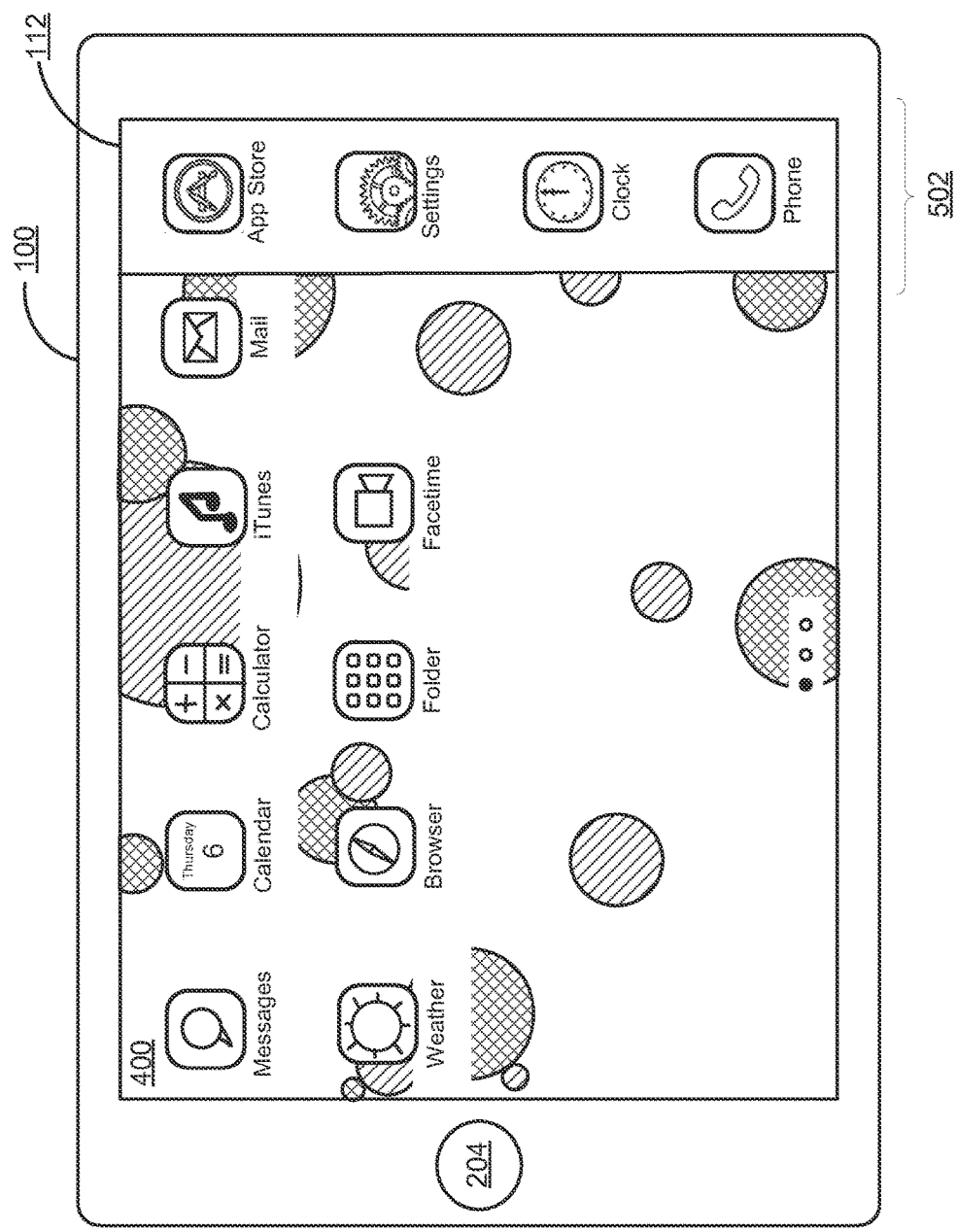
FIG. 16C illustrates unlocking a user interface in landscape orientation, according to some embodiments.

FIGS. 16A-C illustrate unlocking a user interface in landscape orientation, according to some embodiments. While displaying the unlock screen 1600 in landscape orientation as shown in FIG. 16A, the device receives a unlock gesture or input for displaying a user interface in landscape view. The unlock gesture optionally includes a swipe or flick in a direction substantially horizontally to left or right relative to the user interface through a contact of the user's finger with the touch-sensitive display 112. In FIG. 16A, the unlock gesture is represented by the contact 1602 of the user's finger on user interface, shown as a dotted ellipse, moving in the horizontal direction 1604 to the right relative to the UI-orientation. In some embodiments, to unlock the device the contact is placed in a pre-defined location on the unlock screen, e.g. a region close to a text "slide to unlock" as shown in FIG. 16A. The wallpaper 1606 in FIG. 16A is displayed in the background and in portrait view on the unlock screen of the landscape-oriented display, similar to the wall paper shown in FIG. 6. In some embodiments, a time and date message 1608 is displayed in the foreground on the unlock screen (FIG. 16A).

As shown in FIG. 16B, responsive to an unlock gesture, for example, through contact 1602, the device 100 intermittently displays a user interface 400 in portrait orientation. The user interface displays with the dock region 502 to the left and along the UI's short dimension. The UI objects 704 and page indicator 504 are also displayed along the short dimension of the user interface. The dock region 502, UI objects 704, and the dock region are then rotated according to the transition of the UI from portrait to landscape orientation as described with reference to FIGS. 8A-8E. The user interface in landscape orientation at the end of the transition is shown in FIG. 16C with the dock region 502 displayed vertically along the UI's right edge and the dock icons rotated counterclockwise into a horizontal orientation relative to the UI with the icon's top-bottom order reversed when compared to the order in the portrait view of FIG. 16B. The wallpaper maintains its portrait orientation with the reoriented dock region overlaying a region of the wallpaper at the right edge, while exposing the region of the wallpaper at the UI's left edge.

Figure 17A:
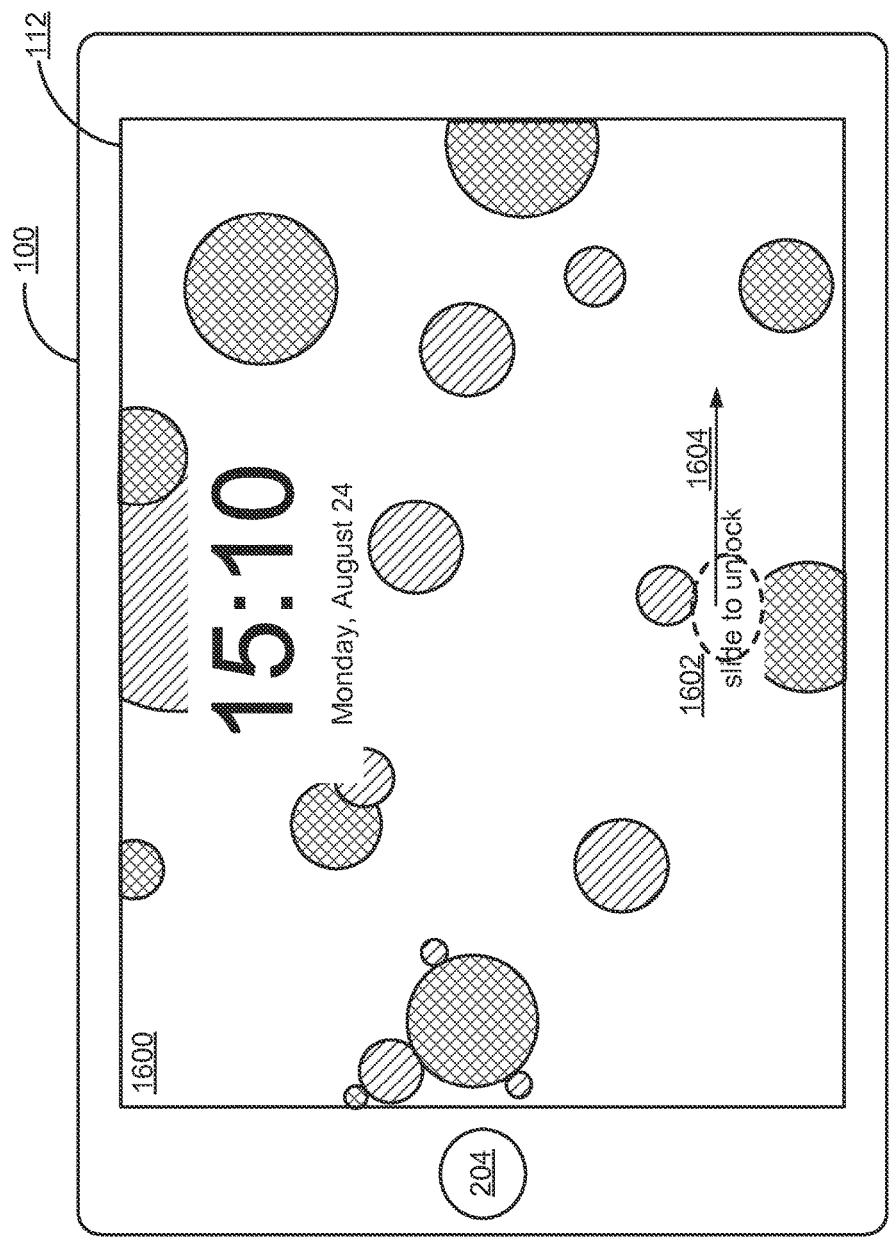
FIG. 17A illustrates unlocking a user interface in landscape orientation, according to some embodiments.
Figure 17B:
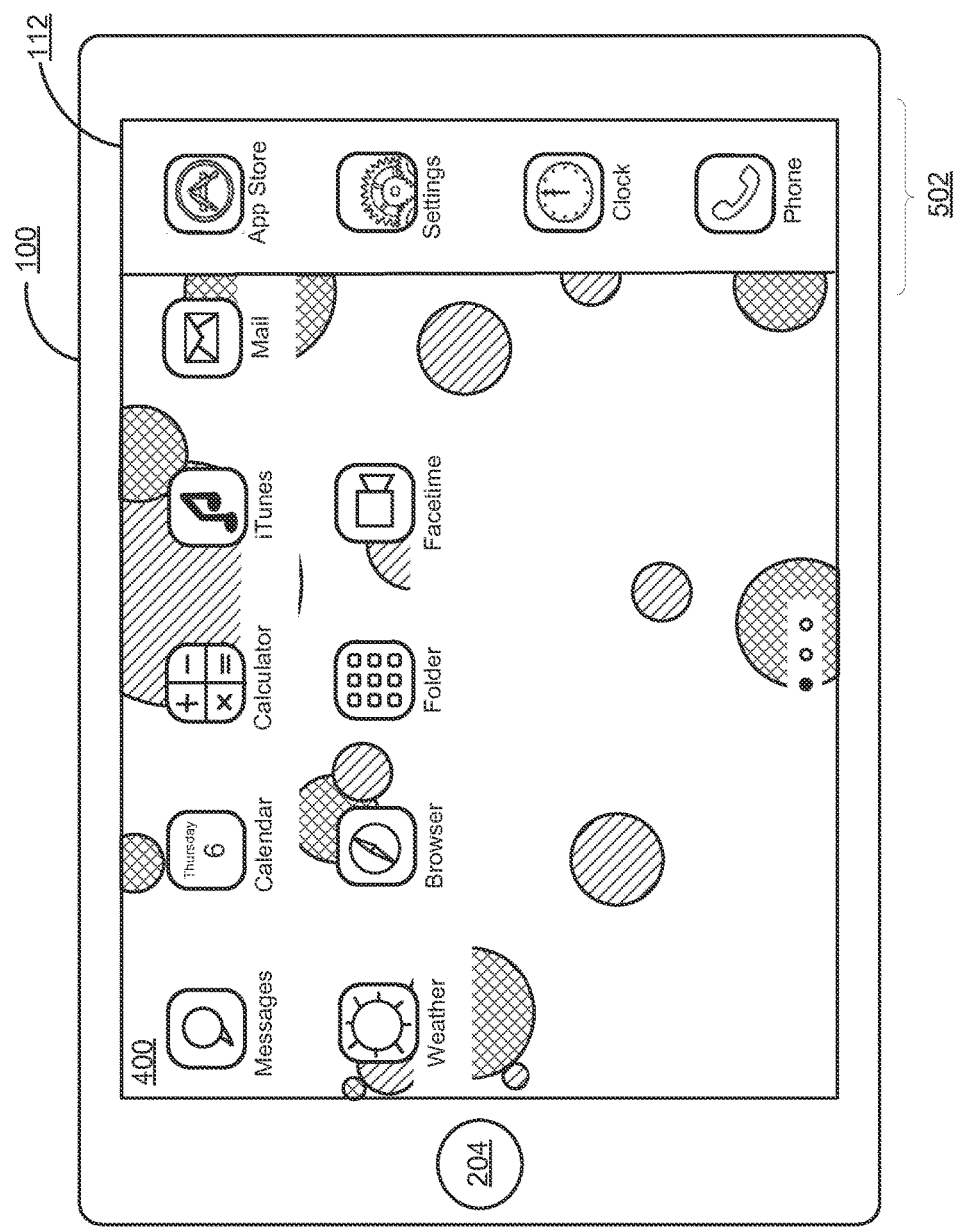
FIG. 17B illustrates unlocking a user interface in landscape orientation, according to some embodiments.

FIGS. 17A and 17B illustrate unlocking a user interface in landscape orientation, according to some embodiments. While displaying the unlock screen 1600 in landscape orientation as shown in FIG. 17A, the device receives a unlock gesture or input for displaying a user interface in landscape view similar to the unlock gesture and screen shown in FIG. 16A. The unlock gesture optionally includes a swipe or flick in a direction substantially horizontally to left or right relative to the user interface through a contact of the user's finger with the touch-sensitive display 112. After unlocking the device 100, the user interface is displayed in the landscape orientation without first displaying the portrait orientation of the UI (FIG. 17B). This enables a user to "live" in landscape mode, so that if their preference is to interact with the device in landscape mode, they can transition from the lock screen to the unlocked user interface without interacting with a portrait user interface. The dock region 502 is displayed vertically along the UI's right edge and the dock icons are arranged in a vertical linear column on the dock region. The wallpaper is displayed in portrait orientation as shown on the unlock screen with the dock region 502 overlaying a region of the wallpaper at the right edge.

Figure 18A:
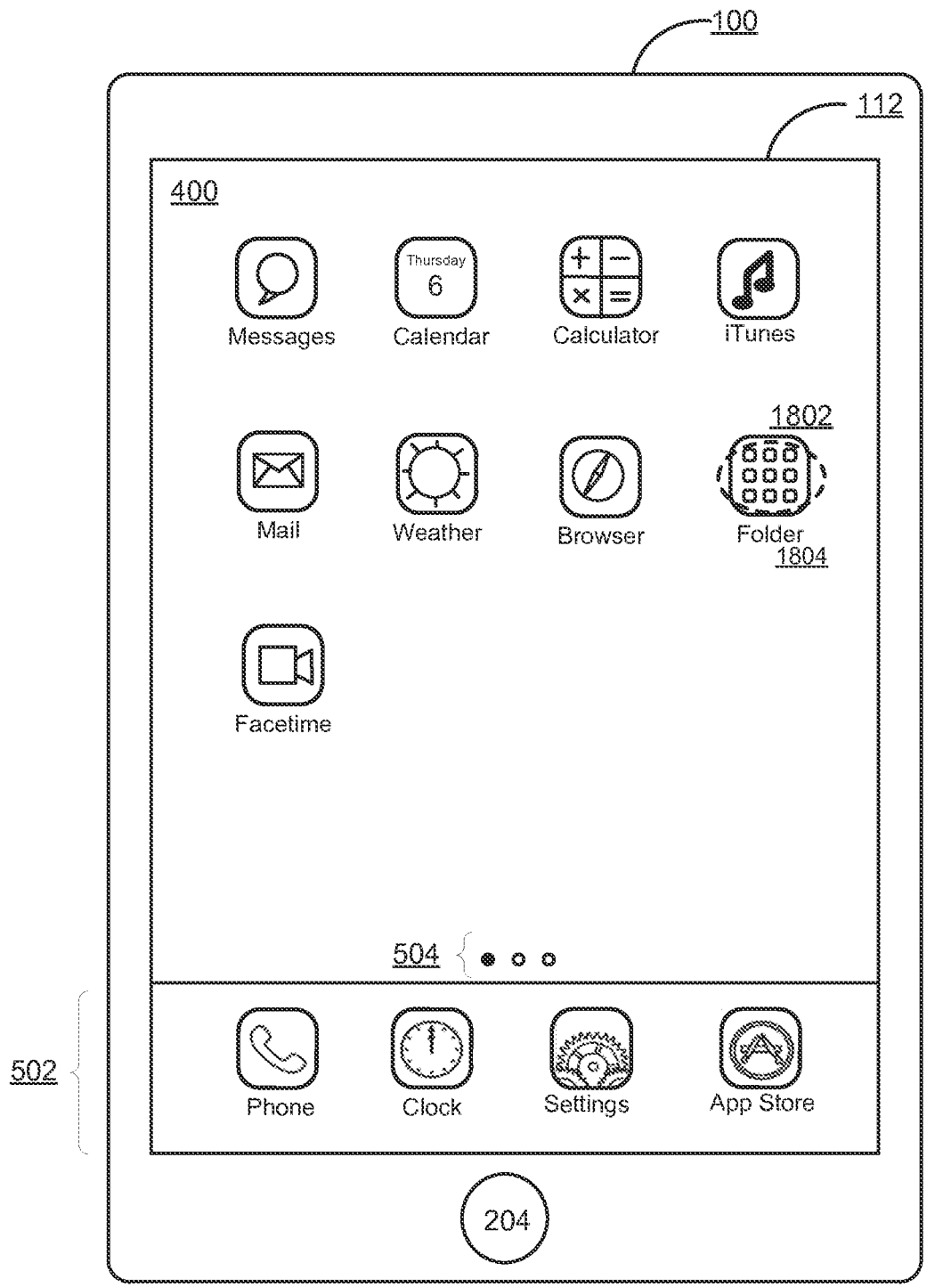
FIG. 18A illustrates displaying a folder in a user interface with the UI changing its orientation from portrait to landscape view and subsequently scrolling the content of the folder in landscape orientation, according to some embodiments.

FIGS. 18A-F illustrate displaying a folder in a user interface with the UI changing its orientation from portrait to landscape view and subsequently scrolling the content of the folder in landscape orientation, according to some embodiments. While displaying a user interface in portrait orientation as shown in FIG. 18A, the device receives an open-folder gesture or input for displaying a folder in a user interface in portrait view. The open-folder gesture optionally includes a contact 1802 of the user's finger with the touch-sensitive display 112 at the location of a folder object of the user interface.

Figure 18B:
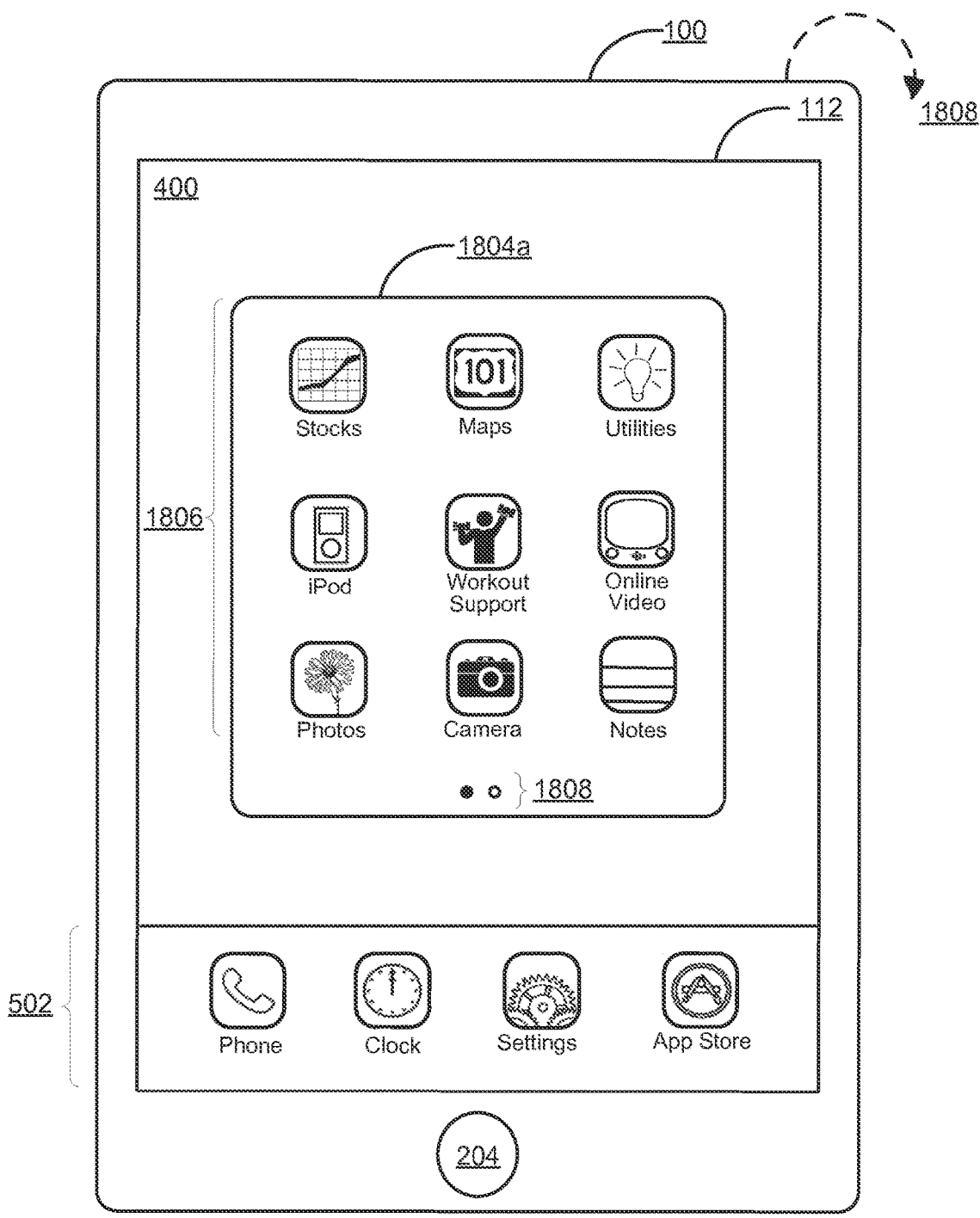
FIG. 18B illustrates displaying a folder in a user interface with the UI changing its orientation from portrait to landscape view and subsequently scrolling the content of the folder in landscape orientation, according to some embodiments.

As shown in FIG. 18B, responsive to a open-folder gesture, for example, through contact 1802, the device 100 displays a folder 1804 in portrait view of the user interface 400 optionally displacing all UI objects 704 and the page indicator 504 with the folder. The dock region 502 is still displayed at the bottom edge of the user interface below the displayed folder region 1804a. UI objects 1806 associated with the folder and a folder indicator 1808 are displayed within a first folder region 1804a. The folder indicator 1808 indicates the number of folder regions for a folder. As each folder regions in the example illustrated in FIG. 18B display only a threshold number of UI objects, additional folder regions are displayed when the number of UI objects associated with a folder exceeds this threshold. For example, the threshold in FIG. 18B is nine UI objects. Thus, a folder with 11 UI objects is distributed over a first and a second folder region. A scrolling gesture or input to scroll between different folder regions optionally includes a swipe or flick in a direction substantially horizontally to left or right relative to the user interface through a contact of the user's finger with the touch-sensitive display 112 within the folder region. In response to a scrolling gesture, second folder region is displayed of the first folder region on the user interface in portrait view.

Figure 18C:
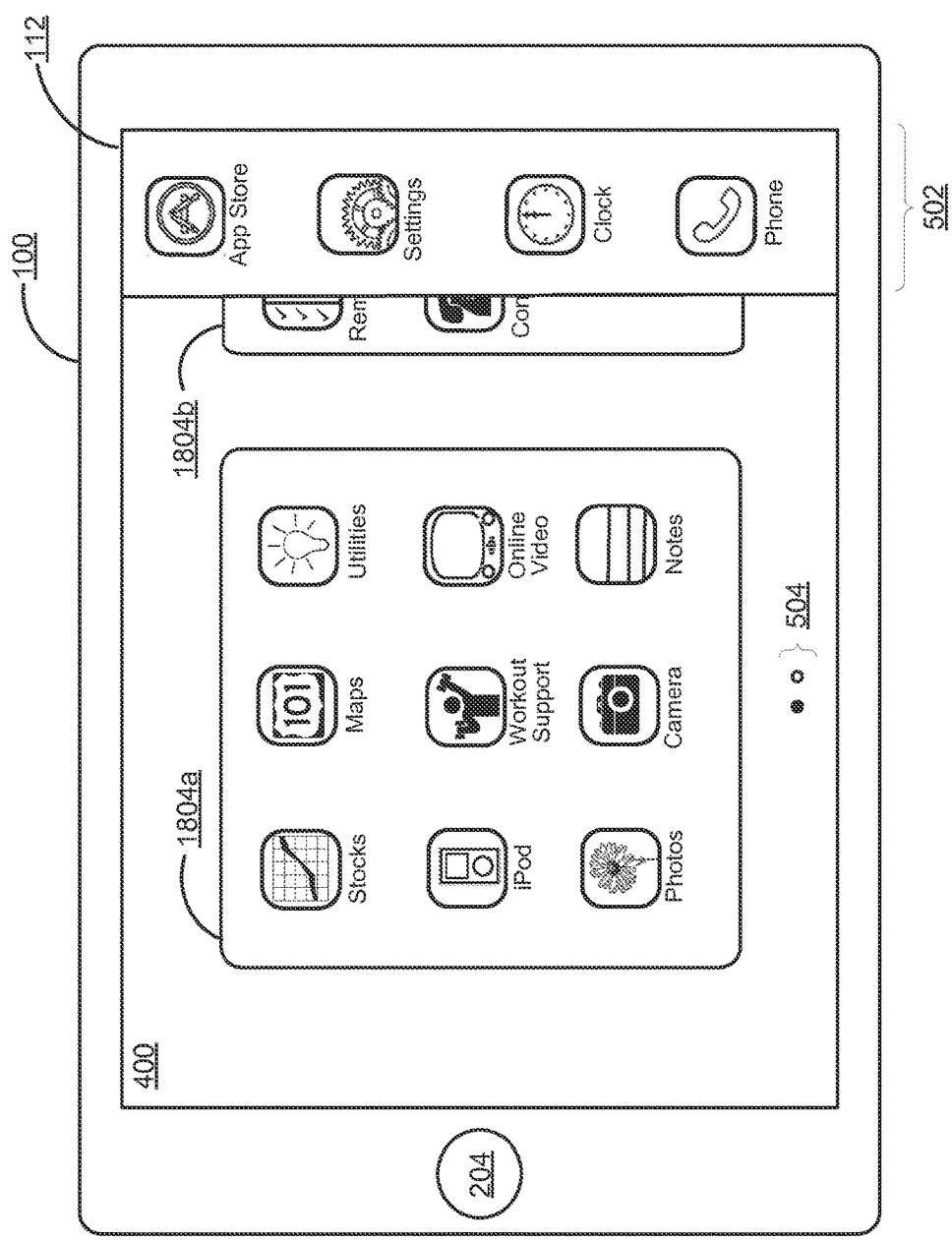
FIG. 18C illustrates displaying a folder in a user interface with the UI changing its orientation from portrait to landscape view and subsequently scrolling the content of the folder in landscape orientation, according to some embodiments.

FIG. 18C illustrates the folder of user interface in landscape orientation. In landscape orientation folders are displayed across multiple pages of a multi-page user interface. In landscape orientation the first folder region 1804a from the portrait view and a second folder region 1804b with additional UI objects are displayed on the UI's first page. Scrolling between different folder regions is accomplished by scrolling between different pages of the user interface as described with reference to FIGS. 10A-C. Instead of the folder indicator 1808, a page indicator 504 is displayed in the landscape orientation.

Figure 18D:
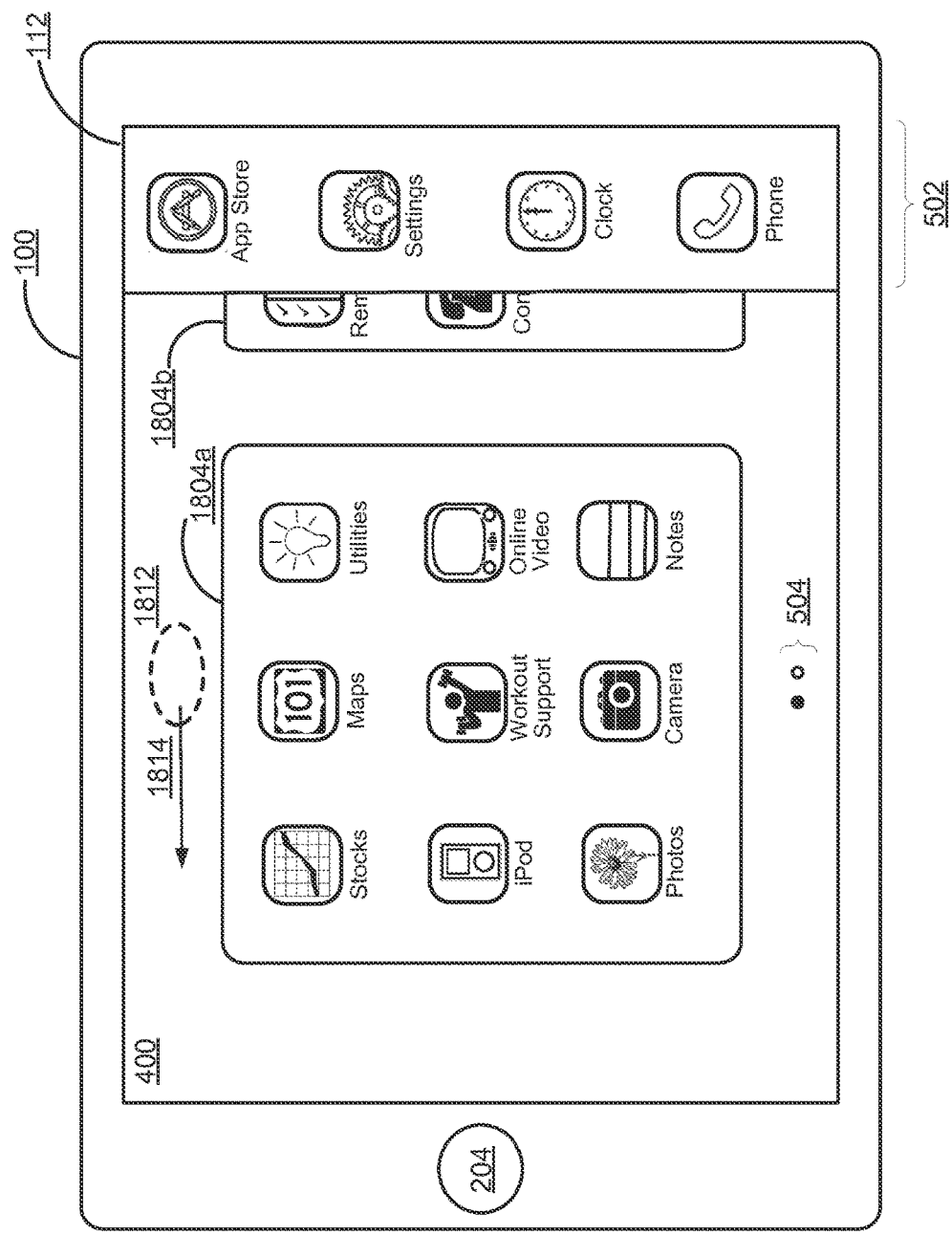
FIG. 18D illustrates displaying a folder in a user interface with the UI changing its orientation from portrait to landscape view and subsequently scrolling the content of the folder in landscape orientation, according to some embodiments.

In FIG. 18D, while displaying the folder (showing two regions) on the first page of the UI, the device receives a next-page gesture or input for displaying the second page of the multi-page interface. The next-page gesture is indicative of a user request to display folder on the second page of the user interface in landscape orientation on the display 112. The next-page gesture optionally includes a swipe or flick in a direction substantially parallel to the long-dimension of the user interface 400 through a contact of the user's finger with the touch-sensitive display 112. In FIG. 18D, the next-page gesture is represented by the contact 1812 of the user's finger on user interface, shown as a dotted ellipse, and moving in the left direction 1814 relative to the UI-orientation.

Figure 18E:
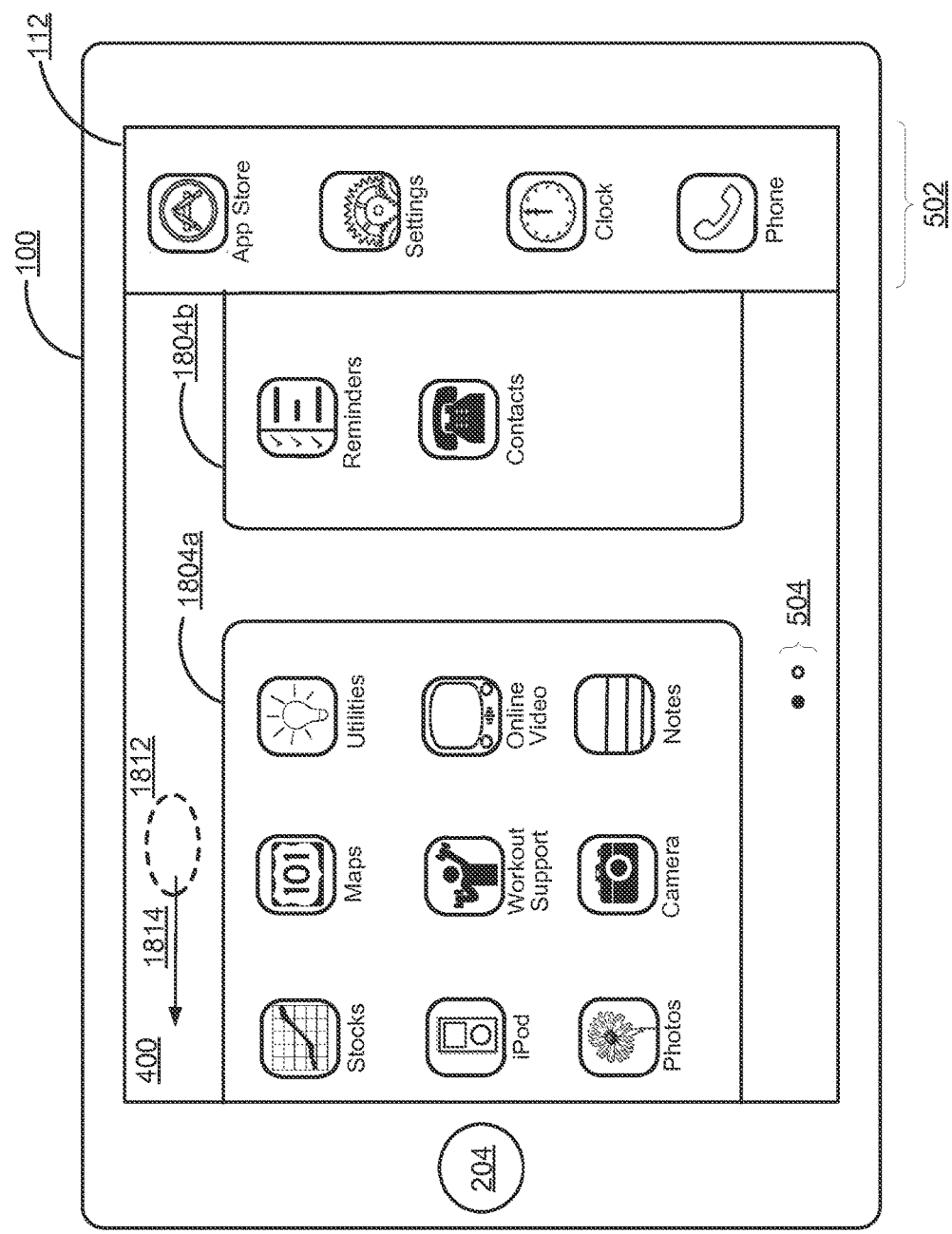
FIG. 18E illustrates displaying a folder in a user interface with the UI changing its orientation from portrait to landscape view and subsequently scrolling the content of the folder in landscape orientation, according to some embodiments.
Figure 18F:
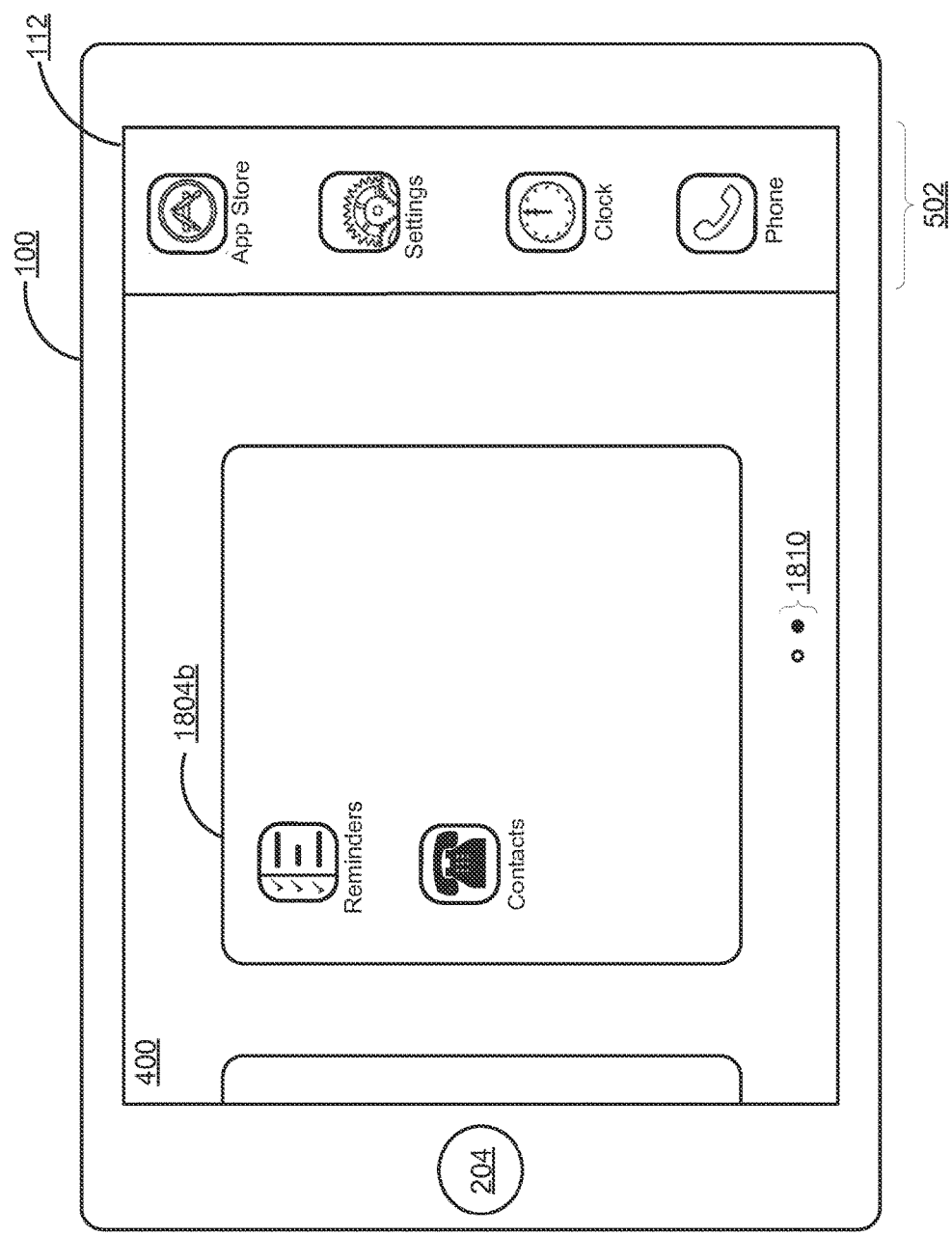
FIG. 18F illustrates displaying a folder in a user interface with the UI changing its orientation from portrait to landscape view and subsequently scrolling the content of the folder in landscape orientation, according to some embodiments.

As shown in FIG. 18E, responsive to a next-page gesture, for example, through contact 1812, the device 100 displays first and second folder regions 1804a, 1804b moving to the left. In addition, the first folder region 1804a is sliding off the user interface 400 at the left edge, while the second folder region 1804b is sliding from underneath the dock region 502 onto the user interface. Continuously moving the contact 1812 along the direction 1814 leads to the second page being displayed on the user interface as shown in FIG. 18F. After completion of the first and second page's horizontal movement, the second folder region 1804b is fully displayed on the second page of the user interface. A portion of the first folder region 1804a is displayed to the second folder region 1804b on the second page. The page indicator 1810 in FIG. 18F indicates that the second page is being displayed.

In some embodiments, in response to a next-page gesture while the user interface is in the second UI-orientation (e.g., landscape orientation), the first subset (e.g., UI objects 704) is scrolled in accordance with a magnitude of the next-page gesture to hide some or all of the first region and reveal at least an additional portion of the second region (e.g., the device scrolls smoothly through multiple pages of icons in the folder allowing the user to stop at different points that are not aligned with the divisions between the pages of the folder).

In some embodiments, in response to a next-page gesture while the user interface is in the first UI-orientation (e.g., portrait orientation), the first subset (e.g., UI objects 704) is replaced with the second subset (e.g., the device switches from displaying a first page of icons in the folder to displaying a second page if icons in the folder).

Figure 19A:
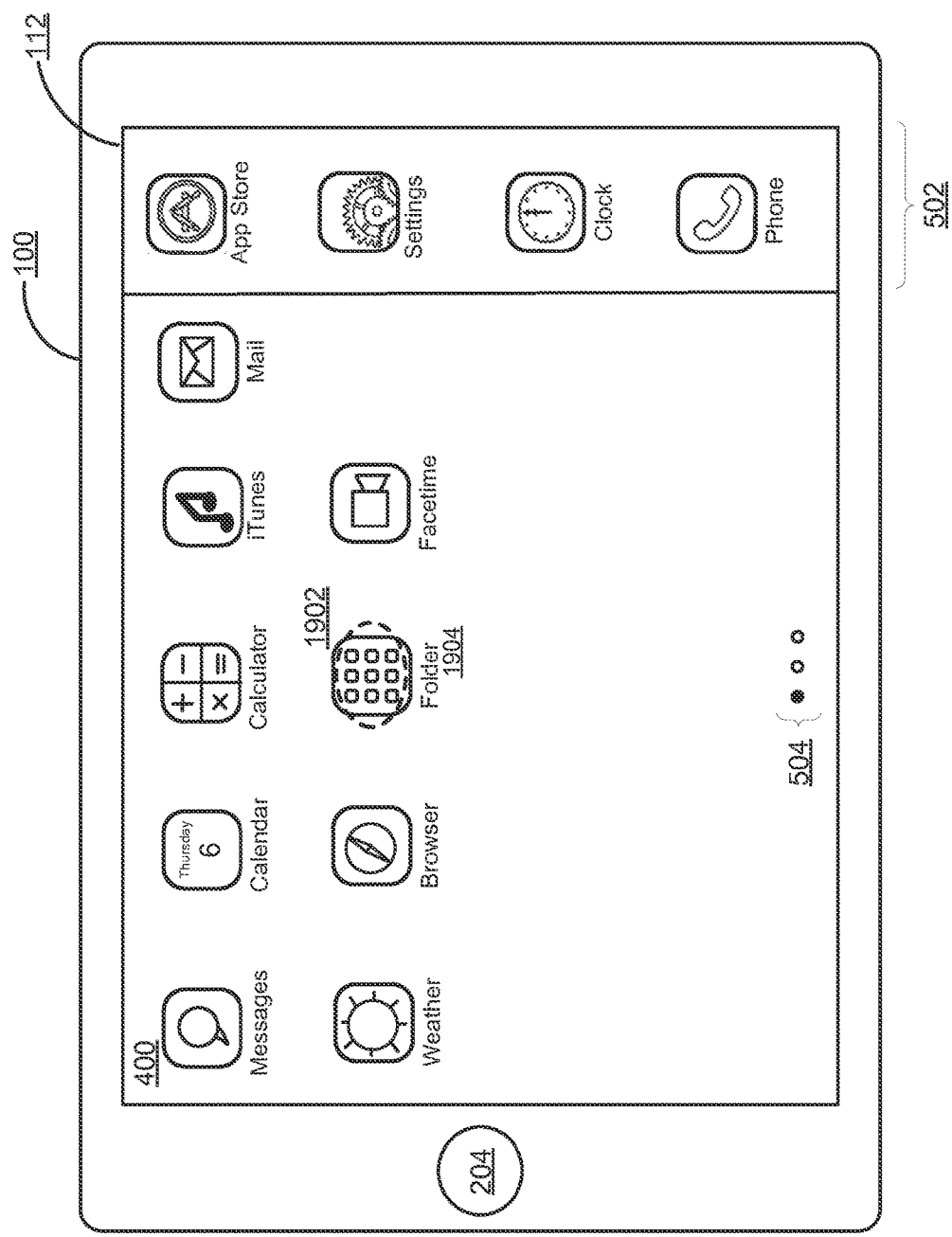
FIG. 19A illustrates displaying a folder on user interface in landscape view, according to some embodiments.
Figure 19B:
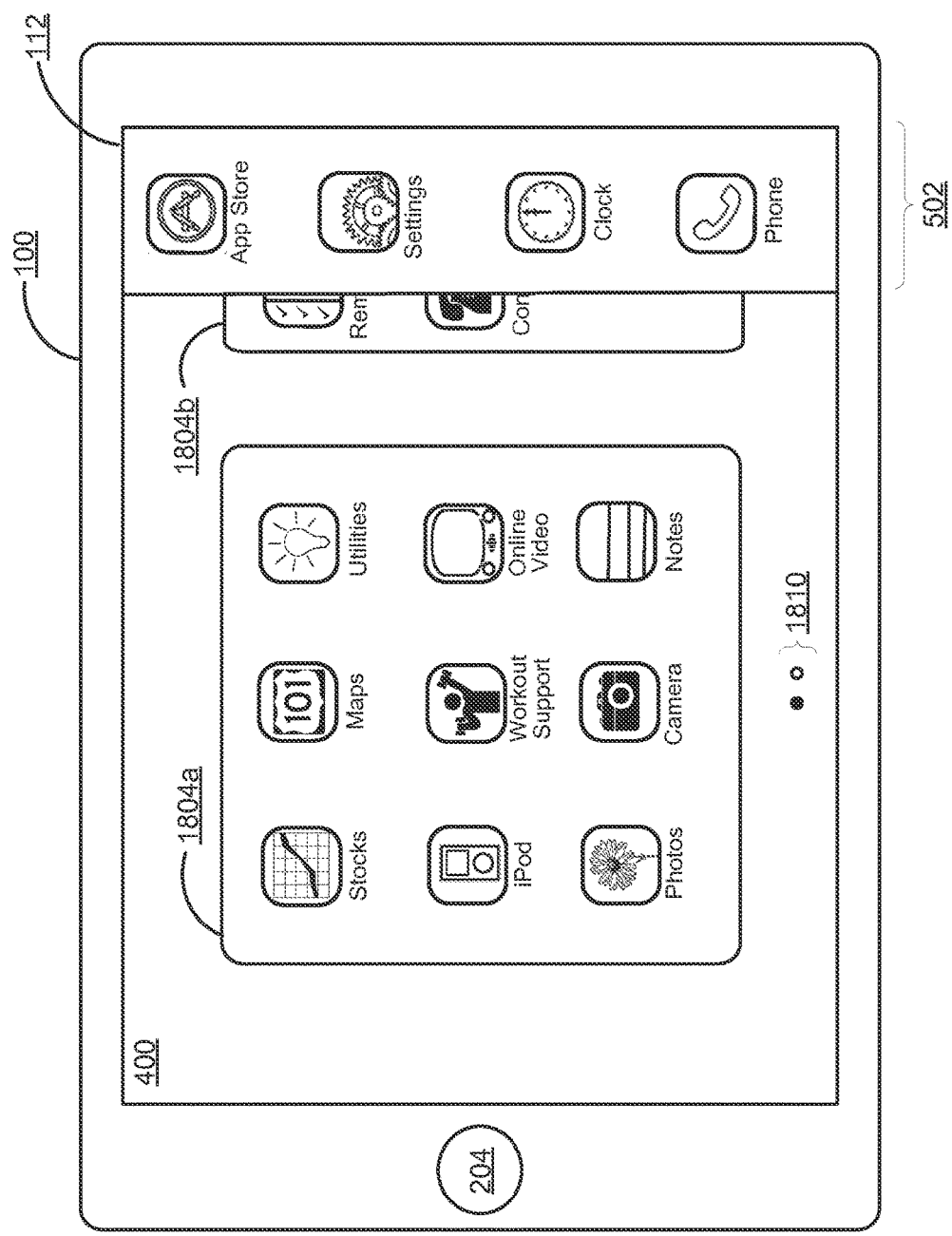
FIG. 19B illustrates displaying a folder on user interface in landscape view, according to some embodiments.

FIGS. 19A and 19B illustrate displaying a folder on user interface in landscape view, according to some embodiments. While displaying a user interface in landscape orientation as shown in FIG. 19A, the device receives an open-folder gesture or input for displaying a folder in a user interface in landscape view. The open-folder gesture optionally includes a contact 1902 of the user's finger with the touch-sensitive display 112 at the location of a folder object 1904 of the user interface 400.

As shown in FIG. 19B, responsive to an open-folder gesture, for example, through contact 1902, the device 100 displays a folder in landscape view of the user interface 400 as described with reference to FIG. 18C. In landscape orientation a first folder region 1804a is displayed at the center of the user interface with a possible second folder region 1804b to the right of the first folder region. Scrolling between different folder regions is accomplished by scrolling between different pages of the user interface as described with reference to FIGS. 10A-C. A page indicator 1810 is displayed in the landscape orientation indicative of the number of folder regions of a folder with the page number equaling the folder region number.

Figure 20:
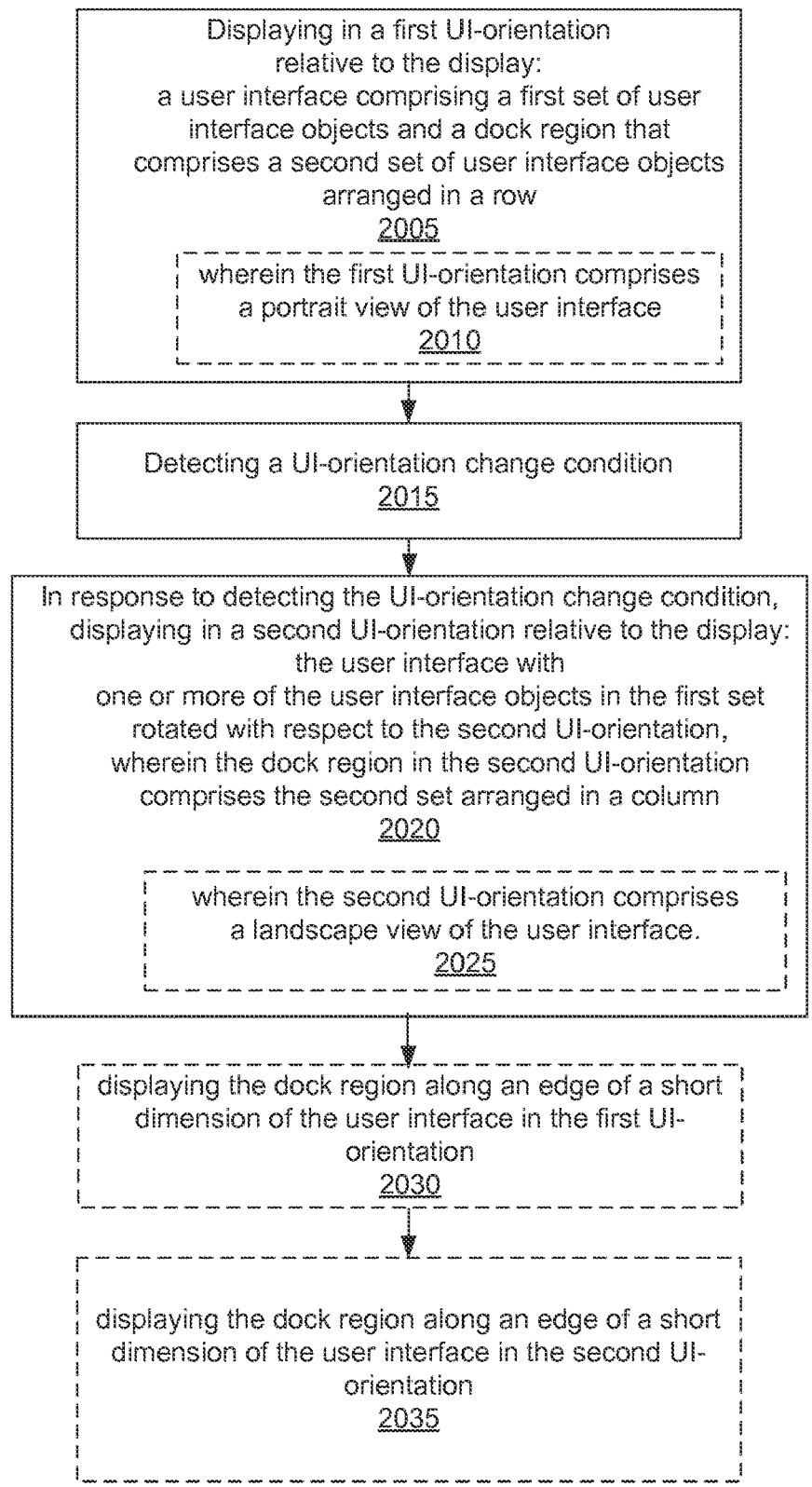
FIG. 20 shows a flow diagram of a method for changing a user interface between a first and a second UI-orientation, according to some embodiments.

FIG. 20 shows a flow diagram of a method for changing a user interface between a first and a second UI-orientation, according to some embodiments. Embodiments of the methods described here optionally are implemented on an electronic device with a touch-sensitive surface and display, such as device 100. The device 100 displays 2005 in a first UI-orientation relative to the display a user interface that comprises a first set of UI objects (704) and a dock region (502) with the dock region comprising a second set of UI objects (416, 440, 446) arranged in a row as shown for example in FIGS. 5, 16B, 18A and 18B. In some embodiments, wherein the first UI-orientation comprises 2010 a portrait view of the user interface as shown for example in FIGS. 5, 16B, 18A and 18B. While displaying the user interface (400) in the first UI-orientation, the device 100 detects 2015 a UI-orientation change condition (702, 902, 1808) as shown for example in FIGS. 7A, 8A, 9A, 16B, and 18B. In response to detecting the UI-orientation change condition, the device 100 displays 2020 in a second UI-orientation relative to the display with one or more of the user interface objects in the first set of user interface objects rotated relative to the display, wherein the dock region (502) in the second UI-orientation comprises the second set of UI objects arranged in a column, as shown for example in FIGS. 6, 7E, 8E, 9D, 10A-10C, 11A-11E, 12A-12D, 13A, 13B, 14A, 14B, 15A, 15B, 16C, 17B, 18C-18F, 19A and 19B. In some embodiments, wherein the second UI-orientation comprises 2025 a landscape view of the user interface as shown for example in FIGS. 6, 7E, 8E, 9D, 10A-10C, 11A-11E, 12A-12D, 13A, 13B, 14A, 14B, 15A, 15B, 16C, 17B, 18C-18F, 19A and 19B. In some embodiments, the device 100 displays 2030 in the first UI-orientation the dock region along an edge of the short dimension of the user interface as shown for example in FIGS. 5, 16B, 18A and 18B. In some embodiments, wherein the user interface is 2035 a rectangular region having a long dimension and a short dimension, displaying a user interface in a first UI-orientation relative to the display comprises displaying the dock region along an edge of the short dimension of the user interface in the first UI-orientation, and displaying the user interface in a second UI-orientation relative to the display comprises displaying the dock region along an edge of the short dimension of the user interface in the second UI-orientation, as show for example in FIGS. 5-19.

Figure 21:
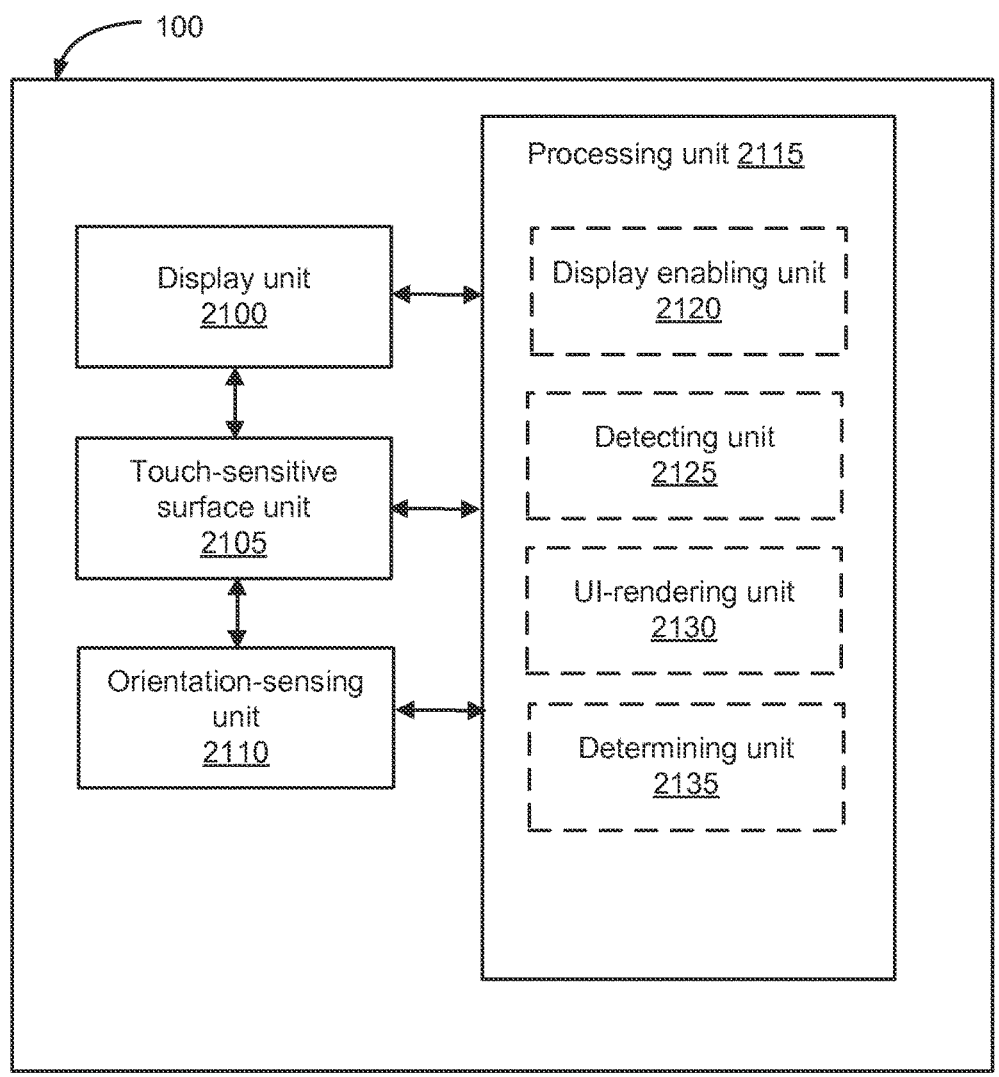
FIG. 21 shows a functional block diagram of device 100 configured in accordance with the principles of the various described embodiments.

The operations described above with reference to FIG. 20 are, optionally, implemented by components depicted in FIGS. 1A-1B, and FIG. 21. For example, [method steps] are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and FIG. 20.

As mentioned above, the operations described with reference to FIG. 20 are optionally implemented by components depicted in FIG. 21. In accordance with some embodiments, FIG. 21 shows a functional block diagram of device 100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, the device 100 includes a display unit 2100 configured to display an application, a touch-sensitive surface unit 2105 configured to receive user contacts, an orientation-sensing unit 2110 configured to determine the orientation of the device 100, and a processing unit 2115 coupled to the display unit 2100, the orientation-sensing unit 2110, and the touch-sensitive surface unit 2105. In some embodiments, the processing unit 2115 includes a display enabling unit 2120, a detecting unit 2125, a UI-rendering unit 2130, and a determining unit 2135.

The processing unit 2115 is configured to display in a first UI-orientation relative to the display a user interface that comprises a first set of UI objects and a dock region with the dock region comprising a second set of UI objects arranged in a row (e.g., with the display enabling unit 2120). While displaying the user interface in the first UI-orientation, the processing unit 2115 is also configured to detect a UI-orientation change condition (e.g., with the detecting unit 2125). In response to detecting the UI-orientation change condition, the processing unit 2115 displays in a second UI-orientation relative to the display unit with one or more of the user interface objects in the first set of user interface objects (e.g., with the display enabling unit 2115) rotated relative to the display unit (e.g., with the UI rendering unit 2130), wherein the dock region in the second UI-orientation comprises the second set of UI objects arranged in a column.

In some embodiments, wherein the user interface is a rectangular region having a long dimension and a short dimension, displaying a user interface in a first UI-orientation relative to the display unit comprises displaying the dock region along an edge of the short dimension of the user interface in the first UI-orientation (e.g., with the display enabling unit 2120), and displaying the user interface in a second UI-orientation relative to the display unit comprises displaying the dock region along an edge of the short dimension of the user interface in the second UI-orientation (e.g., with the display enabling unit 2120).

In some embodiments, wherein the first UI-orientation comprises a portrait view of the user interface, and the second UI-orientation comprises a landscape view of the user interface.

In some embodiments, wherein in the first UI-orientation the dock region is displayed in a horizontal orientation with respect to the user interface (e.g., with the display enabling unit 2120), and in response to detecting the UI-orientation change condition (e.g., with the detecting unit 2125), the dock region is displayed in a vertical orientation in the second UI-orientation (e.g., with the display enabling unit 2120).

In some embodiments, wherein the edge of the short dimension in the first UI-orientation comprises a bottom edge of the user interface, and in the second UI-orientation comprises a right edge of the user interface.

In some embodiments, wherein rotating of the one or more of the user interface objects in the first set of the user interface objects relative to the display unit (e.g., with the UI-rendering unit 2130) comprises crossfading the one or more of the user interface objects in the first set of user interface objects between their respective locations in the first and in the second UI-orientation (e.g., with the UI-rendering unit 2130).

In some embodiments, wherein crossfading the one or more of the user interface objects in the first set of user interface objects between their respective locations in the first and in the second UI-orientation (e.g., with the UI-rendering unit 2130) comprises changing the positions of the crossfaded user interface objects on the display unit so that an order of the first set of user interface objects in the second UI-orientation is identical to their order in the first UI-orientation (e.g., with the UI-rendering unit 2130).

In some embodiments, wherein rotating of the one or more of the user interface objects in the first set of the user interface objects relative to the display unit (e.g., UI-rendering unit 2130) comprises rotating the set of one or more of the user interface objects as the user interface objects crossfade between their respective locations in the first and in the second UI-orientation (e.g., with the UI-rendering unit 2130).

In some embodiments, wherein the user interface comprises a multi-page user interface, and in response to detecting a next-page input for switching between different pages of the multi-page user interface (e.g., with the detecting unit 2125), displaying a set of user interface objects that are different from the first set of user interface objects (e.g., with the display enabling unit 2120), while maintaining display of the dock region and the second set of user interface objects (e.g., with the UI-rendering unit 2130).

In some embodiments, wherein detecting the UI-orientation change condition (e.g., with the detecting unit 2125) comprises receiving input indicative of a change in orientation of the display unit of the electronic device from a first device orientation to a second device orientation (e.g., with the orientation-sensing unit 2110).

In some embodiments, wherein detecting the UI-orientation change condition (e.g., with the detecting unit 2125) comprises receiving a request from a user of the electronic device to rotate the user interface from the first UI-orientation to the second UI-orientation (e.g., with the touch-sensitive surface unit 2105).

In some embodiments, wherein a user interface object of the first and second set of user interface objects comprises one or more icons, widgets or application windows.

In some embodiments, wherein rotating the one or more of the user interface objects in the first set of user interface objects in conjunction with the second UI-orientation (e.g., with the UI-rendering unit 2130) is delayed until the electronic device is fully rotated from a first device orientation when displaying the user interface objects in the first UI-orientation to second device orientation associated with displaying the user interface objects in the second UI-orientation (e.g., with the display enabling unit 2120).

In some embodiments, the processing unit 2115 is further configured to display the dock region to the right side of the user interface in the second UI-orientation (e.g., with the display enabling unit 2120).

In some embodiments, the processing unit 2115 is further configured to display the dock region to the side of the user interface closest to the location of a physical button on the electronic device (e.g., with the display enabling unit 2120).

In some embodiments, the processing unit 2115 is further configured to in response to detecting the UI-orientation change condition and the edges of the short dimension of the user interface in the first UI-orientation and in the second UI-orientation being identical (e.g., with the detecting unit 2125) continuously display the dock region along the edge of the short dimension of the user interface in the first UI-orientation (e.g., with the display enabling unit 2120); and rotate each user interface object in the second set of user interface objects in place, such that a center of each rotated user interface object retains a same location on the display (e.g., with the UI-rendering unit 2130).

In some embodiments, the processing unit 2115 is further configured to in response to detecting the UI-orientation change condition and when edges of the short dimension of the user interface in the first UI-orientation and in the second UI-orientation being different (e.g., with the detecting unit 2125) slide the dock region off the display unit in a first direction relative to the first set of user interface objects (e.g., with the UI-rendering unit 2130); and slide the dock region back onto the display unit in the first direction relative to the first set of user interface objects from an edge of the display unit opposite to an edge, from which the dock region slid off (e.g., with the UI-rendering unit 2130).

In some embodiments, wherein a spacing between the one or more of the user interface objects in the first set of user interface objects rotated in conjunction with the second UI-orientation changes between the user interface being displayed in the first UI-orientation as compared to in the second UI-orientation (e.g., with the UI-rendering unit 2130).

In some embodiments, the user interface further comprises a wallpaper background in an orientation that is independent of the UI-orientation.

In some embodiments, wherein: if the UI-orientation change condition comprises a counterclockwise rotation of the display unit, the second set of user interface objects is ordered from top to bottom in the column in a first order, the first order being identical to a right to left order the second set is arranged in the row of the dock region in the first UI-orientation (e.g., with the UI-rendering unit 2130); and if the UI-orientation change condition comprises a clockwise rotation of the display unit, the second set of user interface objects is ordered from top to bottom in the column in a second order, the second order being reversed to the right to left order (e.g., with the UI-rendering unit 2130).

In some embodiments, wherein the user interface comprises a multi-page user interface, and the processing unit 2115 is further configured to in response to detecting a next-page input for moving a user interface object between different pages in the first UI-orientation (e.g., with the detecting unit 2125), move the user interface object laterally above the dock region (e.g., with the UI-rendering unit 2130).

In some embodiments, wherein the user interface comprises a multi-page user interface, and the processing unit 2115 is further configured to in response to detecting a next-page input for moving a user interface object from a first page to a second page in the second UI-orientation (e.g., with the detecting unit 2125), the first and second page being arranged on either side of the dock region, move the user interface object laterally underneath the dock region (e.g., with the UI-rendering unit 2130).

In some embodiments, wherein the surface of the electronic device is touch-sensitive, the first page is arranged to left of the dock region, and the next-page input for moving an user interface object from a first to a second page in the second UI-orientation comprises detecting a contact on the touch-sensitive surface unit 2015, the contact overlapping the dock region not exceeding a pre-defined threshold percentage for a specified time period (e.g., with the detecting unit 2125).

In some embodiments, the processing unit 2115 is further configured to display a lock screen in the first UI-orientation (e.g., with the display enabling unit 2120); in response to detecting an unlock input and detecting the UI-orientation change condition (e.g., with the detecting unit 2125), display a home screen of the user interface in the first UI-orientation before displaying the home screen in the second UI-orientation after a pre-defined time period has elapsed (e.g., with the display enabling unit 2120).

In some embodiments, wherein the next-page input is received while displaying the user interface in the first UI-orientation (e.g., with the touch-sensitive surface unit 2105).

In some embodiments, wherein the next-page input is received while displaying the user interface in the second UI-orientation (e.g., with the touch-sensitive surface unit 2105).

In some embodiments, wherein the detecting the UI-orientation change condition comprises sensing a change in orientation of the electronic device relative to a respective frame of reference (e.g., with the orientation-sensing surface unit 2110).

In some embodiments, wherein the sensing comprises using a magnetometer or an accelerometer.

In some embodiments, wherein the physical button comprises a home button that is the sole button on the side of the electronic device.

In some embodiments, wherein in response to detecting a press input of the home button, a home screen (e.g., with the detecting unit 2125), an application launch screen, a multi-tasking user interface, or a digital assistant user interface is displayed (e.g., with the display enabling unit 2120).

In some embodiments, wherein in response to detecting a press input of the home button while a folder is being displayed (e.g., with the detecting unit 2125), a home screen is displayed (e.g., with the display enabling unit 2120).

In some embodiments, wherein in response to detecting a press input of the home button while an application is being displayed (e.g., with the detecting unit 2125), an application launch screen is displayed (e.g., with the display enabling unit 2120).

In some embodiments, wherein the sliding of the dock region back onto the display unit is displayed such the dock region rotates along with the one or more of the user interface objects in the first set of user interface objects rotating with respect to the second UI-orientation (e.g., with the UI-rendering unit 2130).

In some embodiments, wherein the second set of the dock region sliding back onto the display unit is identical to the second set of the dock region sliding off the display unit, and each user interface object in the second set of the dock region sliding onto the display unit rotated into a different orientation with respect to the identical user interface object in the second set of the dock region sliding off the display unit.

In some embodiments, wherein the sliding of the dock region off the display unit is displayed such the dock region rotates along with the one or more of the user interface objects in the first set of user interface objects rotating with respect to the second UI-orientation (e.g., with the UI-rendering unit 2130).

In some embodiments, wherein the first set of user interface objects comprises a folder icon that corresponds to a folder, and the processing unit 2115 is further configured to: while displaying the first set of one or more objects (e.g., with the display enabling unit 2120), detect selection of the folder icon that is associated with a third set of user interface objects (e.g., with the detecting unit 2125); and in response to detecting selection of the folder icon: in accordance with a determination the user interface is in the second UI-orientation (e.g., with the determining unit 2135), concurrently displaying a first region with a first subset of the third set of user interface objects and a second region with a second subset of the third set of user interface objects (e.g., with the display enabling unit 2120), wherein the second subset comprises user interface objects that are not included in the first subset and the first region is visually distinguished from the second region; and in accordance with a determination the user interface is in the first UI-orientation (e.g., with the determining unit 2135), displaying a region with the first subset of the third set of user interface objects without displaying other user interface objects in the third set of user interface objects (e.g., with the display enabling unit 2120).

The disclosure herein has been described in particular detail with respect to some embodiments. Those of skill in the art will appreciate that other embodiments optionally are practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component optionally are instead performed by multiple components, and functions performed by multiple components optionally are instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems optionally are also used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages optionally are used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks includes storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A non-transitory computer readable storage medium storing one or more programs, the one or more programs comprising instructions, which when executed by an electronic device with a touch screen display, cause the electronic device to:
   display a user interface in a first UI-orientation relative to the display, the user interface comprising a first set of user interface objects and a dock region that comprises a second set of user interface objects arranged in a row, wherein the dock is displayed along a first edge of the display;
   while displaying the user interface in the first UI-orientation, detect a UI-orientation change condition, wherein the UI-orientation change condition includes rotation of the electronic device; and
   in response to detecting the UI-orientation change condition:
      display the user interface in a second UI-orientation relative to the display with one or more of the user interface objects in the first set of user interface objects rotated relative to the display, wherein the dock region in the second UI-orientation comprises the second set of user interface objects arranged in a column;
      in accordance with a first dock condition being met when the electronic device is rotated to a first orientation:
         continuously display the dock region along the first edge of the display; and
         rotate each user interface object in the second set of user interface objects in place, such that a center of each rotated user interface object retains a same location on the display; and
      in accordance with a second dock condition being met when the electronic device is rotated to a second orientation, the second dock condition being different from the first dock condition:
         cease display of the dock region along the first edge of the display; and
         display the dock region along a second edge of the display opposite to the first edge of the display.

2. The non-transitory computer readable storage medium of claim 1, wherein:
   the user interface is a rectangular region having a long dimension and a short dimension,
   displaying a user interface in a first UI-orientation relative to the display comprises displaying the dock region along an edge of the short dimension of the user interface in the first UI-orientation; and
   displaying the user interface in a second UI-orientation relative to the display comprises displaying the dock region along an edge of the short dimension of the user interface in the second UI-orientation.

3. The non-transitory computer readable storage medium of claim 2, wherein the edge of the short dimension in the first UI-orientation comprises a bottom edge of the user interface, and in the second UI-orientation comprises a right edge of the user interface.

4. The non-transitory computer readable storage medium of claim 1, wherein the first UI-orientation comprises a portrait view of the user interface, and the second UI-orientation comprises a landscape view of the user interface.

5. The non-transitory computer readable storage medium of claim 1, wherein rotating of the one or more of the user interface objects in the first set of the user interface objects relative to the display comprises crossfading the one or more of the user interface objects in the first set of user interface objects between their respective locations in the first and in the second UI-orientation.

6. The non-transitory computer readable storage medium of claim 1, wherein rotating of the one or more of the user interface objects in the first set of the user interface objects relative to the display comprises rotating the set of one or more of the user interface objects as the user interface objects crossfade between their respective locations in the first and in the second UI-orientation.

7. The non-transitory computer readable storage medium of claim 1, wherein the user interface comprises a multi-page user interface, and the instructions when executed by the electronic device further cause the electronic device to:
   in response to detecting a next-page input for switching between different pages of the multi-page user interface, display a set of user interface objects that are different from the first set of user interface objects, while maintaining display of the dock region and the second set of user interface objects.

8. The non-transitory computer readable storage medium of claim 1, wherein detecting the UI-orientation change condition comprises receiving input indicative of a change in orientation of the display of the electronic device from a first device orientation to a second device orientation.

9. The non-transitory computer readable storage medium of claim 1, wherein rotating the one or more of the user interface objects in the first set of user interface objects in conjunction with the second IA-orientation is delayed until the electronic device is fully rotated from a first device orientation when displaying the user interface objects in the first UI-orientation to second device orientation associated with displaying the user interface objects in the second UI-orientation.

10. The non-transitory computer readable storage medium of claim 1, wherein the instructions when executed by the electronic device further cause the electronic device to:
   display the dock region to the right side of the user interface in the second UI-orientation.

11. The non-transitory computer readable storage medium of claim 1, wherein the instructions when executed by the electronic device further cause the electronic device to:
display the dock region to the side of the user interface closest to the location of a physical button on the electronic device.

12. The non-transitory computer readable storage medium of claim 1, wherein
ceasing display of the dock region along the first edge of the display includes ceasing to display the dock region on the display by sliding the dock region off the display in a first direction relative to the first set of user interface objects; and
displaying the dock region along a second edge of the display opposite to the first edge of the display includes sliding the dock region back onto the display in the first direction relative to the first set of user interface objects from an edge of the display opposite to an edge from which the dock region slid off.

13. The non-transitory computer readable storage medium of claim 12, wherein the second set of user interface objects of the dock region sliding back onto the display is identical to the second set of the dock region sliding off the display, and each user interface object in the second set of user interface objects of the dock region sliding onto the display is rotated into a different orientation with respect to the identical user interface object in the second set of the dock region sliding off the display.

14. The non-transitory computer readable storage medium of claim 12, wherein the sliding of the dock region off the display is displayed such that the dock region rotates along with the one or more of the user interface objects in the first set of user interface objects rotating with respect to the second UI-orientation.

15. The non-transitory computer readable storage medium of claim 1, wherein the user interface comprises a wallpaper background that maintains, with respect to the first edge of the display, a same orientation between the first UI-orientation and the second UI-orientation.

16. The non-transitory computer readable storage medium of claim 1, wherein the user interface comprises a multi-page user interface, and wherein the instructions when executed by the electronic device further cause the electronic device to:
in response to detecting a next-page input for moving a user interface object from a first page to a second page in the second UI-orientation, the first and second page being arranged on either side of the dock region, move the user interface object laterally underneath the dock region.

17. The non-transitory computer readable storage medium of claim 1, wherein the instructions when executed by the electronic device further cause the electronic device to:
display a lock screen in the first UI-orientation; and
in response to detecting an unlock input and detecting the Ill-orientation change condition, display a home screen of the user interface in the first UI-orientation before displaying the home screen in the second UI-orientation after a pre-defined time period has elapsed.

18. The non-transitory computer readable storage medium of claim 1, wherein the first set of user interface objects comprises a folder icon that corresponds to a folder, and wherein the instructions when executed by the electronic device further cause the electronic device to:
while displaying the first set of one or more objects, detect selection of the folder icon that is associated with a third set of user interface objects; and
in response to detecting selection of the folder icon:
in accordance with a determination the user interface is in the second UI-orientation, concurrently display a first region with a first subset of the third set of user interface objects and a second region with a second subset of the third set of user interface objects, wherein the second subset comprises user interface objects that are not included in the first subset and the first region is visually distinguished from the second region; and
in accordance with a determination the user interface is in the first UI-orientation, display a region with the first subset of the third set of user interface objects without displaying other user interface objects in the third set of user interface objects.

19. The non-transitory computer readable storage medium of claim 1; wherein:
ceasing display of the dock region along the first edge of the display includes ceasing to display altogether the dock region along the first edge of the display; and
displaying the dock region along the second edge of the display opposite to the first edge of the display includes re-displaying the dock region along the second edge of the display opposite to the first edge of the display.

20. The non-transitory computer readable storage medium of claim 1, wherein the second orientation is rotated 180 degrees relative to the first orientation.

21. A computer-implemented method comprising:
at an electronic device with a touch screen display:
displaying a user interface in a first UI-orientation relative to the display, the user interface comprising a first set of user interface objects and a dock region that comprises a second set of user interface objects arranged in a row, wherein the dock is displayed along a first edge of the display;
while displaying the user interface in the first UI-orientation, detecting a UI-orientation change condition wherein the UI-orientation change condition includes rotation of the electronic device; and
in response to detecting the UI-orientation change condition:
displaying the user interface in a second UI-orientation relative to the display with one or more of the user interface objects in the first set of user interface objects rotated relative to the display, wherein the dock region in the second UI-orientation comprises the second set of user interface objects arranged in a column;
in accordance with a first dock condition being met when the electronic device is rotated to a first orientation:
continuously displaying the dock region along the first edge of the display; and
rotating each user interface object in the second set of user interface objects in place, such that a center of each rotated user interface object retains a same location on the display; and
in accordance with a second dock condition being met when the electronic device is rotated to a second orientation, the second dock condition being different from the first dock condition:
ceasing display of the dock region along the first edge of the display; and
displaying the dock region along a second edge of the display opposite to the first edge of the display.

22. An electronic device, comprising:
a display;
one or more processors;
memory; and
one or more programs, wherein the one or more programs are stored in the memory and configured to be executed by the one or more processors, the one or more programs including instructions when executed by the electronic device cause the electronic device to:
    display a user interface in a first UI-orientation relative to the display, the user interface comprising a first set of user interface objects and a dock region that comprises a second set of user interface objects arranged in a row, wherein the dock is displayed along a first edge of the display;
    while displaying the user interface in the first UI-orientation, detect a UI-orientation change condition, wherein the UI-orientation change condition includes rotation of the electronic device; and
    in response to detecting the UI-orientation change condition:
        display the user interface in a second UI-orientation relative to the display with one or more of the user interface objects in the first set of user interface objects rotated relative to the display, wherein the dock region in the second UI-orientation comprises the second set of user interface objects arranged in a column;
        in accordance with a first dock condition being met when the electronic device is rotated to a first orientation:
            continuously display the dock region along the first edge of the display; and
            rotate each user interface object in the second set of user interface objects in place, such that a center of each rotated user interface object retains a same location on the display; and
        in accordance with a second dock condition being met when the electronic device is rotated to a second orientation, the second dock condition being different from the first dock condition:
            cease display of the dock region along the first edge of the display; and
            display the dock region along a second edge of the display opposite to the first edge of the display.

23. The computer-implemented method of claim 21, wherein:
the user interface is a rectangular region having a long dimension and a short dimension,
displaying a user interface in a first UI-orientation relative to the display comprises displaying the dock region along an edge of the short dimension of the user interface in the first UI-orientation; and
displaying the user interface in a second UI-orientation relative to the display comprises displaying the dock region along an edge of the short dimension of the user interface in the second UI-orientation.

24. The computer-implemented method of claim 21, wherein the edge of the short dimension in the first UI-orientation comprises a bottom edge of the user interface, and in the second UI-orientation comprises a right edge of the user interface.

25. The computer-implemented method of claim 21, wherein the first UI-orientation comprises a portrait view of the user interface, and the second UI-orientation comprises a landscape view of the user interface.

26. The computer-implemented method of claim 21, wherein rotating of the one or more of the user interface objects in the first set of the user interface objects relative to the display comprises crossfading the one or more of the user interface objects in the first set of user interface objects between their respective locations in the first and in the second UI-orientation.

27. The computer-implemented method of claim 21, wherein rotating of the one or more of the user interface objects in the first set of the user interface objects relative to the display comprises rotating the set of one or more of the user interface objects as the user interface objects crossfade between their respective locations in the first and in the second UI-orientation.

28. The computer-implemented method of claim 21, wherein the user interface comprises a multi-page user interface, and the computer-implemented method further comprises:
    in response to detecting a next-page input for switching between different pages of the multi-page user interface, displaying a set of user interface objects that are different from the first set of user interface objects, while maintaining display of the dock region and the second set of user interface objects.

29. The computer-implemented method of claim 21, wherein detecting the UI-orientation change condition comprises receiving input indicative of a change in orientation of the display of the electronic device from a first device orientation to a second device orientation.

30. The computer-implemented method of claim 21, wherein rotating the one or more of the user interface objects in the first set of user interface objects in conjunction with the second UI-orientation is delayed until the electronic device is fully rotated from a first device orientation when displaying the user interface objects in the first UI-orientation to second device orientation associated with displaying the user interface objects in the second UI-orientation.

31. The computer-implemented method of claim 21, further comprising:
    displaying the dock region to the right side of the user interface in the second UI-orientation.

32. The computer-implemented method of claim 21, further comprising:
    displaying the dock region to the side of the user interface closest to the location of a physical button on the electronic device.

33. The computer-implemented method of claim 21, wherein
    ceasing display of the dock region along the first edge of the display includes ceasing to display the dock region on the display by sliding the dock region off the display in a first direction relative to the first set of user interface objects; and
    displaying the dock region along a second edge of the display opposite to the first edge of the display includes sliding the dock region back onto the display in the first direction relative to the first set of user interface objects from an edge of the display opposite to an edge from which the dock region slid off.

34. The computer-implemented method of claim 33, wherein the second set of user interface objects of the dock region sliding back onto the display is identical to the second set of the dock region sliding off the display, and each user interface object in the second set of user interface objects of the dock region sliding onto the display is rotated into a different orientation with respect to the identical user interface object in the second set of the dock region sliding off the display.

35. The computer-implemented method of claim 33, wherein the sliding of the dock region off the display is displayed such that the dock region rotates along with the one or more of the user interface objects in the first set of user interface objects rotating with respect to the second UI-orientation.

36. The computer-implemented method of claim 21, wherein the user interface comprises a wallpaper background that maintains, with respect to the first edge of the display, a same orientation between the first UI-orientation and the second UI-orientation.

37. The computer-implemented method of claim 21, wherein the user interface comprises a multi-page user interface, and the computer-implemented method further comprising:
in response to detecting a next-page input for moving a user interface object from a first page to a second page in the second UI-orientation, the first and second page being arranged on either side of the dock region, moving the user interface object laterally underneath the dock region.

38. The computer-implemented method of claim 21, further comprising:
displaying a lock screen in the first UI-orientation; and
in response to detecting an unlock input and detecting the UI-orientation change condition, displaying a home screen of the user interface in the first UI-orientation before displaying the home screen in the second UI-orientation after a pre-defined time period has elapsed.

39. The computer-implemented method of claim 21, wherein the first set of user interface objects comprises a folder icon that corresponds to a folder, and the computer-implemented method further comprising:
while displaying the first set of one or more objects, detecting selection of the folder icon that is associated with a third set of user interface objects; and
in response to detecting selection of the folder icon:
in accordance with a determination the user interface is in the second UI-orientation, concurrently displaying a first region with a first subset of the third set of user interface objects and a second region with a second subset of the third set of user interface objects, wherein the second subset comprises user interface objects that are not included in the first subset and the first region is visually distinguished from the second region; and
in accordance with a determination the user interface is in the first UI-orientation, displaying a region with the first subset of the third set of user interface objects without displaying other user interface objects in the third set of user interface objects.

40. The computer-implemented method of claim 21, wherein:
ceasing display of the dock region along the first edge of the display includes ceasing to display altogether the dock region along the first edge of the display; and
displaying the dock region along the second edge of the display opposite to the first edge of the display includes re-displaying the dock region along the second edge of the display opposite to the first edge of the display.

41. The computer-implemented method of claim 21, wherein the second orientation is rotated 180 degrees relative to the first orientation.

42. The electronic device of claim 22, wherein:
the user interface is a rectangular region having a long dimension and a short dimension,
displaying a user interface in a first UI-orientation relative to the display comprises displaying the dock region along an edge of the short dimension of the user interface in the first UI-orientation; and
displaying the user interface in a second UI-orientation relative to the display comprises displaying the dock region along an edge of the short dimension of the user interface in the second UI-orientation.

43. The electronic device of claim 22, wherein the edge of the short dimension in the first UI-orientation comprises a bottom edge of the user interface, and in the second UI-orientation comprises a right edge of the user interface.

44. The electronic device of claim 22, wherein the first UI-orientation comprises a portrait view of the user interface, and the second UI-orientation comprises a landscape view of the user interface.

45. The electronic device of claim 22, wherein rotating of the one or more of the user interface objects in the first set of the user interface objects relative to the display comprises crossfading the one or more of the user interface objects in the first set of user interface objects between their respective locations in the first and in the second UI-orientation.

46. The electronic device of claim 22, wherein rotating of the one or more of the user interface objects in the first set of the user interface objects relative to the display comprises rotating the set of one or more of the user interface objects as the user interface objects crossfade between their respective locations in the first and in the second UI-orientation.

47. The electronic device of claim 22, wherein the user interface comprises a multi-page user interface, and the instructions when executed by the electronic device further cause the electronic device to:
in response to detecting a next-page input for switching between different pages of the multi-page user interface, display a set of user interface objects that are different from the first set of user interface objects, while maintaining display of the dock region and the second set of user interface objects.

48. The electronic device of claim 22, wherein detecting the hi-orientation change condition comprises receiving input indicative of a change in orientation of the display of the electronic device from a first device orientation to a second device orientation.

49. The electronic device of claim 22, wherein rotating the one or more of the user interface objects in the first set of user interface objects in conjunction with the second UI-orientation is delayed until the electronic device is fully rotated from a first device orientation when displaying the user interface objects in the first UI-orientation to second device orientation associated with displaying the user interface objects in the second UI-orientation.

50. The electronic device of claim 22, wherein the instructions when executed by the electronic device further cause the electronic device to:
display the dock region to the right side of the user interface in the second UI-orientation.

51. The electronic device of claim 22, wherein the instructions when executed by the electronic device further cause the electronic device to:
display the dock region to the side of the user interface closest to the location of a physical button on the electronic device.

52. The electronic device of claim 22, wherein
ceasing display of the dock region along the first edge of the display includes ceasing to display the dock region on the display by sliding the dock region off the display in a first direction relative to the first set of user interface objects; and displaying the dock region along a second edge of the display opposite to the first edge of the display includes sliding the dock region back onto the display in the first direction relative to the first set of user interface objects from an edge of the display opposite to an edge from which the dock region slid off.

53. The electronic device of claim 52, wherein the second set of user interface objects of the dock region sliding back onto the display is identical to the second set of the dock region sliding off the display, and each user interface object in the second set of user interface objects of the dock region sliding onto the display is rotated into a different orientation with respect to the identical user interface object in the second set of the dock region sliding off the display.

54. The electronic device of claim 52, wherein the sliding of the dock region off the display is displayed such that the dock region rotates along with the one or more of the user interface objects in the first set of user interface objects rotating with respect to the second UI-orientation.

55. The electronic device of claim 22, wherein the user interface comprises a wallpaper background that maintains, with respect to the first edge of the display, a same orientation between the first UI-orientation and the second UI-orientation.

56. The electronic device of claim 22, wherein the user interface comprises a multi-page user interface, and wherein the instructions when executed by the electronic device further cause the electronic device to:

in response to detecting a next-page input for moving a user interface object from a first page to a second page in the second UI-orientation, the first and second page being arranged on either side of the dock region, move the user interface object laterally underneath the dock region.

57. The electronic device of claim 22, wherein the instructions when executed by the electronic device further cause the electronic device to:

display a lock screen in the first UI-orientation; and in response to detecting an unlock input and detecting the UI-orientation change condition, display a home screen of the user interface in the first UI-orientation before displaying the home screen in the second UI-orientation after a pre-defined time period has elapsed.

58. The electronic device of claim 22, wherein the first set of user interface objects comprises a folder icon that corresponds to a folder, and wherein the instructions when executed by the electronic device further cause the electronic device to:

while displaying the first set of one or more objects, detect selection of the folder icon that is associated with a third set of user interface objects; and in response to detecting selection of the folder icon:

in accordance with a determination the user interface is in the second UI-orientation, concurrently display a first region with a first subset of the third set of user interface objects and a second region with a second subset of the third set of user interface objects, wherein the second subset comprises user interface objects that are not included in the first subset and the first region is visually distinguished from the second region; and in accordance with a determination the user interface is in the first UI-orientation, display a region with the first subset of the third set of user interface objects without displaying other user interface objects in the third set of user interface objects.

59. The electronic device of claim 22, wherein:

ceasing display of the dock region along the first edge of the display includes ceasing to display altogether the dock region along the first edge of the display; and displaying the dock region along the second edge of the display opposite to the first edge of the display includes re-displaying the dock region along the second edge of the display opposite to the first edge of the display.

60. The electronic device of claim 22, wherein the second orientation is rotated 180 degrees relative to the first orientation.

* * * * *

UNITED STATES PATENT AND TRADEMARK OFFICE
CERTIFICATE OF CORRECTION

PATENT NO. : 10,304,163 B2  
APPLICATION NO. : 14/501858  
DATED : May 28, 2019  
INVENTOR(S) : Chanaka G. Karunamuni et al.

Page 1 of 1

It is certified that error appears in the above-identified patent and that said Letters Patent is hereby corrected as shown below:

In the Claims

In Claim 9, at Column 48, Line 57, delete "IA-" and insert -- UI --, therefor.

In Claim 17, at Column 49, Line 56, delete "Ill-" and insert -- UI --, therefor.

In Claim 48, at Column 54, Line 42, delete "hi-" and insert -- UI --, therefor.

Signed and Sealed this  
Twenty-third Day of July, 2019

Andrei Iancu  
*Director of the United States Patent and Trademark Office*